(12) United States Patent
Nakamura et al.

(10) Patent No.: US 9,216,777 B2
(45) Date of Patent: Dec. 22, 2015

(54) WORK VEHICLE

(71) Applicant: Kubota Corporation, Naniwa-ku, Osaka-shi, Osaka (JP)

(72) Inventors: Norimi Nakamura, Sakai (JP); Teruo Shimamura, Sakai (JP); Taro Nakamura, Sakai (JP); Masaru Nakaji, Sakai (JP); Mitsugu Kobayashi, Sakai (JP); Ryouzou Imanishi, Sakai (JP); Yoshimi Hirooka, Sakai (JP); Koji Fujiwara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/027,605

(22) Filed: Sep. 16, 2013

(65) Prior Publication Data

US 2014/0034409 A1    Feb. 6, 2014

Related U.S. Application Data

(63) Continuation-in-part of application No. 13/783,976, filed on Mar. 4, 2013, now Pat. No. 8,960,805, which is a continuation of application No. 12/420,556, filed on Apr. 8, 2009, now Pat. No. 8,414,082.

(30) Foreign Application Priority Data

| Jul. 25, 2008 | (JP) | ................ 2008-192671 |
| Jul. 25, 2008 | (JP) | ................ 2008-192672 |
| Jul. 25, 2008 | (JP) | ................ 2008-192673 |
| Jul. 25, 2008 | (JP) | ................ 2008-192674 |

(51) Int. Cl.
*B62D 33/02* (2006.01)
*B60K 5/00* (2006.01)
(Continued)

(52) U.S. Cl.
CPC . *B62D 33/02* (2013.01); *B60K 5/00* (2013.01); *B60P 3/423* (2013.01); *B62D 21/183* (2013.01);
(Continued)

(58) Field of Classification Search
CPC .... B62D 33/06; B62D 33/0273; B62D 33/02; B62D 33/037; B62D 33/0617; B62D 47/003; B62D 25/00; B62D 33/08; B60P 3/423; B60P 1/00; B60P 1/16; B60P 1/26; B60P 1/283; B60P 1/286; B60P 1/64; B60P 3/40; B60P 3/42
USPC .......... 298/17 R, 1 A, 17 T; 280/781; 410/77; 296/190.04, 183.2, 226.11, 65.09, 296/183.1; 180/291
See application file for complete search history.

(56) References Cited

U.S. PATENT DOCUMENTS

| 3,169,792 A | 2/1965 | Viquez |
| 4,480,868 A | 11/1984 | Koto |

(Continued)

FOREIGN PATENT DOCUMENTS

| JP | 5024407 U1 | 3/1975 |
| JP | 5185919 U1 | 6/1976 |

(Continued)

*Primary Examiner* — Glenn Dayoan
*Assistant Examiner* — Sunsurraye Westbrook
(74) *Attorney, Agent, or Firm* — The Webb Law Firm

(57) ABSTRACT

A work vehicle includes a vehicle body, a seat section and a load-carrying platform disposed rearwardly of the seat section. A storage space is disposed rearwardly of the seat section and downwardly of the load-carrying platform, the storage space extending in a lateral width direction of the vehicle body, and the storage space opening toward a lateral side of the vehicle body.

7 Claims, 39 Drawing Sheets

(51) Int. Cl.
  *B62D 21/18* (2006.01)
  *B62D 23/00* (2006.01)
  *B62D 33/037* (2006.01)
  *B62D 33/06* (2006.01)
  *B60P 3/42* (2006.01)

(52) U.S. Cl.
  CPC ............ *B62D 21/186* (2013.01); *B62D 23/005* (2013.01); *B62D 33/037* (2013.01); *B62D 33/0625* (2013.01)

(56) References Cited

U.S. PATENT DOCUMENTS

| | | |
|---|---|---|
| 4,512,604 A | 4/1985 | Maeda et al. |
| 5,086,858 A * | 2/1992 | Mizuta et al. ............... 180/68.3 |
| 5,673,767 A | 10/1997 | Uno et al. |
| 6,394,555 B2 | 5/2002 | Mizuta et al. |
| 6,550,849 B1 | 4/2003 | Dosdall |
| 6,786,535 B1 | 9/2004 | Grzegorzewski et al. |
| 6,851,741 B1 | 2/2005 | Burg |
| 6,905,159 B1 | 6/2005 | Saito et al. |
| 6,916,142 B2 | 7/2005 | Hansen et al. |
| 6,923,507 B1 | 8/2005 | Billberg et al. |
| 6,994,388 B2 | 2/2006 | Saito et al. |
| 7,147,075 B2 * | 12/2006 | Tanaka et al. ............... 180/229 |
| 7,168,516 B2 * | 1/2007 | Nozaki et al. ............... 180/68.3 |
| 7,249,798 B2 | 7/2007 | Saito et al. |
| 7,578,544 B1 | 8/2009 | Shimamura et al. |
| 7,913,505 B2 | 3/2011 | Nakamura |
| 2001/0004950 A1 * | 6/2001 | Mizuta ........................ 180/69.2 |
| 2001/0054832 A1 * | 12/2001 | Mizuta ........................ 296/205 |
| 2005/0178136 A1 | 8/2005 | Hara et al. |
| 2007/0188008 A1 | 8/2007 | Furman |
| 2007/0210617 A1 | 9/2007 | Nakamura |
| 2007/0214818 A1 | 9/2007 | Nakamura |

FOREIGN PATENT DOCUMENTS

| | | |
|---|---|---|
| JP | 57168434 U | 10/1982 |
| JP | 57180154 U1 | 11/1982 |
| JP | 5973146 U1 | 5/1984 |
| JP | 11245843 A | 9/1999 |
| JP | 2002274193 A | 9/2002 |
| JP | 20041746 A | 1/2004 |
| JP | 2004255963 A | 9/2004 |
| JP | 2005178782 A | 7/2005 |
| JP | 2006315613 A | 11/2006 |
| JP | 2007177712 A | 7/2007 |
| JP | 2007245749 A | 9/2007 |
| JP | 2007245958 A | 9/2007 |
| JP | 200887739 A | 4/2008 |

* cited by examiner

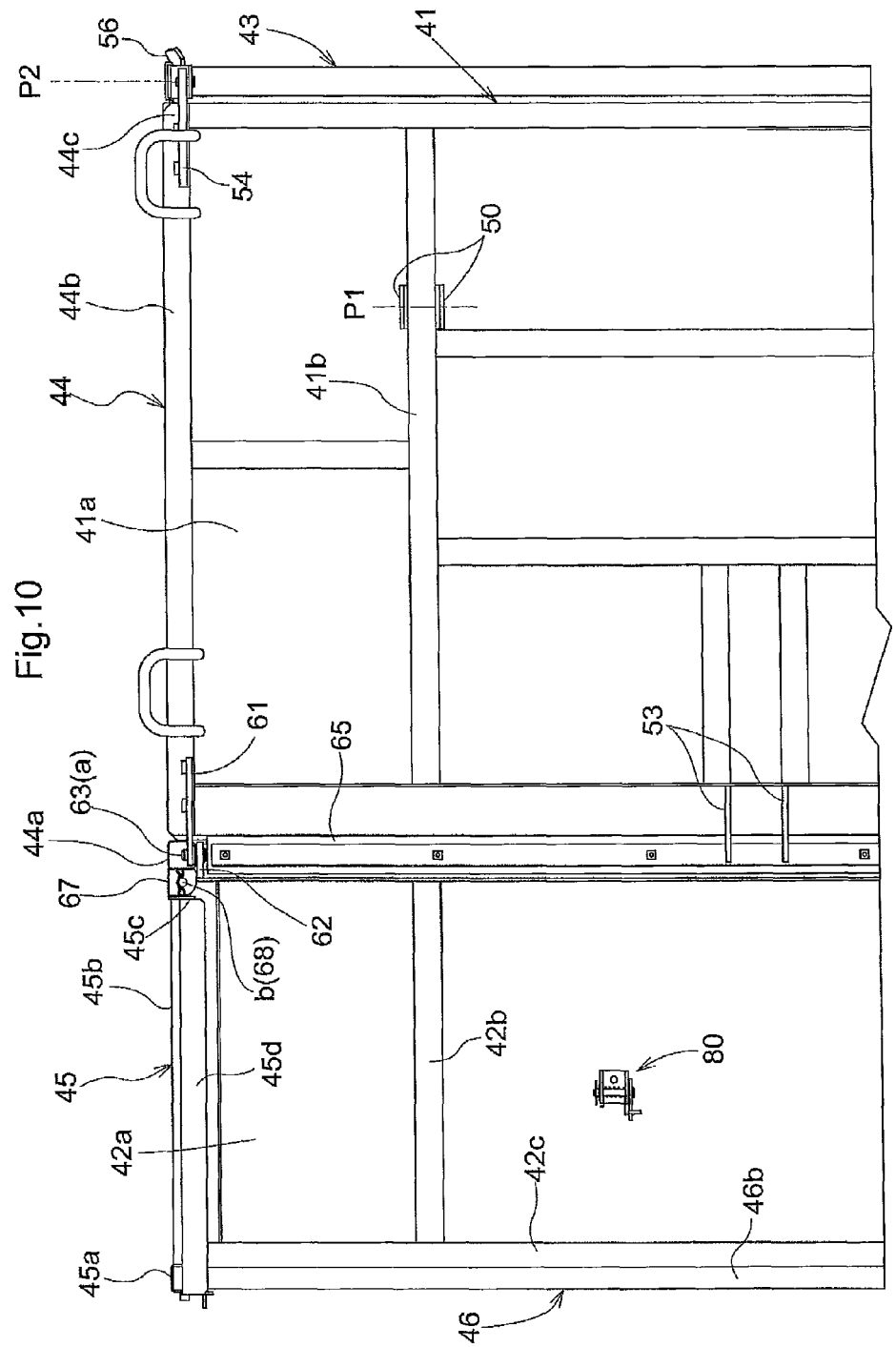

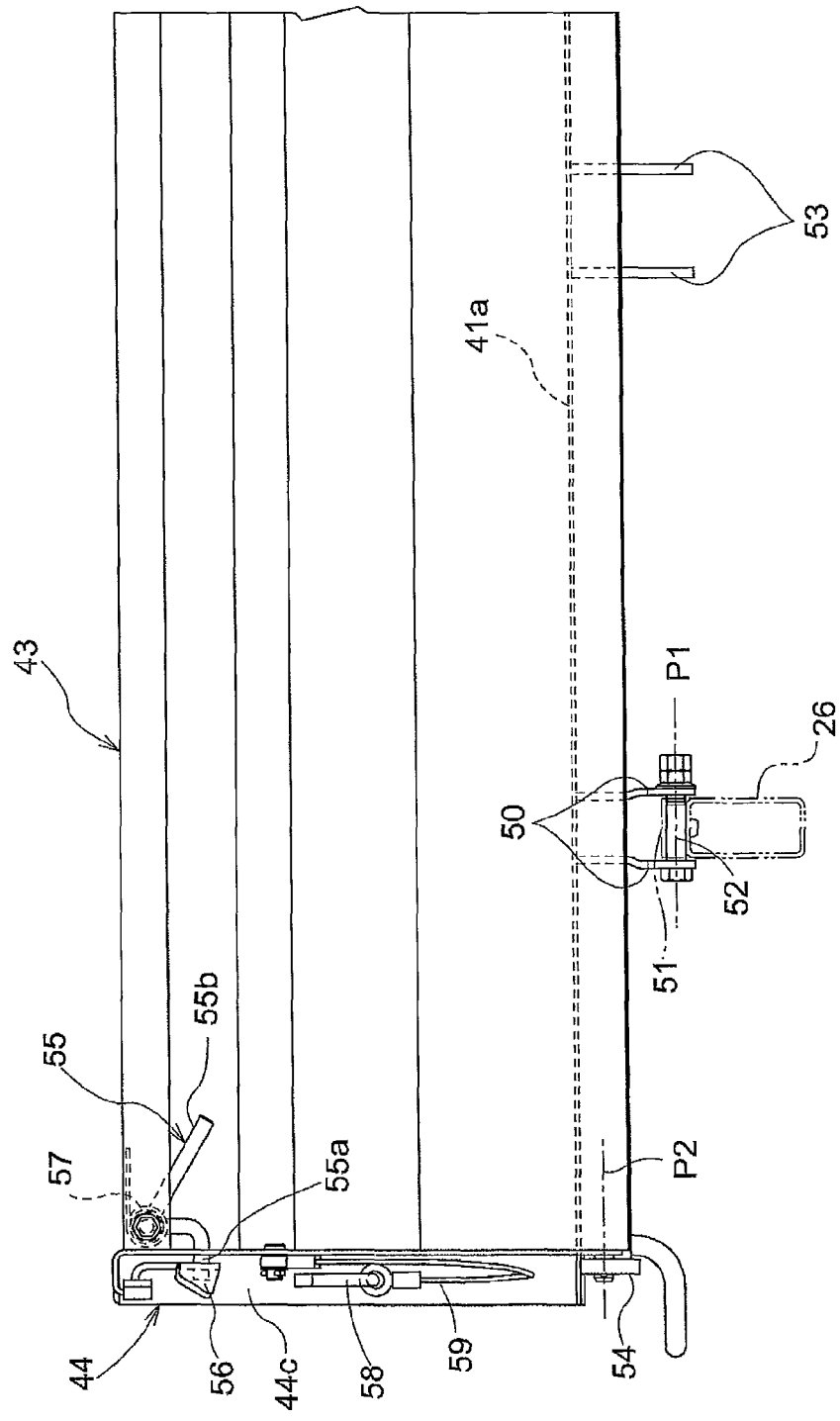

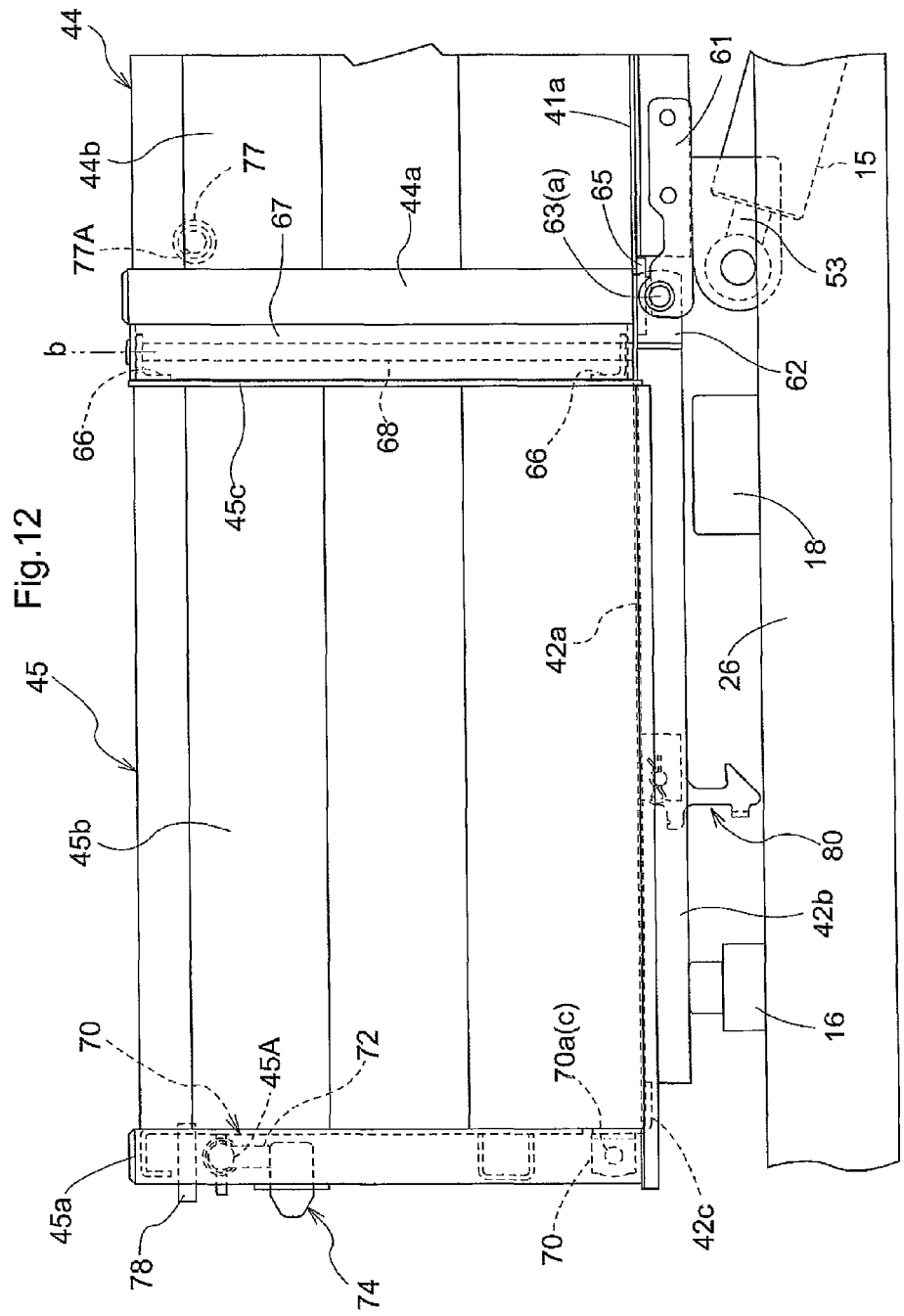

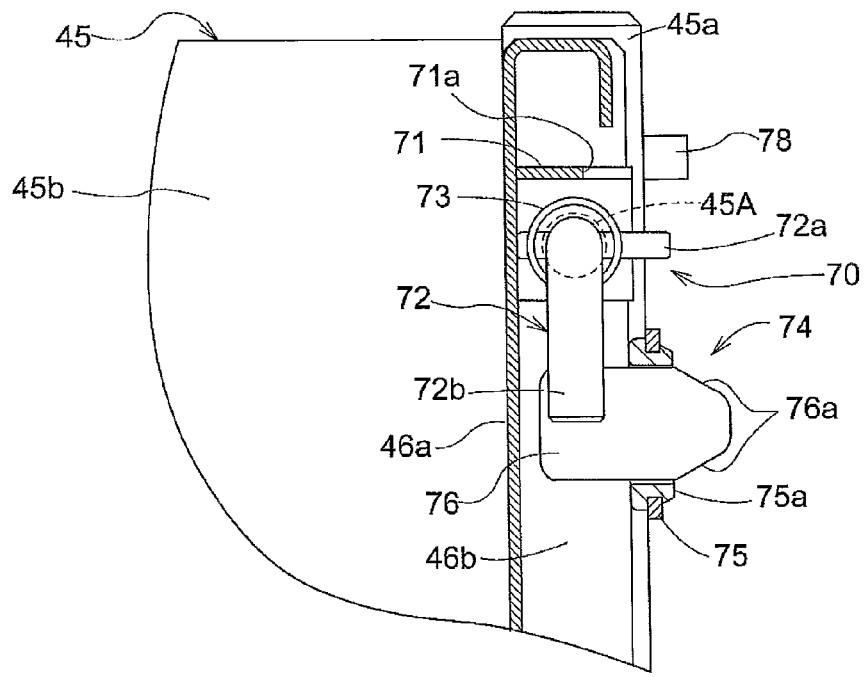
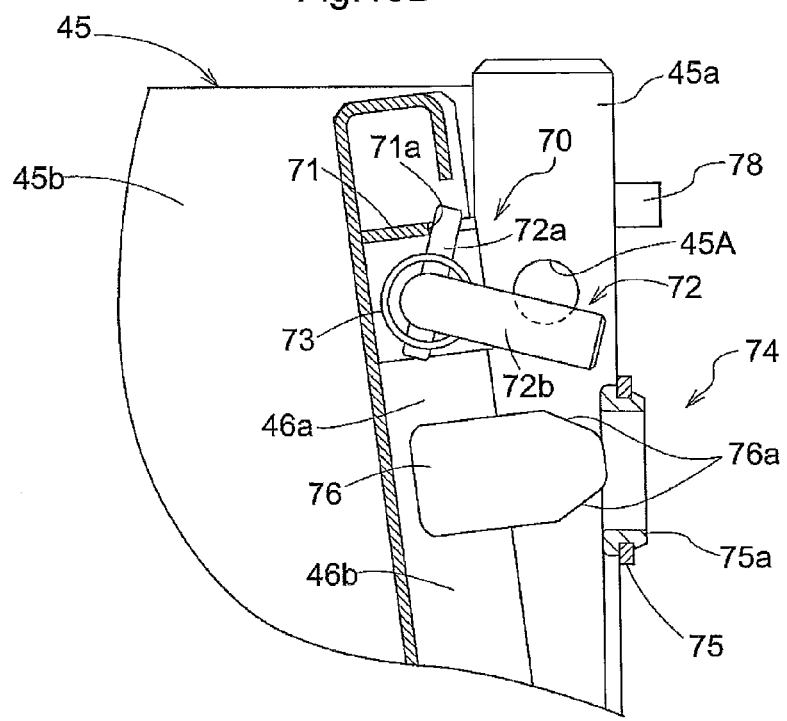

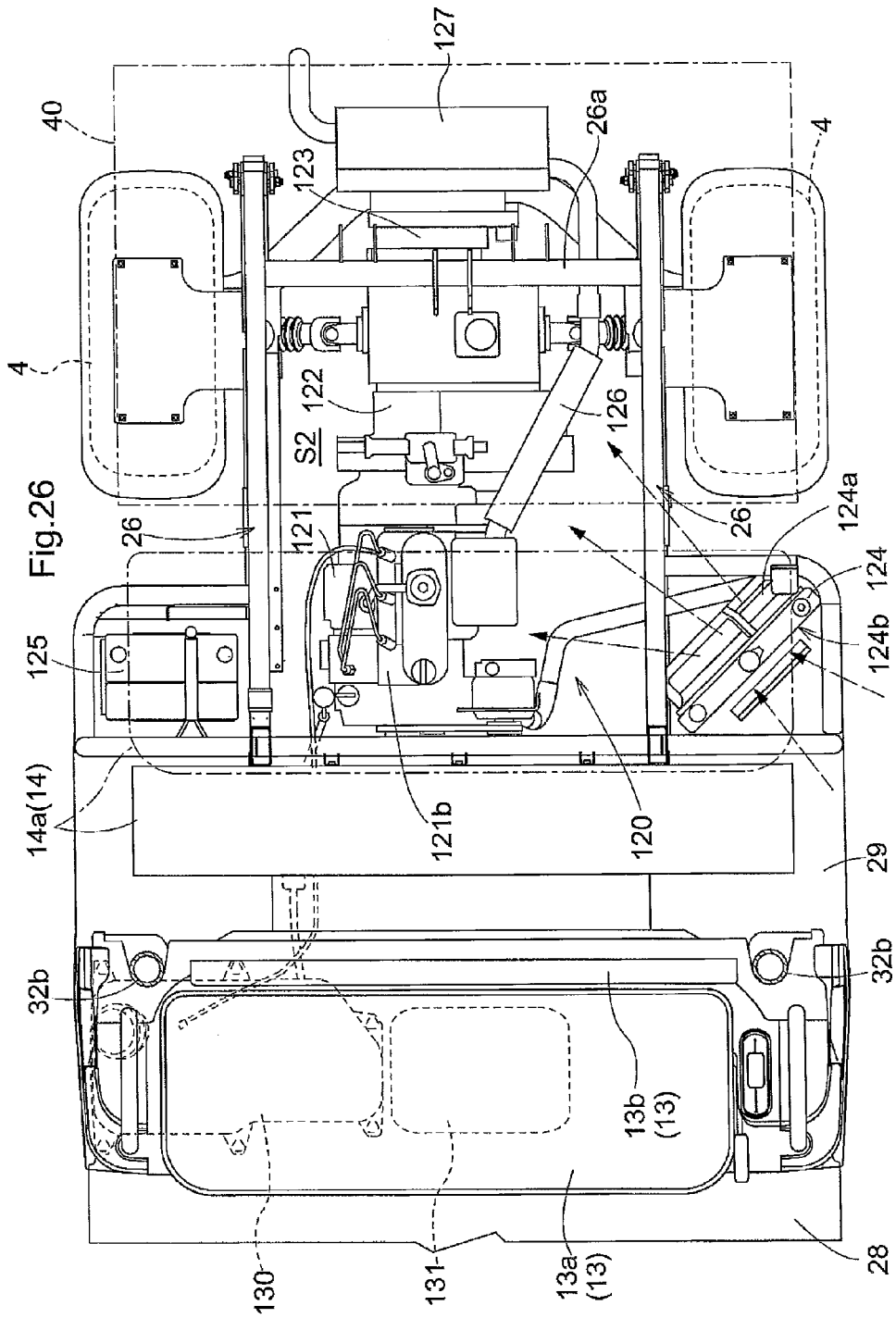

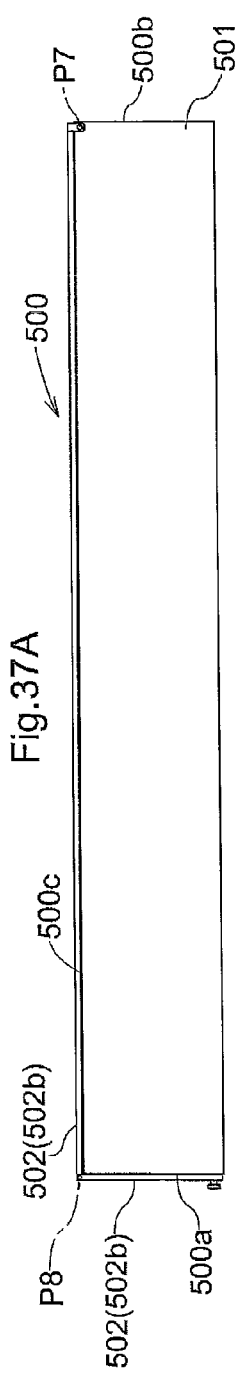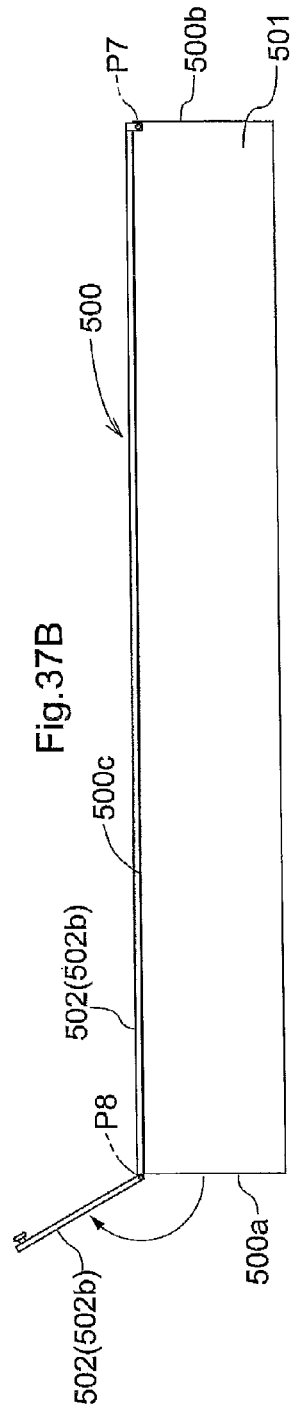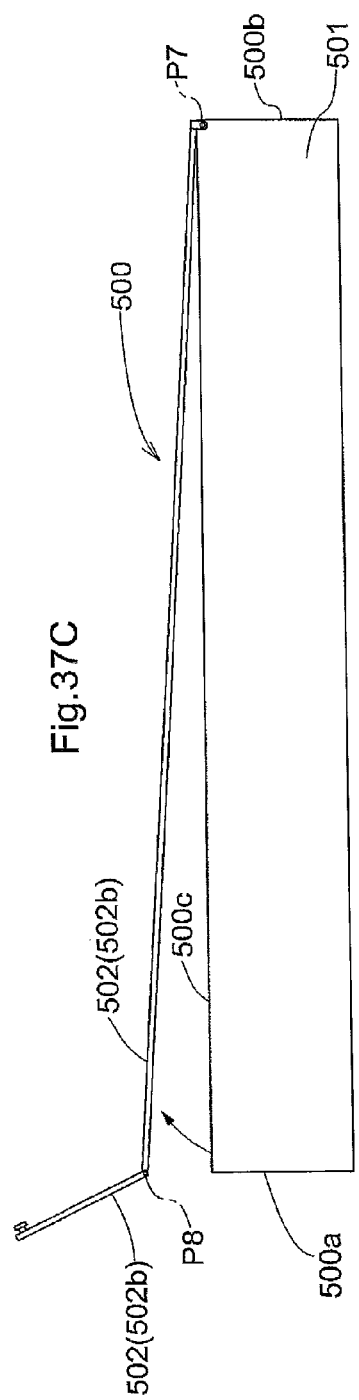

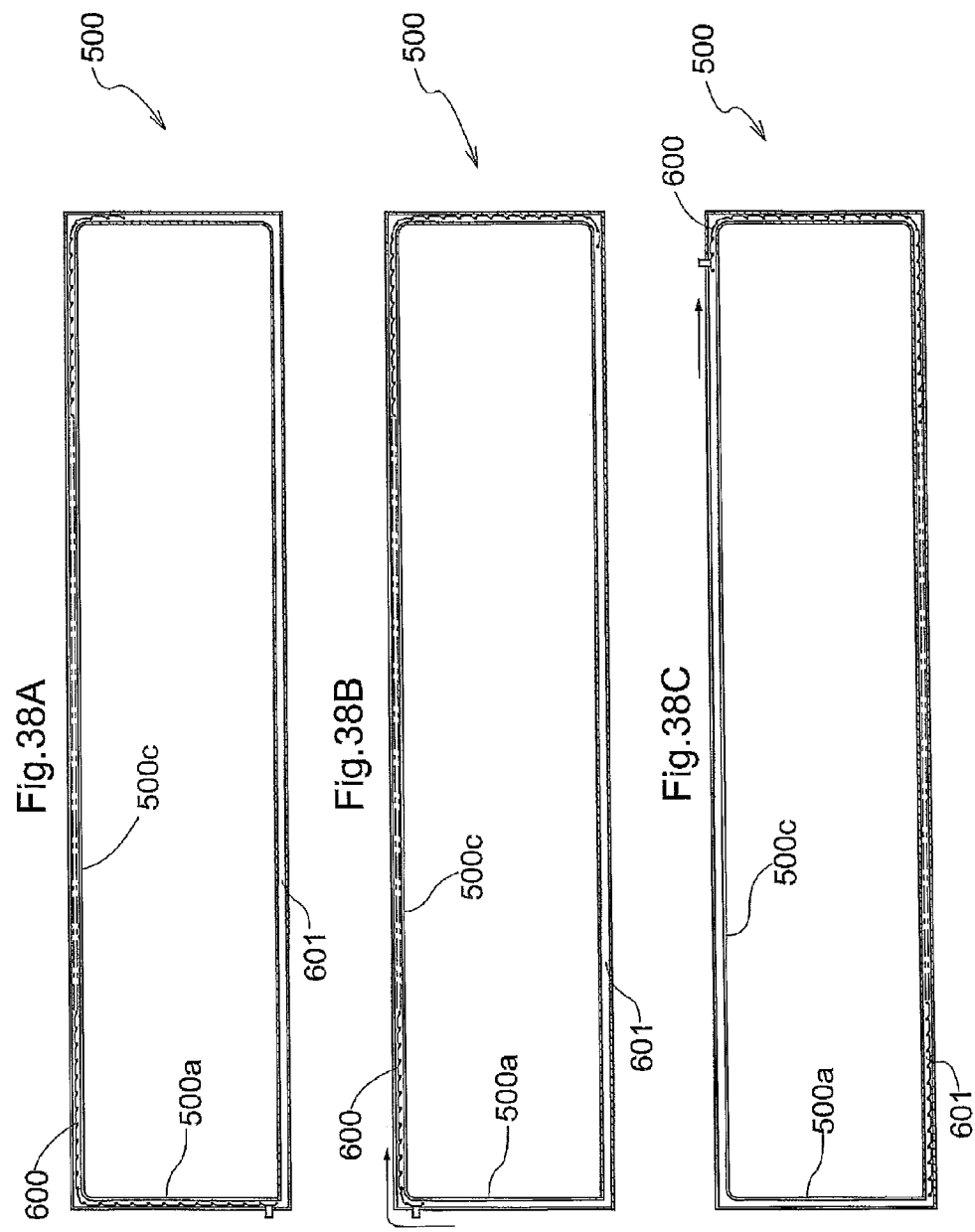

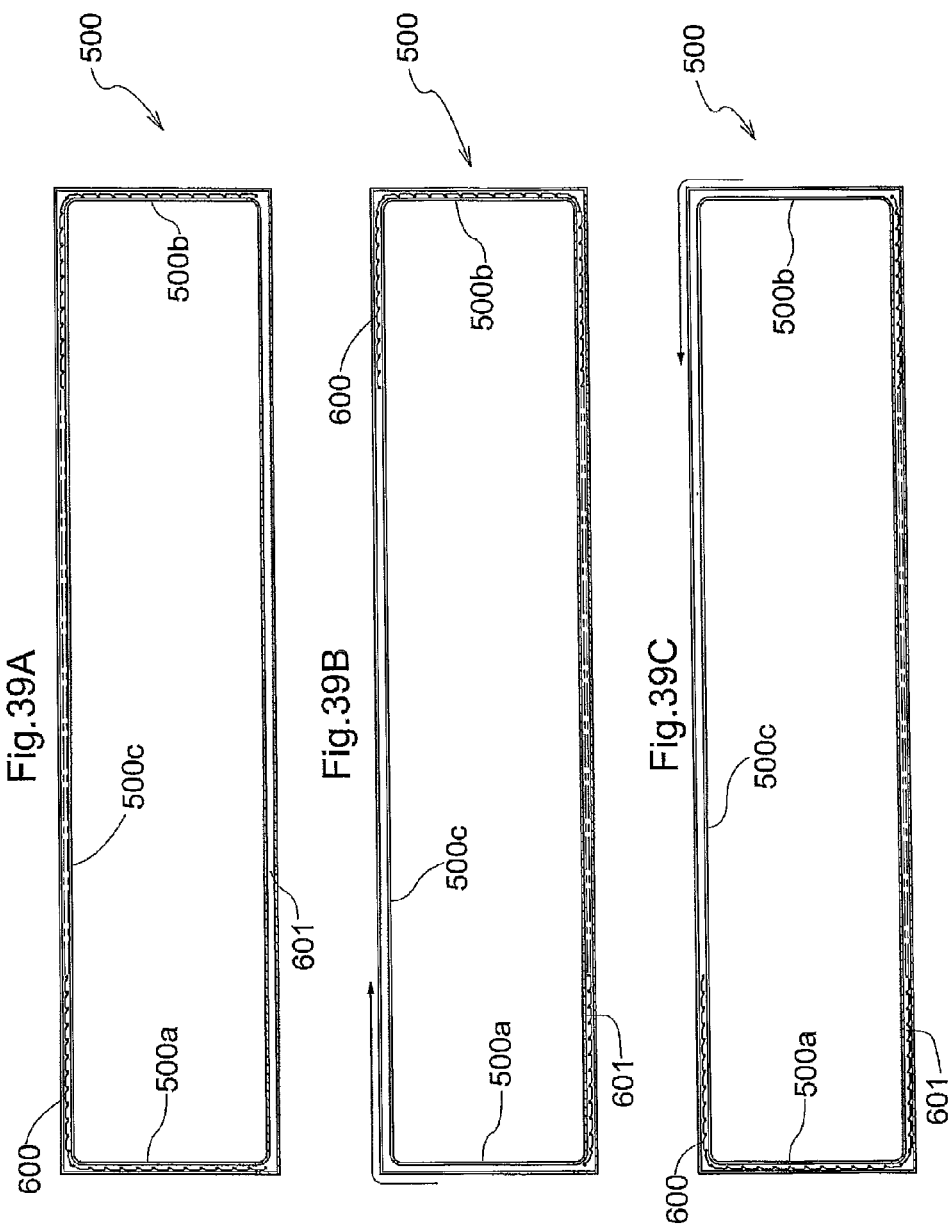

WORK VEHICLE

CROSS REFERENCE TO RELATED APPLICATIONS

This application is a continuation-in-part of U.S. application Ser. No. 13/783,976 filed on Mar. 4, 2013, which is a continuation of U.S. application Ser. No. 12/420,556 filed on Apr. 8, 2009, which claims priority to Japanese Application Nos. 2008-192671; 2008-192672; 2008-192673; and 2008-192674 each filed on Jul. 25, 2008. The disclosure of each of these documents is hereby incorporated in its entirety by reference.

BACKGROUND OF THE INVENTION

1. Field of the Invention

The present invention relates to a work vehicle comprising a vehicle body frame extending in the fore/aft direction, a passenger's section included in the vehicle body frame, a driver's seat disposed forwardly of the passenger's section, and a drive unit under which the vehicle body frame is disposed, the drive unit having an engine.

2. Description of the Related Art

The work vehicle of the above-noted type is conveniently used not only for transportation of construction material or the like, but also for transportation of passengers. And, in such work vehicle, if the drive unit is disposed under the vehicle body frame, this can eliminate the need to provide a space on the vehicle body frame for disposing the drive unit. So, there is obtained the advantageous possibility of effectively utilizing the space on the vehicle body frame which would tend otherwise to be restricted to ensure a large space for passengers. A work vehicle employing such construction is known from the U.S. Pat. No. 6,994,388 (see FIGS. 2A, 2B, FIGS. 3A, 3B). With this work vehicle, another seat can be disposed rearwardly of the driver's seat and a rear portion of the vehicle body frame, thee is disposed a load-carrying platform capable of dumping actions. To the damping load-carrying platform, there are connected a partitioning member for partitioning between the load-carrying platform and the passenger's section and the other seat than the driver's seat; and an upper side of the drive unit is opened up in association with a dumping action of the load-carrying platform.

However, with this construction, in order to carry out a maintenance operation of the drive unit disposed under the vehicle body frame, this requires some ingenious arrangement for opening up the upper side of the drive unit, as a matter of course. For this reason, in the case of the conventional technique described above, at a front end position of the dumping platform where the partitioning member is to be attached, there is connected a partitioning member for partitioning from the passenger's section, so that the upper side of the drive unit can be opened up in association with a dumping operation of the load-carrying platform. According to this construction, the upper side of the drive unit disposed downwardly of the vehicle body frame can be opened in association with a dumping operation of the load-carrying platform. Hence, a desired maintenance operation can be carried out advantageously.

However, in the case of this conventional technique, each time there arises the need for maintenance operation, it is needed to open up the upper side of the drive unit by moving the load-carrying platform together with the partitioning member. Therefore, if there is some object or a load loaded on the load-carrying platform, this must be removed. Or, if the situation does not allow displacement of the rear seat, a preliminary operation of e.g. folding this will be needed. And, this preliminary operation would be troublesome. Moreover, during a two rows seat layout mode using both the driver's seat and the rear seat, the dumping operation of the load-carrying platform cannot be carried out.

From the Japanese Patent Application "Kokai" No. 2005-178782 (see paragraph [0018], FIG. 2, FIG. 3 thereof), another work vehicle is known. In this case, the vehicle body frame comprises a rear frame disposed rearwardly at a position higher than the floor face of the passenger's section and a front frame disposed forwardly of the rear frame and adapted for supporting the floor face of the passenger's section. And, an engine and a transmission case are suspended from a support frame downwardly of the rear frame of the vehicle body frame. In this, the layout is such that the positions of the drive unit such as the engine and the transmission case are offset in the fore/aft direction of the vehicle body. With this layout, there is ensured a large space for the upper side of the vehicle body frame, hence, effective utilization of the space over the vehicle body frame is made possible. Further, introduction of ambient air to the radiator can be effected with the entire cooling face of the radiator being opened to the lateral outer side of the vehicle body. Also, as the space under the driver's seat can be utilized as an air exhaust passage, there occurs no interference between the exhaust air from the radiator and the drive unit, so that the exhaust air can flow with low resistance.

However, with the work vehicle according to the Japanese Patent Application "Kokai" No. 2005-178782, if the loading function and the safety performance of the vehicle are to be improved, without significantly changing the size of the entire vehicle body, there arises a problem as follows. That is, if it is desired to increase the number of passengers by modifying the construction on the vehicle body from to one allowing use of both front and rear two rows of seat. this inevitably requires displacement of the position of the rear seat toward the rear side of the vehicle body. However, if the rear seat is provided with such offset arrangement to the rear side of the vehicle body, simple extension, if made, in the length of the vehicle body by an amount corresponding to one row of seat, would be insufficient for ensuring disposing space of the drive unit, etc. This is because, with increase in the loading capacity, it becomes necessary to improve the engine output, which results in turn to increase in the size of the engine per se, and sizes of the transmission case and the peripheral devices and results also in enlargement of the radiator which now has an increased cooling area for providing improved cooling function. And, in the case of the enhancement of the loading capacity and the engine output described above, in order to allow a large radiator to be installed under a transverse posture at the outermost position in the vehicle body width direction while avoiding interference with the rear wheels, the above-described conventional technique would require significant extension in the vehicle body length or extreme enlargement of the wheelbase. Therefore, the technique cannot provide any practical solution. As such, a need exists also for reduction of the cooling load for the radiator and improvement in the scavenging performance for the drive unit, when significant increase in the total vehicle body length is restricted.

Moreover, respecting the ambient air introducing function to the radiator, if the air introducing face having a large width of the radiator is disposed under front facing orientation or a posture approximate thereto, the fore/aft width of the radiator can be reduced, hence being effective for avoiding the increase in the total vehicle body length. In this case; however, the vehicle body or other devices present on the front side of the air introducing face of the radiator would interfere with the air flow, thus creating a new problem of appropriate introduction of ambient air to the entire air introducing face becoming difficult. Conversely, if the wide air introducing face is disposed under the rear facing posture, there is the possibility of occurrence of reverse flow of the exhaust air blown to the front side from the radiator in association with traveling of the vehicle body; hence, this arrangement too is undesirable. As such, a need also exists for appropriate disposing of the enlarged radiator and improvement in the ambient air introducing function for the radiator, when significant increase in the total vehicle body length is restricted.

SUMMARY OF THE INVENTION

As one particularly desired feature for a work vehicle having a driver's seat and a further seat other than the front seat in the passenger's section, there is the readiness of opening of or access to the drive unit disposed under the vehicle body frame and the resultant readiness of maintenance thereof.

To meet the above-described need, a work vehicle according to the present invention comprises:

a vehicle body frame extending in the fore/aft direction, the vehicle body frame including a front frame and a rear frame disposed rearwardly of the front frame;

a passenger's section provided on the vehicle body frame, the passenger's section including a floor face, said rear frame being disposed rearwardly of and at a higher position than said floor face, said floor face being supported by said front frame;

a driver's seat disposed on the front side of the passenger's section;

a rear seat disposing space provided rearwardly of the driver's seat, a rear portion of the rear seat disposing space being overlapped with an upper side of the rear frame;

a drive unit including an engine, the drive unit being disposed downwardly of the rear frame; and a rear seat disposed in the rear seat disposing space, the rear seat being selectable in its posture between a first posture where the rear seat opens up the upper side of the rear frame to allow visual inspection of the drive unit and a second posture where the rear seat is positioned on the upper side of the rear frame to cover the drive unit.

With the above construction, with a simple operation of switching over the posture of the rear seat, it is possible to open up or close the upper side of the drive unit disposed downwardly of this rear seat. Therefore, there is no need for the preliminary operation in opening the upper side of the drive unit, and the upper side of the drive unit can be opened/closed easily. As a result, the trouble required for maintenance and inspection of the drive unit can be alleviated.

According to one preferred embodiment of the invention, said first posture is a non-use condition where the rear seat is displaced forwardly and said second posture is a use posture where the rear seat is displaced rearwardly. With this construction, by switching over the rear seat to the first posture, there can be obtained a large space for the inspection of the drive unit. And, by switching over the seat to the second posture, the space of the passenger's section per se can be enlarged, thus contributing to greater comfort for the passenger.

Further, if a load-carrying platform capable of dumping action as a rear load-carrying section is provided rearwardly of the passenger's section, it becomes possible to open up also the rearward space thereof extending continuously to the under space of the rear seat. As a result, the maintenance operation become even easier.

According to a further preferred embodiment of the present invention, the work vehicle further comprises a partitioning member for partitioning between the rear load-carrying section and the passenger's section, said partitioning member being movable in its position between a forwardly displaced position where the partitioning member is moved to the rear side of the driver's seat and a rearwardly displaced position where the partitioning member is moved to the rear side of the rear seat. With this construction, by moving the partitioning member to the rearwardly displaced position to be situated between the rear load-carrying section and the passenger's section, there are created, within the passenger's section, a space for seating at the driver's seat and a space for seating at the rear seat. Selectively, by moving the partitioning member to the forwardly displaced position to be situated rearwardly of the driver's seat, there is created, within the passenger's section, a single space for seating at the driver's seat only. In this way, these two conditions can be provided selectively in an easy manner. Therefore, there is obtained the advantage of facilitated switchover between the use conditions involving the layout change in the passenger's section.

Further, it is also possible to employ a layout wherein the engine is disposed downwardly of a right/left center of the rear seat under its second posture and the radiator is disposed downwardly of one of the right side and the left side of the rear seat under its second posture. In this case, in response to switchover of the rear seat to the second posture, not only the upper side of the drive unit, but also the upper side of the radiator can be opened up. Therefore, a maintenance operation of the periphery of the radiator which requires inspection with relatively high frequency can be carried out simultaneously. And, in the case of a further layout wherein a battery is disposed downwardly of the opposite side to the side where the radiator is disposed, not only the upper side of the drive unit, but also the upper side of the battery is opened up. Therefore, a maintenance operation of the periphery of the battery which requires inspection with relatively high frequency can be carried out simultaneously.

According to a still further preferred embodiment of the present invention, the work vehicle further comprises a ROPS covering the driver's seat and the rear seat;

right and left rear posts of the ROPS are provided on the lateral outer sides of the rear seat;

the right and left rear posts include armrests for a passenger seated at the rear seat; and the armrests are switchable in their posture from a use posture where the armrests extend forwardly from the rear posts and a stored posture where the armrests are retracted along the rear posts. With this construction, it is possible to improve the protection function for the passenger seated at the rear seat. Further, with the posture change of the armrests, there can be selectively obtained readiness of entrance/exist of the passenger to/from the rear seat and greater working space.

According to the present invention, there is proposed a further work vehicle constructed as follows.

A work vehicle comprises:

a vehicle body frame extending in the fore/aft direction, the vehicle body frame including a front frame and a rear frame disposed rearwardly of the front frame;

a passenger's section provided on the vehicle body frame, the passenger's section including a floor face, said rear frame being disposed rearwardly of and at a higher position than said floor face, said floor face being supported by said front frame;

a drive unit including an engine, the drive unit being disposed downwardly of the rear frame;

a transmission case connected to the engine rearwardly of the engine, with an upper face of the transmission case being set lower than an upper end of the engine;

a radiator disposed on the right or left side of the vehicle body, with an oblique orientation in its plan view, an outer end of an air intake face of the radiator being positioned more rearward than an inner end of the same; and a cooling fan for the radiator arranged such that air fed from the cooling fan is directed toward the upper portion of the transmission case.

According to the work vehicle described above, as the radiator is disposed with an oblique orientation in its plan view, with an outer end of an air intake face of the radiator being positioned more rearward than an inner end of the same, the length of the radiator in the fore/aft direction of the vehicle can be reduced than the case of the air intake face is oriented to the laterally outer side. Further, the cooling air from the cooling fan can smoothly flow through the space formed on the upper face side of the transmission case to the other side in the lateral width direction of the vehicle body. As a result, when the design is to be modified for improving the load carrying capacity or the engine output, the radiator which is enlarged as the result of enhancement of its cooling efficiency for the engine can be arranged with reduced fore/aft length and without needing to significantly increase the fore/aft length of the vehicle body, advantageously. Further, as the cooling air of the cooling fan flows through the space formed on the upper face side of the transmission case, it is possible to reduce the drive load for this cooling fan and to ensure smooth flow of the cooling air, thus improving the cooling efficiency. In addition to the above, exhaust of hot air stagnant in the engine section where such heat generating sources as the engine, a muffler or the like are disposed can proceed smoothly. So, in this respect too, the cooling efficiency can be improved.

Further, in the case of employing a layout wherein an exhaust pipe of the engine extends rearward from a side of the engine where the radiator is disposed, the air from the cooling fan comes into direct contact with the exhaust pipe of the engine. So, the exhaust of the hot air stagnant in the drive unit can proceed smoothly.

Further, if there is provided an outer cover for covering the radiator from the laterally outer side thereof, said outer cover defining an ambient air introducing ventilation hole, there is obtained a protective function for protecting the air intake face of the radiator against contact with other object or the like or adhesion of dust or the like thereto.

According to the present invention, there is proposed a further work vehicle constructed as follows.

A work vehicle comprising:

a vehicle body frame extending in the fore/aft direction, the vehicle body frame including a front frame and a rear frame disposed rearwardly of the front frame;

a passenger's section provided on the vehicle body frame, the passenger's section including a floor face, said rear frame being disposed rearwardly of and at a higher position than said floor face, said floor face being supported by said front frame;

a seat supporting portion provided at an upper portion of the rear frame;

a drive unit including an engine, the drive unit being disposed downwardly of the rear frame;

a radiator supporting frame provided at a lower position than the floor face and extending rearwardly of the front frame, the radiator supporting frame including a radiator mounting face; and a rear vertical wall formed at a level-difference portion between the floor face and the radiator mounting face, the rear vertical wall defining a ventilation opening.

According to the work vehicle described above, even if the radiator is sized such that the radiator, because of its vertical height, cannot be accommodated within the space under the seat of the passenger's section, this large radiator can be disposed as being accommodated within the under space of the passenger's section by utilizing the radiator supporting frame having the radiator mounting face at the position lower than the floor face of the passenger's section. When the radiator is mounted to the radiator supporting frame disposed at the position lower than the floor face of the passenger's section, the rear vertical wall present at the level-difference portion which bridges between the passenger's section floor face and the mounting face of the radiator supporting frame is located forwardly of the air introducing face of the radiator. Therefore, if no remedy measure were taken, the rear vertical wall at the level-difference portion would block the air flow to the air introducing face, so the introduction of ambient air to the air introducing face of the radiator would take place mainly from the lateral outer sides. Therefore, some positive air introducing function would be required for enhancing the heat exchange function. In this regard, with the above-described construction, the rear vertical wall at the level-difference portion defines a ventilation opening. Therefore, it is possible to prevent the rear vertical wall at the level-difference portion from blocking the air flow on the front side of the air introducing face. As a result, even in the case of using a radiator with an air introducing face with such a large vertical dimension as exceeds the height from the floor face of the passenger's section to the seat supporting portion, this radiator can be disposed with the effective utilization of the under space of the passenger's section. Consequently, it is possible to restrict increase in the vehicle body length and also to allow the ambient air introduction from the front side of the vehicle body to the radiator to proceed effectively, so that there can be obtained a work vehicle with enhanced ambient air feeding function to the radiator, thus efficient cooling of the same.

Preferably, at positions of the floor face on the laterally outer sides of the vehicle body, there are provided laterally outer vertical walls extending continuously from the rear vertical wall, said each laterally outer vertical wall defining a laterally oriented ventilation opening allowing introduction of ambient air from the laterally outer sides to the inner side. This construction allows even more efficient introduction of ambient air.

Further and other features and advantages of the present invention will become apparent upon reading the following detailed description of the preferred embodiments thereof with reference to the accompanying drawings.

DETAILED DESCRIPTION OF THE PREFERRED EMBODIMENTS

General Construction of Work Vehicle

An embodiment of a work vehicle relating to the present invention will be described with reference to the accompanying drawings.

Figure 1:
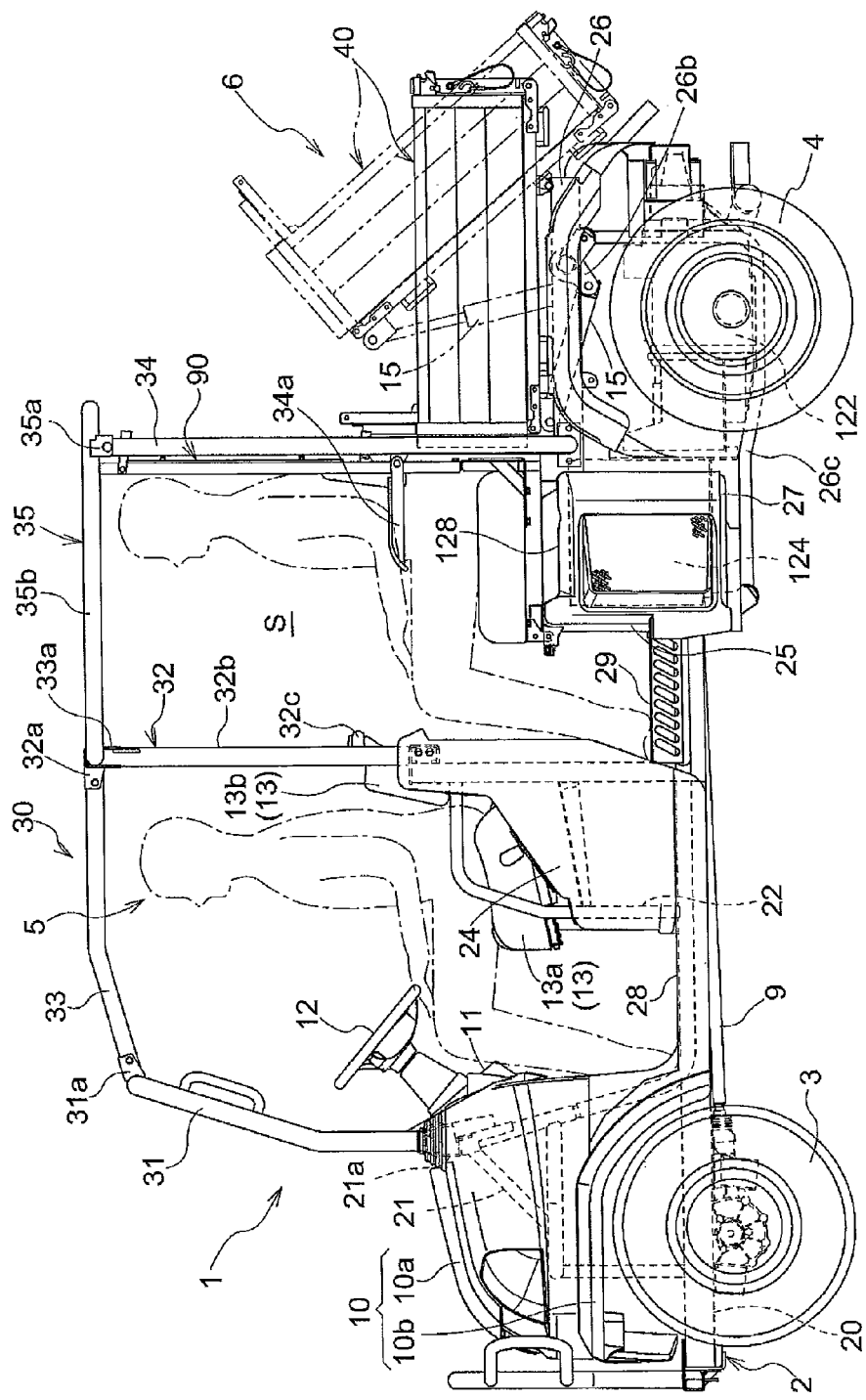
FIG. 1 an overall side view of a work vehicle under two rows seat mode.
Figure 2:
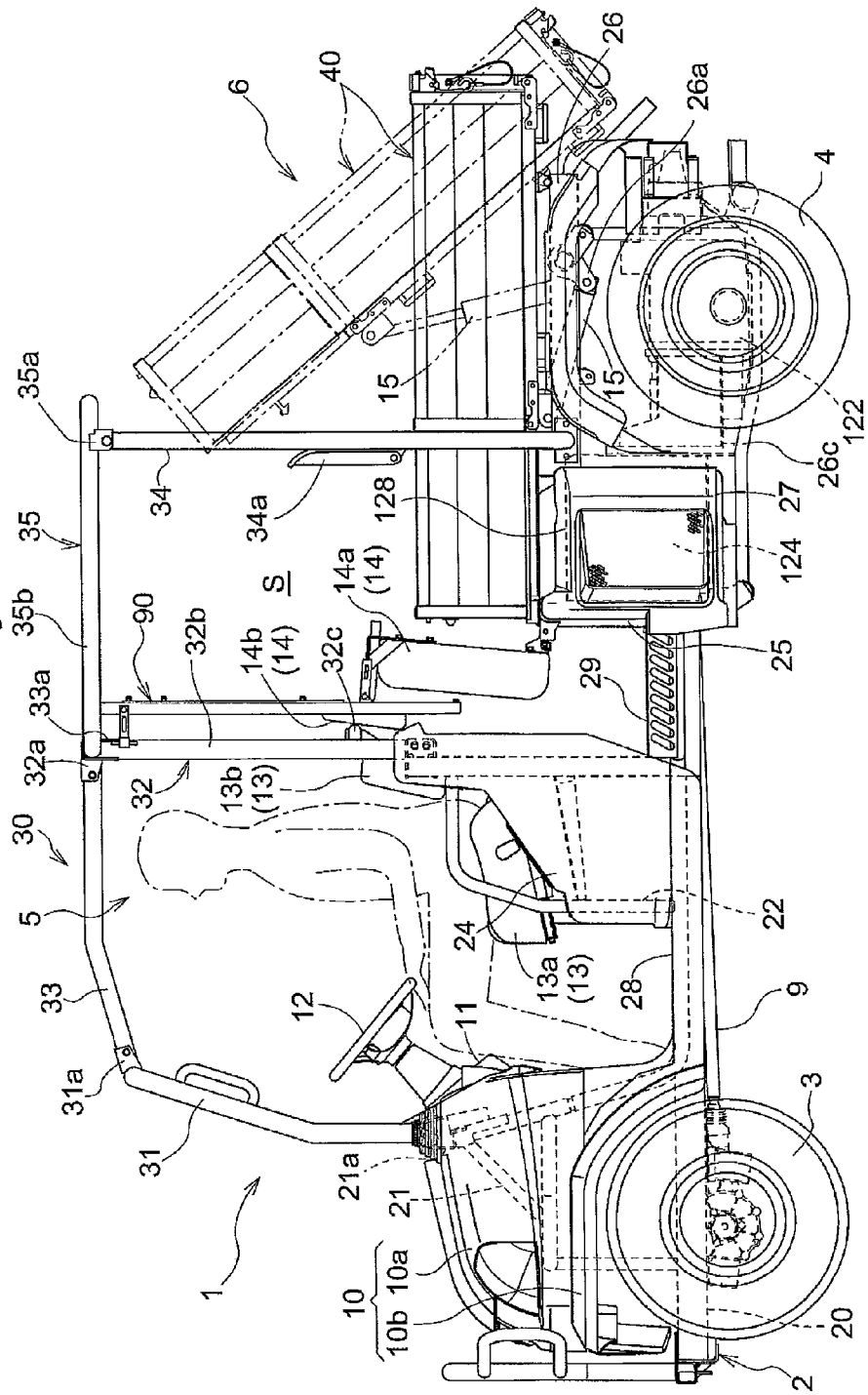
FIG. 2 an overall side view of the work vehicle under single row seat mode.
Figure 3:
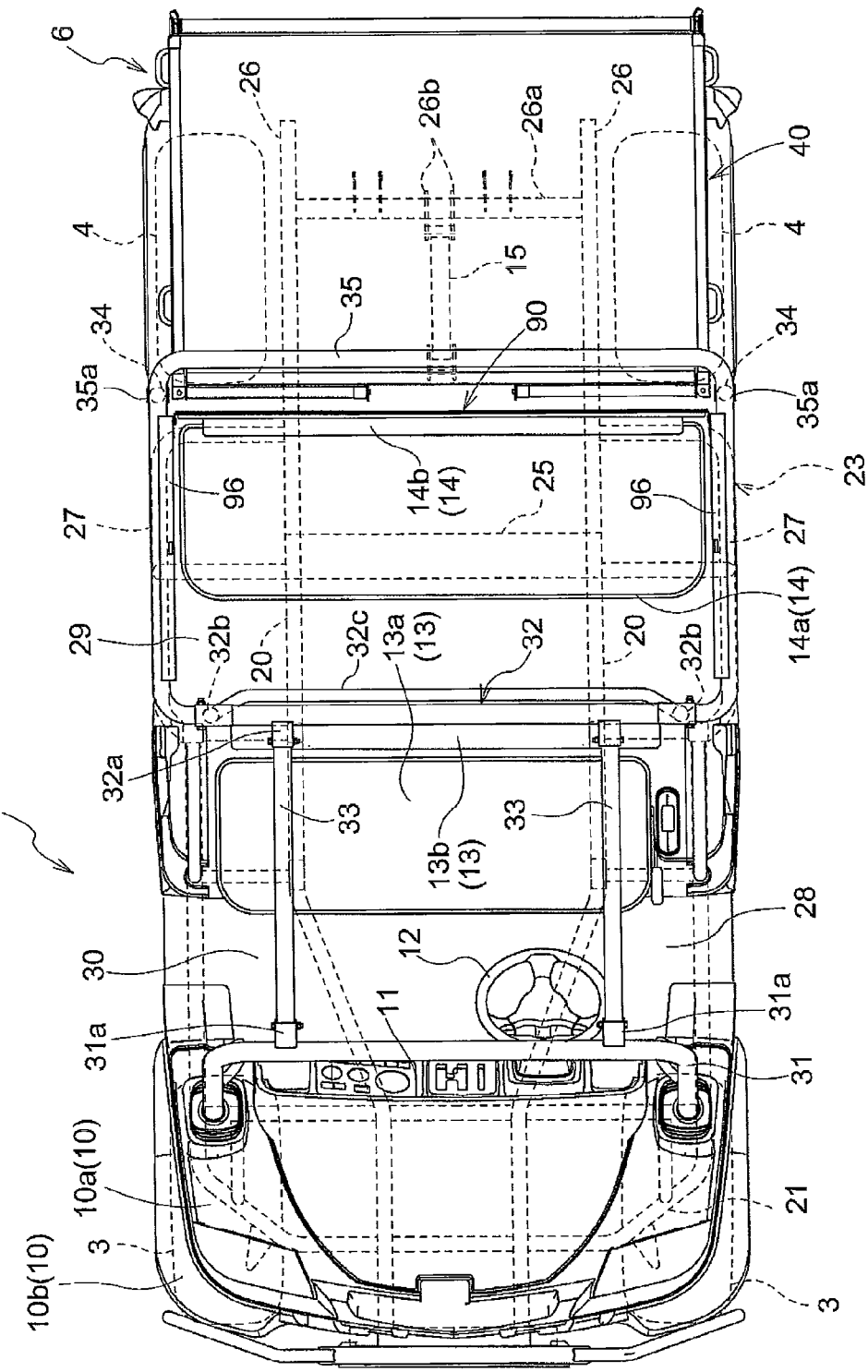
FIG. 3 an overall plan view of the work vehicle under the two rows seat mode.

FIG. 1 is an overall side view of the work vehicle under a mode where there are two front and rear rows of seats which can be seated. FIG. 2 is an overall side view of the work vehicle under a mode where there is only one front row of seat which can be seated. FIG. 3 is an overall plan view of the work vehicle under the mode shown in FIG. 1.

As shown in FIGS. 1 through 3, a vehicle body 1 includes right and left steerable front wheels 3 supported to front portions of a vehicle body frame 2 and right and left non-steerable rear wheels 4 supported to rear portions of the vehicle body frame 2, hence, the vehicle is constructed as a four-wheel-drive type vehicle.

At a fore/aft intermediate portion of the vehicle body 1, there is provided a passenger's section 5 which can be selectively used under a two rows seat mode (for four or five passengers) shown in FIG. 1 where passengers can be seated at a driver's seat 13 and a rear seat 14 or under a one-row seat mode (for two passengers) shown in FIG. 2 where a passenger(s) can be seated at the driver's seat 13.

Rearwardly of the passenger's section 5, there is provided a rear load-carrying section 6 having a load-carrying platform 40 capable of dumping actions and which can be switched over between an extended state and a contracted state to be described later. Between the passenger's section 5 and the rear load-carrying section 6, there is provided a partitioning member 90 for partitioning (constituting a rear wall of the passenger's section 5) between the passenger's section 5 and the rear load-carrying section 6.

The rear seat 14 described above is configured to be switchable in its posture between a use state where the seat 14 is developed to be seated by passengers and a non-use state where the rear side thereof is raised and folded, thus not allowing seating thereon. The rear side space in the passenger's section 5 for disposing such rear seat 14 constitutes what is referred to herein as the "rear seat disposing space S".

At a rear lower portion of the vehicle body frame 2, there is disposed a drive unit 120 mounting an engine 121 as a drive source of the work vehicle. Power outputted from the engine 121 is transmitted via a transmission case 122 to an HST speed changer 123, from which steplessly speed-changed power is transmitted to the right and left rear wheels 4 for driving (see FIG. 26).

From the transmission case 122, a front wheel drive shaft 9 extends forwardly. And, to this front wheel drive shaft 9, there are operably connected the right and left front wheels 3 via front wheel differential units (not shown). In operation, the power from the engine 121 is transmitted via the HST speed-changer 122 and the transmission case 122 and via the front wheel differential units to the right and left front wheels 3 for driving.

[Vehicle Body Construction]

The vehicle body 1 includes a vehicle body core portion 200 constituted by mounting a ROPS 30 covering the passenger's section 5 to the vehicle body frame 2 supported on the front wheels 3 and the rear wheels 4.

Figure 4:
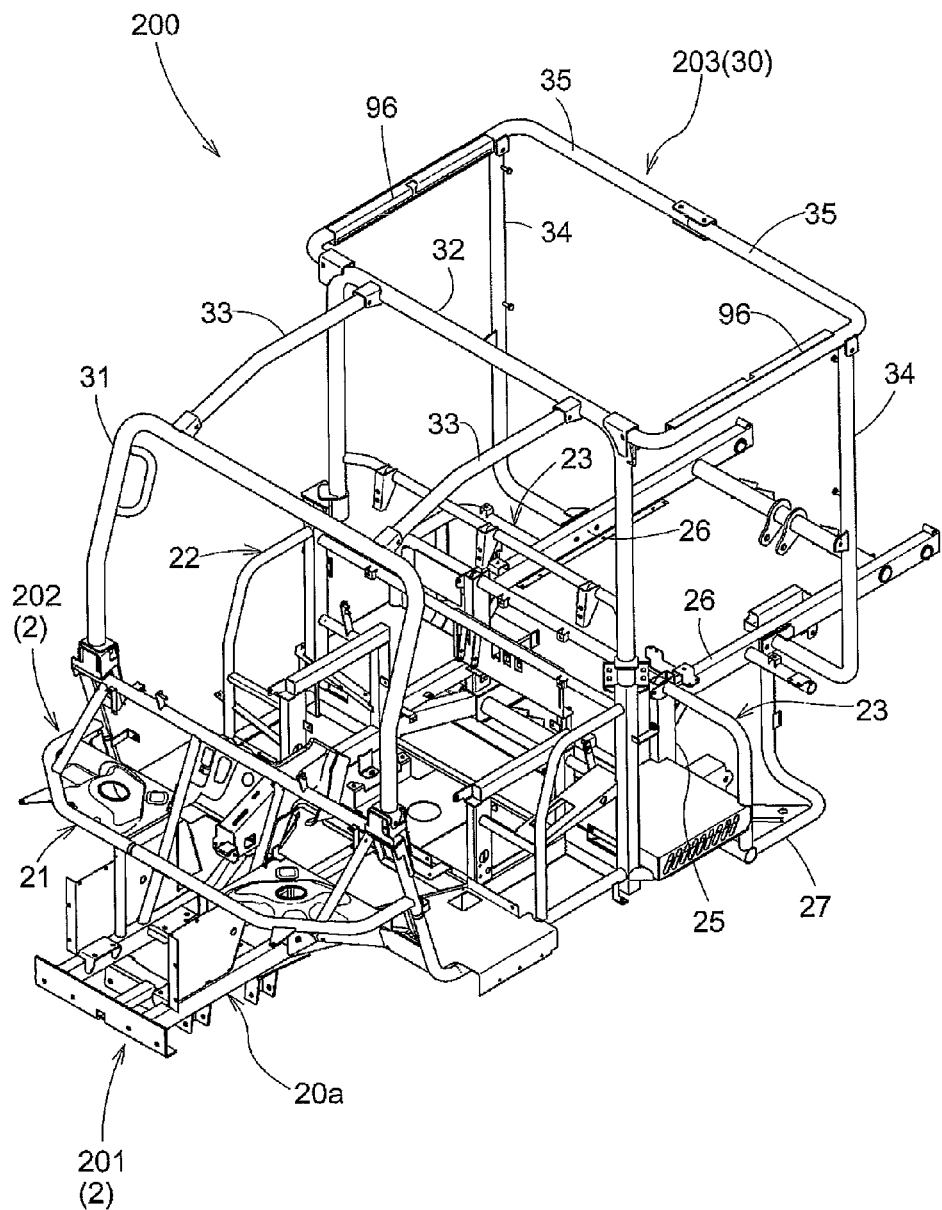
FIG. 4 a perspective view showing a vehicle body core portion.
Figure 5:
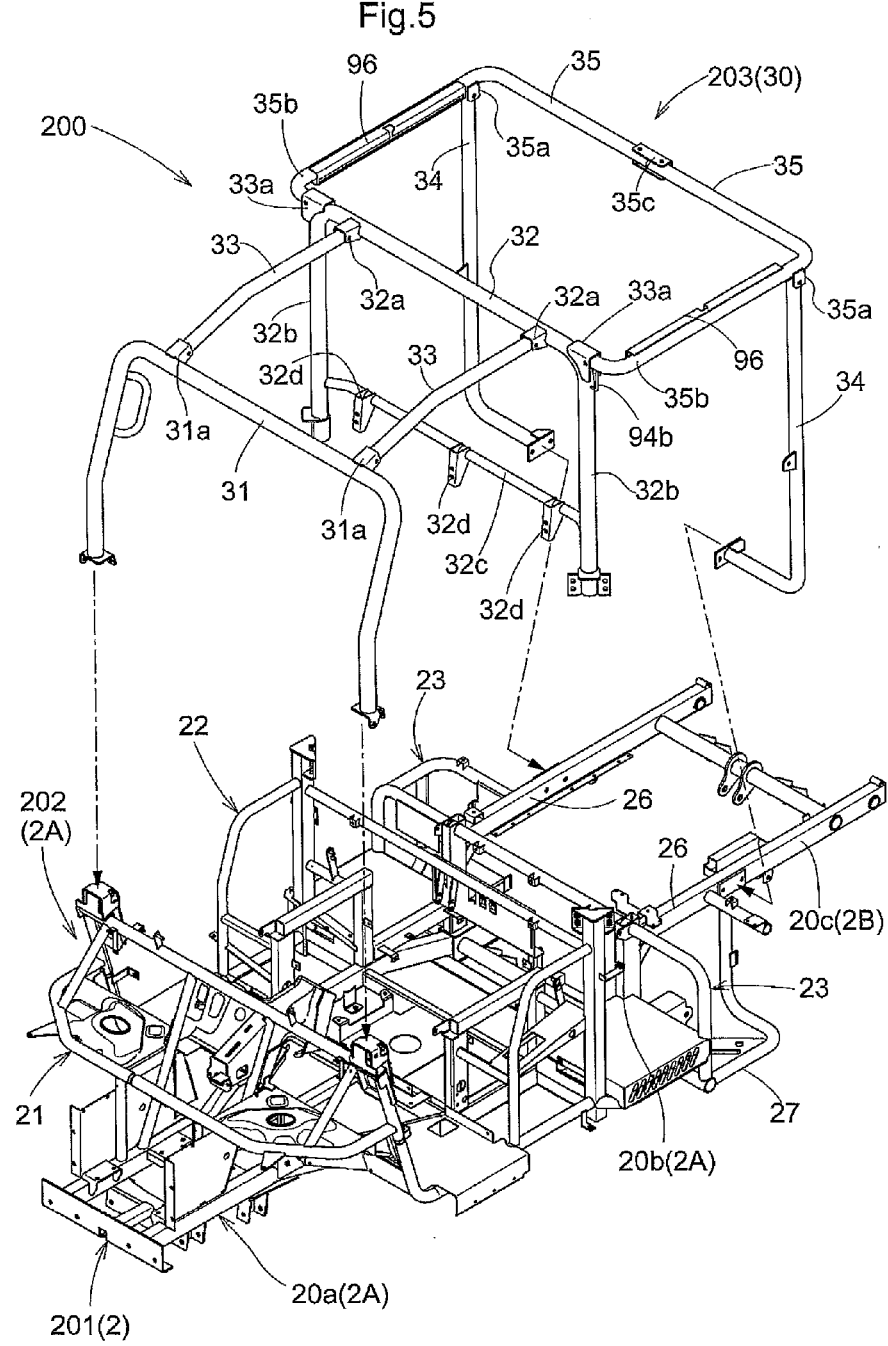
FIG. 5 a perspective view showing a vehicle body frame and a ROPS separated from each other, FIG. 6 a perspective view showing a first core member and a second core member separated from each other, FIG. 7 a perspective view showing disassembled condition of the ROPS, FIG. 8 a side view showing periphery of a load-carrying platform under its extended state, FIG. 9 a side view showing the periphery of the load-carrying platform under its contracted state, FIG. 10 a bottom view of the load-carrying platform under the extended state, FIG. 11 a rear view of the load-carrying platform, FIG. 12 a side view of the load-carrying platform under the extended state, FIG. 13A a detailed view illustrating connecting construction between a front bottom portion and a front side wall, FIG. 13B a detailed view illustrating connecting construction between a front bottom portion and a front side wall, FIG. 14A a detailed view illustrating connecting construction to a front wall portion, FIG. 14B a detailed view illustrating connecting construction to a front wall portion, FIG. 15A a side view in vertical section showing construction in the vicinity of a first lock device, FIG. 15B a side view in vertical section showing construction in the vicinity of a first lock device, FIG. 16A a detailed view showing construction in the vicinity of a second lock device, FIG. 16B a detailed view showing construction in the vicinity of a second lock device, FIG. 17A a schematic perspective view showing a switching state of a load-carrying platform, FIG. 17B a schematic perspective view showing a switching state of a load-carrying platform, FIG. 17C a schematic perspective view showing a switching state of a load-carrying platform, FIG. 18 a perspective view showing a ROPS and a partitioning member separated from each other, FIG. 19 a rear view showing the vicinity of the partitioning member, FIG. 20 a rear view showing the vicinity of the partitioning member, FIG. 21 a rear view in vertical section illustrating a supporting construction of a partitioning member upper portion, FIG. 22 a plan view in section showing the vicinity of the partitioning member, FIG. 23 a side view showing a forward position fixing mechanism for the partitioning member, FIG. 24 a horizontal section showing the forward position fixing mechanism for the partitioning member, FIG. 25A a horizontal section showing a rearward position fixing mechanism for the partitioning member, FIG. 25B a horizontal section showing the rearward position fixing mechanism for the partitioning member, FIG. 26 a plan view showing a drive unit, FIG. 27 a side view showing the vicinity of a radiator attaching portion, FIG. 28 a perspective view showing the radiator attaching portion, FIG. 29 a perspective view showing the radiator attaching portion, FIG. 30 a horizontal section showing the radiator attaching portion, FIG. 31 a section showing deck under space, FIG. 32A a schematic perspective view of a load-carrying platform according to a further embodiment, FIG. 32B a schematic perspective view of a load-carrying platform according to the further embodiment, FIG. 33 a side view of an entire tractor according to a further embodiment, showing a load-carrying platform in an extended state, FIG. 34 a side view of the tractor according to the further embodiment, showing a load-carrying platform in a contracted state, FIG. 35 a perspective view showing a vehicle body frame and a ROPS in a separated state, FIG. 36 a schematic perspective view of a container box according to a still further embodiment, FIG. 37A a schematic side view of a container box according to a still yet further embodiment, FIG. 37B a schematic side view of the same, FIG. 37C a schematic side view of the same, FIG. 38A a schematic side view of a container box according to another embodiment, FIG. 38B a schematic side view of the same, FIG. 38C a schematic side view of the same, FIG. 39A a schematic side view of a container box according to still another embodiment, FIG. 39B a schematic side view of the same, FIG. 39C a schematic side view of the same, FIG. 40A a schematic perspective view of a load-carrying platform according to a still another embodiment, showing the load-carrying platform in an extended state, and FIG. 40B a schematic perspective view of the load-carrying platform showing the load-carrying platform being changed from the extended state to a contracted state.
Figure 6:
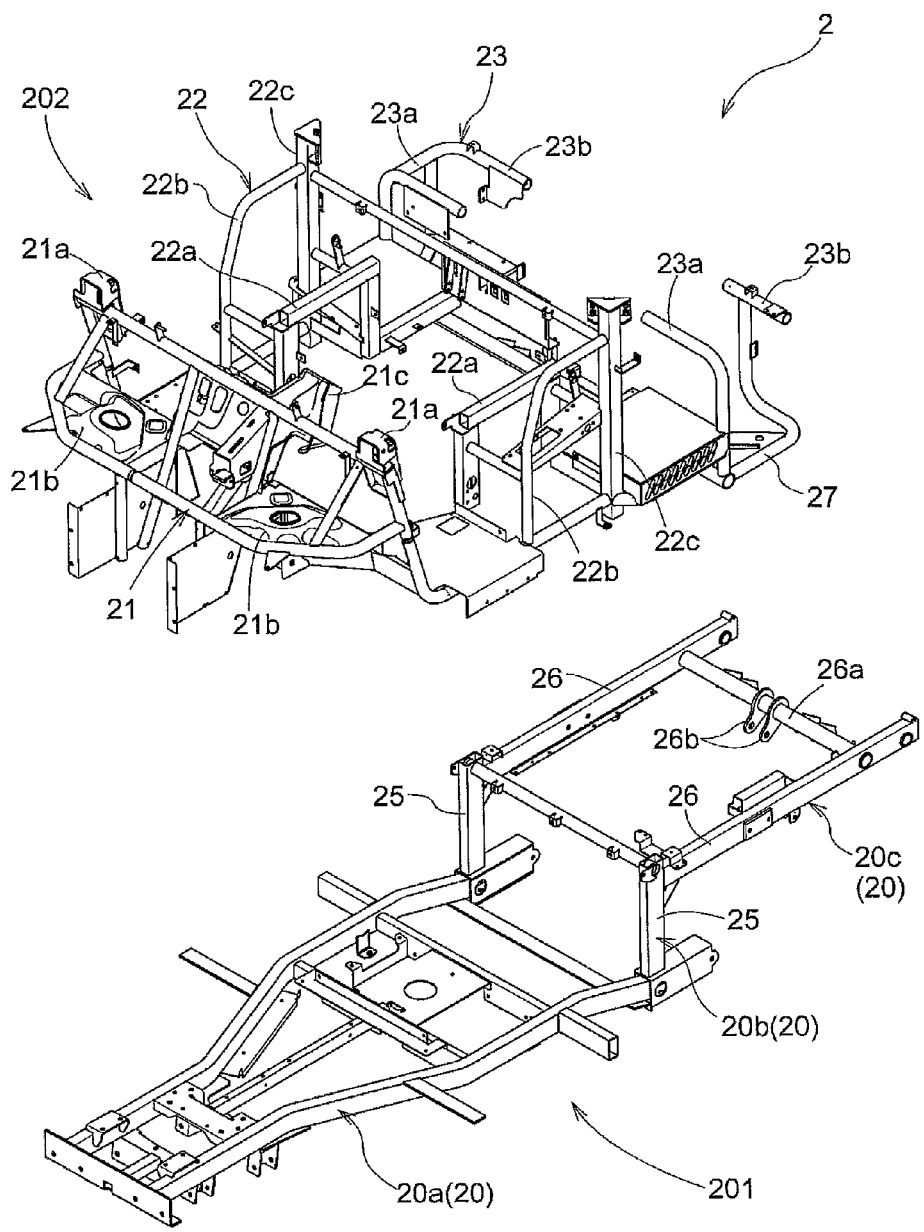

This vehicle body core portion 200, as shown in FIGS. 4-6, includes a first core member 201 comprised mainly of main frames 20, a second core member 201 assembled integrally to the first core member 201, and a third core member 203 comprised of the ROPS 30. And, the first core member 201 and the second core member 202 as combined together constitutes the vehicle body frame 2.

The first core member 210, as shown in FIG. 6, comprises the right and left main frames 20 formed of angular pipes elongate in the fore/aft direction and brackets for attachment of various instruments.

The main frames 20 include a pair of right and left main frame front portions 20a positioned on the front side of the vehicle body and along the fore/aft direction of the vehicle body, main frame rising portions 20b rising from the rear ends of the main frame front portions 20a, and main frame rear portions 20c extending rearward from the upper ends of the main frame rising portions 20b, so that the main frames are bent substantially in the form of cranks as viewed sideways.

The main frame rising portions 20b are comprised of rear seat supporting frames 25 extending upward from the rear ends of the main frame front portions 20a. And, load-carrying platform supporting frames 26 extending rearward from the upper portions of the rear seat supporting frames 25 constitute the main frame rear portions 20c. The rear wheels 4 are supported and connected via rear suspensions 4a mounted between the rear ends of the main frame front portions 20a and the main frame rear portions 20c.

The second core member 202, as shown in FIG. 6, includes front wheel supporting frames 21 supporting a steering wheel 12 and the right and left front wheels 3, driver's seat constituting frames 22 on which the driver's seat 13 is provided, front deck plates 28 forming the floor face of the passenger's section 5 on the front side of the driver's seat 13 and rear deck plates 29 forming the floor face of the passenger's section 5 on the front side of the rear seat 14.

The front wheel supporting frames 21 include front post receiving portions 21a of the ROPS 30 upwardly of the right and left opposed ends thereof, front wheel supporting portions 21b independently suspending and supporting the front wheels 3 via suspension spring receiving portions provided on the front side of the right and left opposed ends, and a steering wheel supporting portion 21c provided on the upper side of the right/left center portion for the steering wheel 12 for steering the front wheels 3.

The driver's seat constituting frames 22 include seat supporting portions 22a having a portal shape upwardly of the respective upper sides of the right and left main frames 20, pipe frames 22b acting also as grips for passengers, extending upward from opposed sides of the rear portions of the front wheel supporting frames 21 at positions offset to the opposed sides in the right/left direction, and angular pipe-like supporting frames 22c provided on the rear sides of the front wheel supporting frames 21 and extending upward from the opposed sides of the rear portion of the driver's seat 13.

The rear seat constituting frames 23 comprise rear seat supporting frames 25 formed of the main frame rising portions 26b, front edge supporting frames 23a supporting the rear seat 14 in cooperation with the front ends of the load-carrying platform supporting frames 26 and supporting the front edges of a rear seating portion 14a of the rear seat 14, and rear edge supporting frames 23b supporting the rear edges of the rear seating portion 14a. Further, the front edge supporting frames 23a and the rear edge supporting frames 23b are supported at the under sides thereof, by right and left lateral frames 27 formed of frame-like round pipes connected between the right and left main frame front portions 20a and the right and left main frame rear portions 20c.

A front cover 10 is attached to the front portion of the vehicle body 1. This front cover 10 includes an upper cover 10a covering from above the front wheel supporting frames 21 disposed at front portions of the vehicle body 1, and an under cover 10b for covering the front portion of the vehicle body 1 from the front and lateral sides thereof. To a rear portion of the front cover 10, there is attached a control panel 11 covering the front face side of the passenger's section 5, and from the left side of this control panel 11, there is extended the steering wheel 12 for steering the right and left front wheels 3.

The driver's seat constituting frames 22 are covered by a box-like front seat supporting panel 24, to which the driver's seat 13 is fixed. The driver's seat 13 includes a front seating portion 13a fixed to the front portion of the front seat supporting panel 24, and a seat back portion 13b fixed to a reinforcing frame 32c for bridging to an intermediate post 32 of the ROPS 30 to be described later.

On the upper face sides of the main frame front portions 20a provided on the front side of the driver's seat constituting frames 22, the front deck plates 28 are fixed, which plates form the floor faces of the front portion of the passenger's section 5. Further, on the upper face sides of the main frame front portions 20a on the front side of the rear seat constituting frames 23 and the rear seat supporting frames 25, the rear deck plates 29 are fixed, which plates form the floor faces of the rear portion of the passenger's section 5.

To the upper portions of the rear seat constituting frames 23 and the rear seat supporting frames 25, the rear seat 14 is attached. The rear seat 14 includes a rear seating portion 14a supported to the upper ends of the rear seat supporting frames 25 to be pivotable back and forth, and the seat back portion 14b fixed to the front face of the partitioning member 90 to be described later.

With the above-described construction, the vehicle body frame 2 comprises the combination of the first core members 201 consisting mainly of the main frames 20 and the second core members 202 mounted to and integrally assembled with the upper portions of the first core members 201.

Further, in this vehicle body frame 2, the front frame portions 2A comprises the main frame front portions 20a disposed on the front side in the longitudinal direction of the main frames 20, the main frame rising portions 20b, and the second core members 202. And, the main frame rear portions 20c comprised of the load-carrying platform supporting frames 26 constitute the rear frames 2B.

{ROPS and Construction Relating Thereto}

For the vehicle body frame 2 constructed as above, the ROPS 30 will be attached thereto in the manner described below, to constitute together the vehicle body core portion 200.

Figure 7:
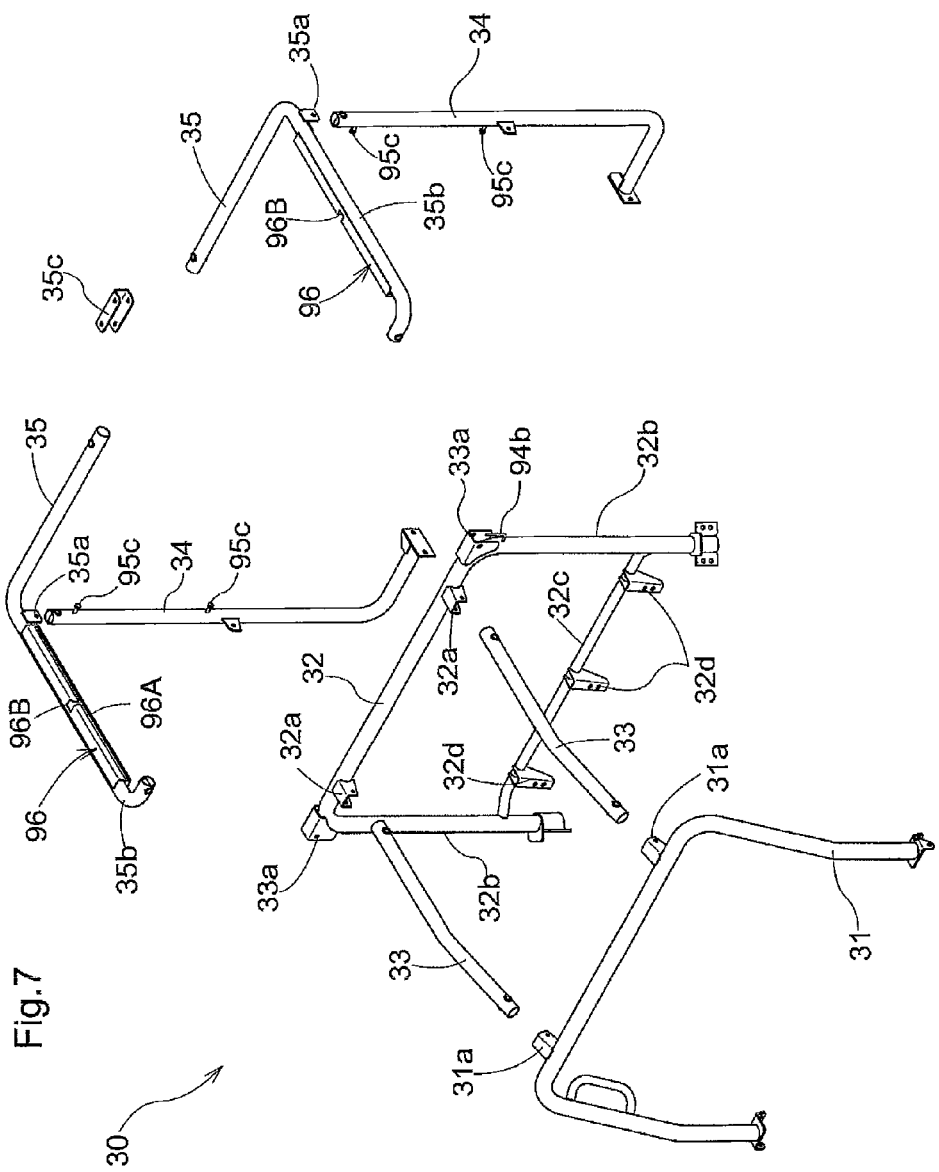

The ROPS 30, as shown in FIG. 5 and FIG. 7, includes a front post 31, the intermediate post 32 and right and left rear posts 34, thus being constructed as 6-post structure. At right and left opposed ends in the upper portion of the front wheel supporting frames 32, right and left front post receiving portions 21a are fixed and between these right and left front post supporting portions 31a, the front post formed of a round pipe is fixed. And, between and across the upper portions of the right and left support frames 22c of the driver's seat constituting frame 22, the intermediate post 32 formed of a round pipe is fixed.

To right and left opposed ends of the upper portions of the front post 31, there are fixedly attached right and left first brackets 31a. And, at right and left opposed ends of the upper portions of the intermediate post 32, there are fixedly attached right and left second brackets 32a which are forwardly oriented. Between the right and left first brackets 31a and the right and left second brackets 32a, right and left upper front frames 33 formed of round pipes are fastened and fixed. Between lower portions of vertical frame portions 32b of the right and left intermediate posts 32, a reinforcing frame 32c is fixed. This reinforcing frame 32c functions as a grip for a passenger seated at the rear seat 14.

To the reinforcing frame 32c, attaching brackets 32d are fixed. And, on the front side of the attaching brackets 32d, the seat back portion 13b of the driver's seat 13 is fastened and fixed (see FIG. 20).

The upper rear frame 35 is formed of a round pipe and the front portions of this upper rear frame 35 are detachably attached and fastened to downwardly oriented right and left third brackets 33a The right and left third brackets 33a are fixedly attached to right and left ends of the upper portion of the intermediate post 32.

From the left side face of the left load-carrying platform supporting frame 26, a left rear post 34 formed of a round pipe detachably extends to the left side and upwards. From the right side face of the right load-carrying platform supporting frame 26, a right rear post 34 formed of a round pipe detachably extends to the right side and upwards. At the right and left opposed ends of the rear portions of the upper rear frames 35, downwardly oriented fourth brackets 35a are fixed. And, to these right and left fourth brackets 35a, the upper ends of the right and left rear posts 34 are detachably attached and fixedly fastened.

To the lower portions of the right and left rear posts 34, armrests 34a are attached, with the armrests 34a being pivotally raised about a horizontal axis (x). The armrest is switchable between a collapsed posture to be usable as an armrest as shown by a solid line in FIG. 20 and a raised state for storage as shown by a virtual line in the same figure.

The rear posts 34 and the upper rear frames 35 are detachably attached. Therefore, if the right and left rear posts 34 are detached from the right and left load-carrying platform frames 26 and the upper rear frames 35 are detached from the intermediate post 32, the 6-post type ROPS 30 can be used as a 4-post type ROPS.

Further, as shown in FIG. 7, this ROPS 30 is configured such that the front support posts 31, the intermediate post 32, the rear posts 34, the upper front frames 33 and the upper rear frames 35 can be respectively disassembled and the upper rear frames 35 can be divided into two in the right/left direction also to be detachable via an intermediate joint 35c.

[Construction of Load-Carrying Platform]

With reference to FIGS. 8 through 12, the construction of the load-carrying platform 40 will be described next.

Figure 8:
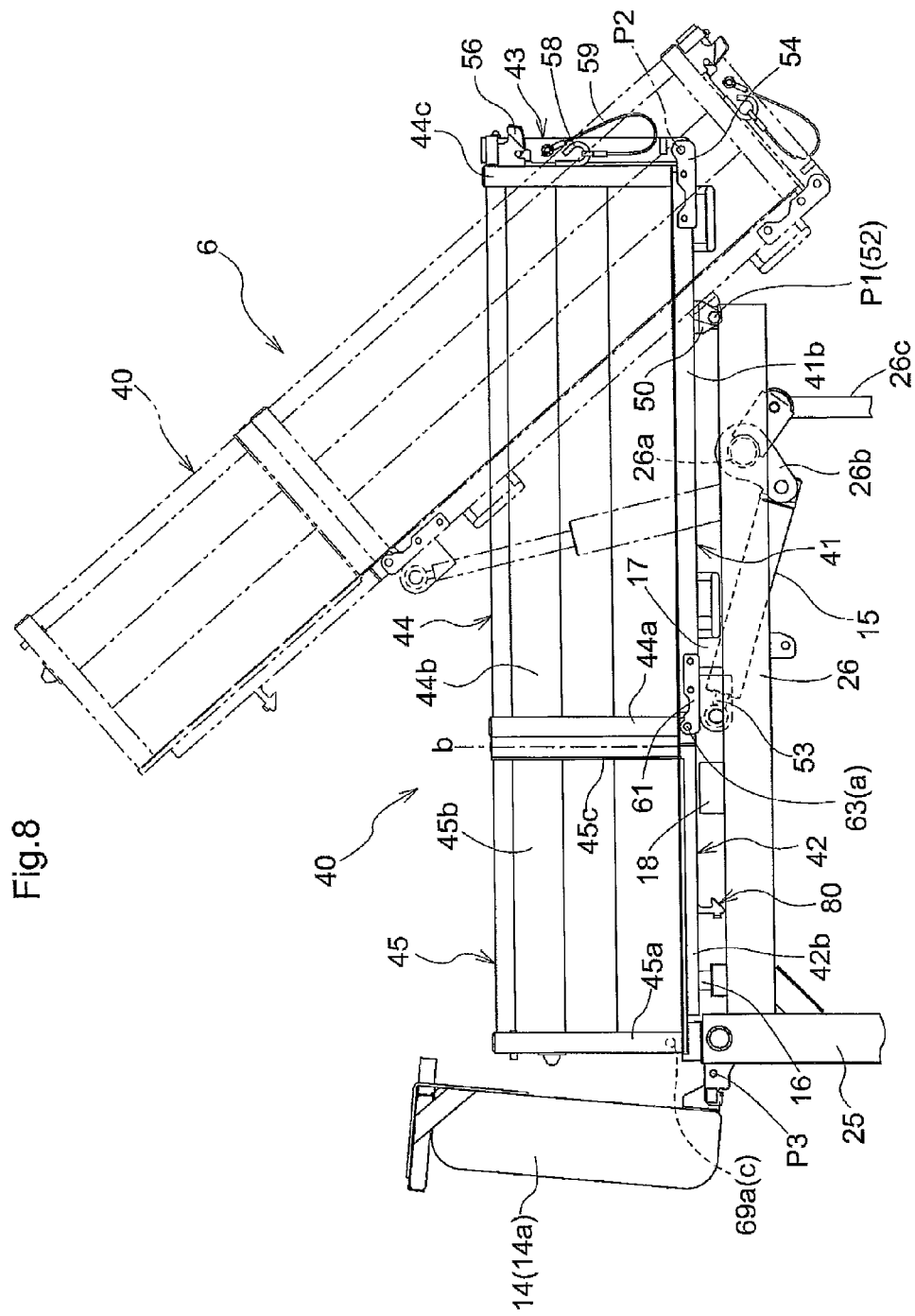
Figure 9:
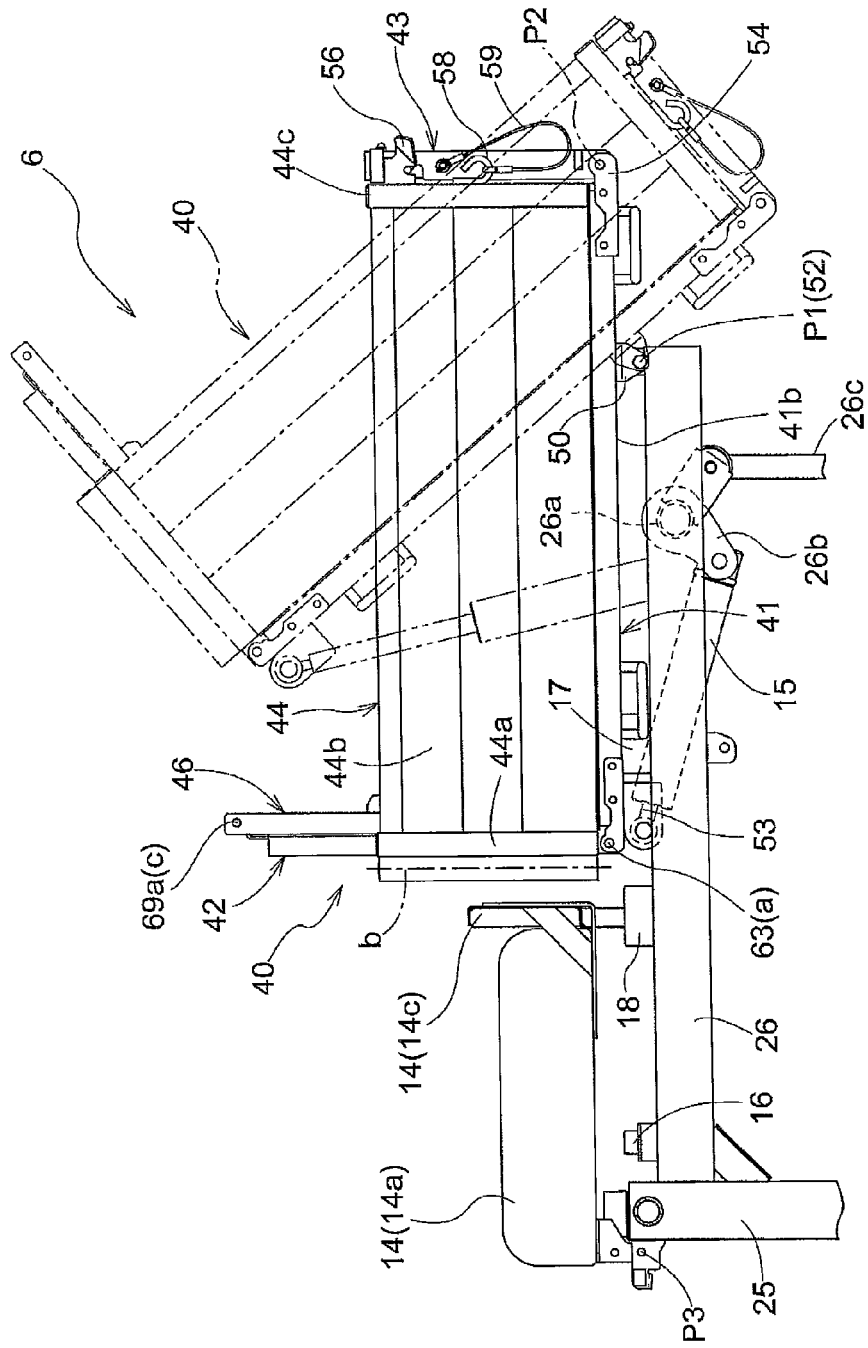

FIG. 8 is a side view showing the vicinity of the load-carrying platform 40 under an extended state thereof to be described later. FIG. 9 is a side view of the vicinity of the load-carrying platform 40 under a contracted state thereof to be described later. FIG. 10 is a bottom view of the load-carrying platform 40 under the extended state (view of the load-carrying platform 50 as seen from the underside thereof). FIG. 11 is a rear view of the load-carrying platform 40. FIG. 12 is a side view of the front portion of the load-carrying platform 40 under the extended state to be described later.

Figure 13A:
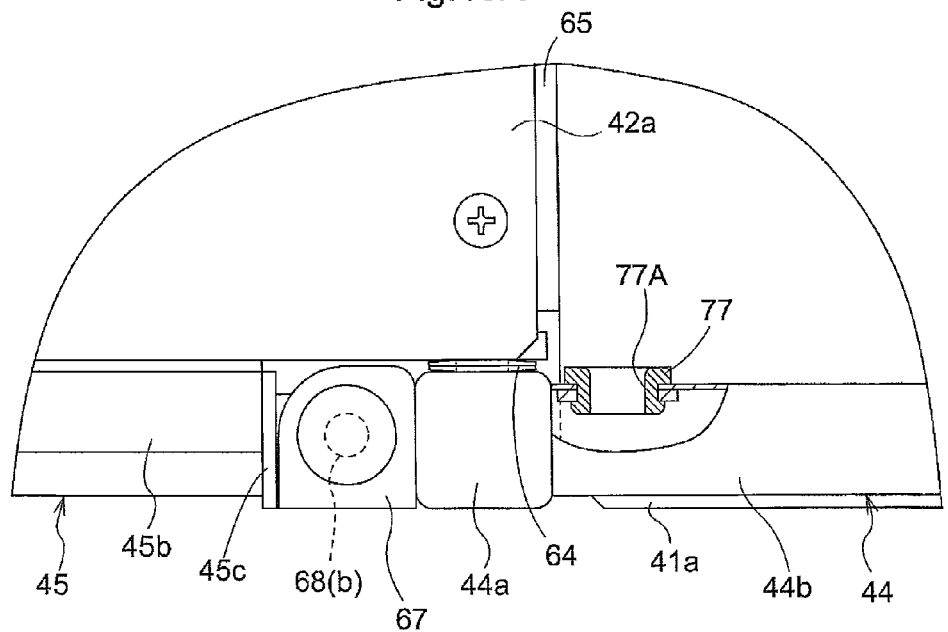
Figure 13B:
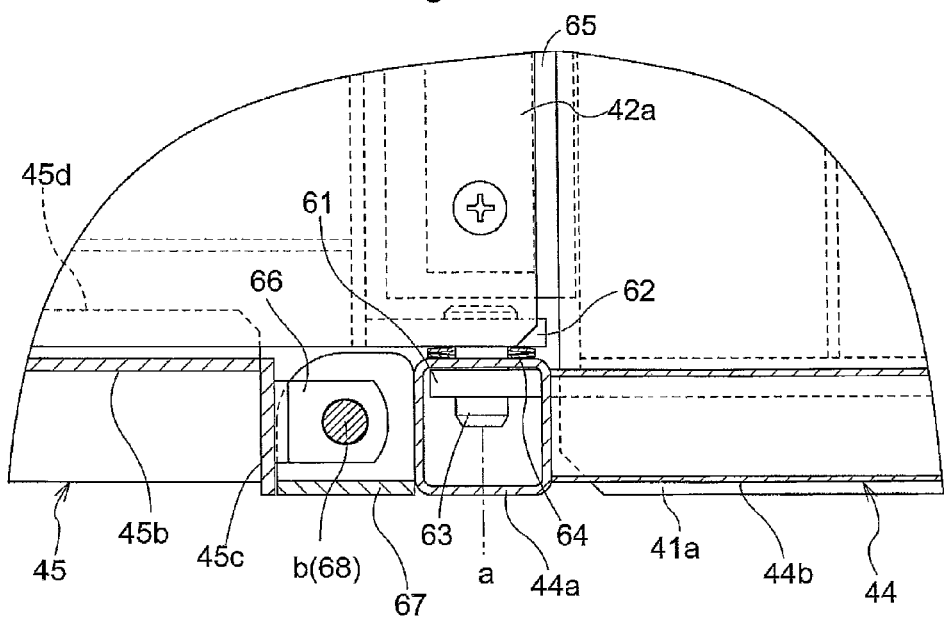
Figure 14A:
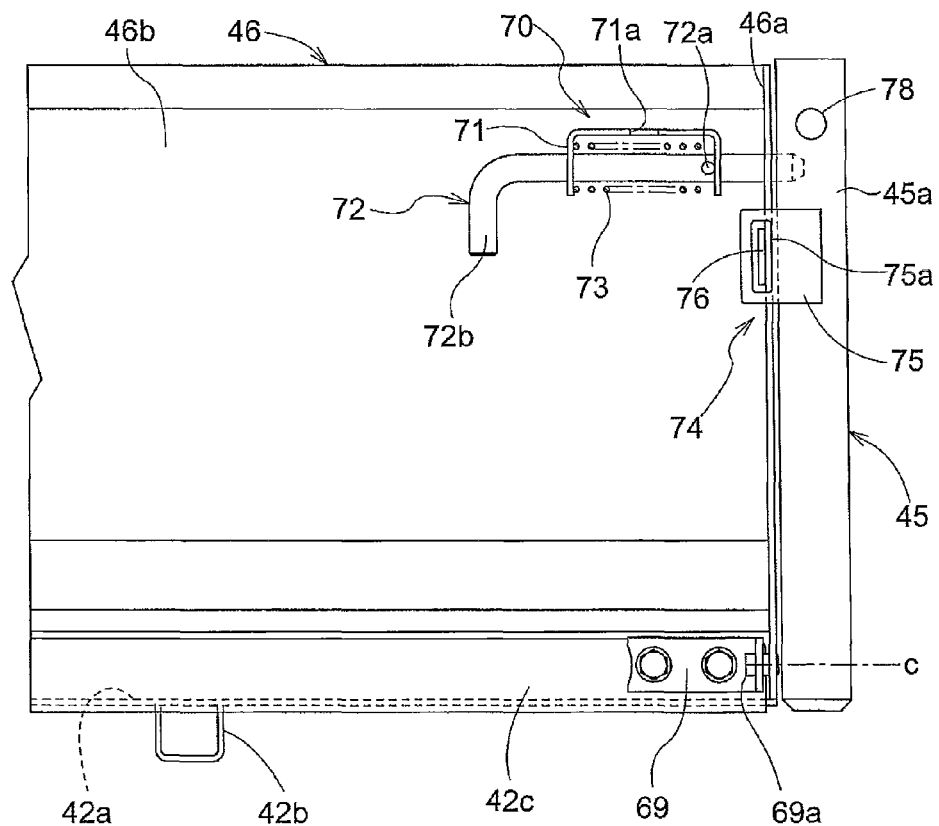
Figure 14B:
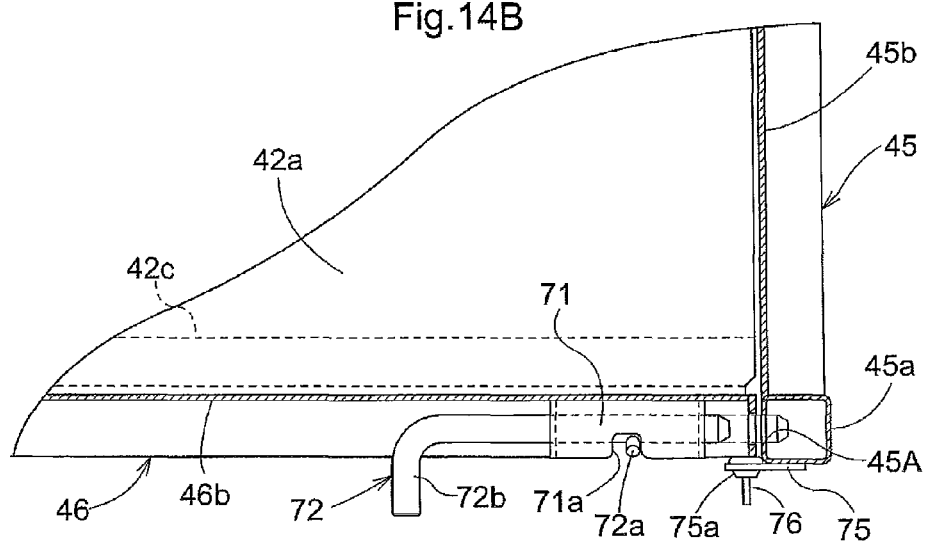

FIG. 13 is a detailed view illustrating the connecting construction between a front bottom portion 42 and a front side wall 45. FIG. 13A is a plan view of the connecting portion between the front bottom portion 42 and the front side wall 45. FIG. 13B is a plan view in horizontal section showing the connecting portion between the front bottom portion 42 and the front side wall 45. FIG. 14 are detailed view illustrating the connecting construction of the front wall portion 46, with FIG. 14A being a front view of the connecting portion of the front wall portion 46, FIG. 14B being a plan view of the connecting portion of the front wall portion 46.

Figure 16A:
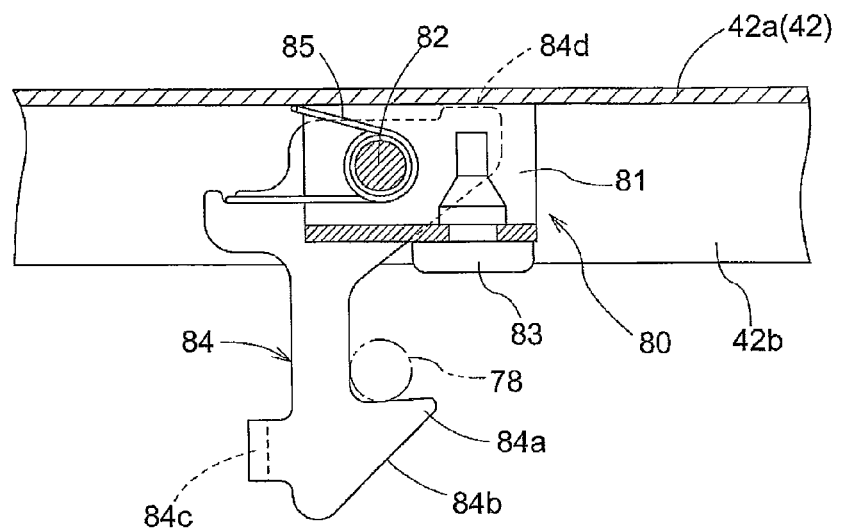
Figure 16B:
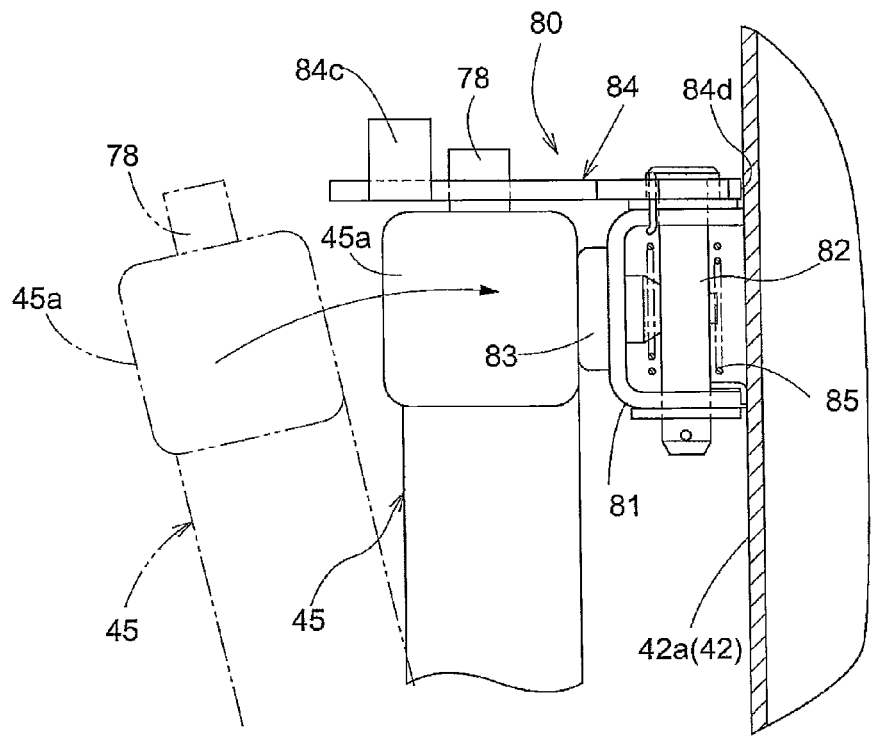

FIG. 15 are side views in vertical section showing the vicinity of a first lock device 70 (as seem from the inner side thereof). FIG. 15A is a side view in vertical section showing the first lock device 70 under its locking state; whereas FIG. 15B is a side view showing the first lock device 70 under its lock releasing state. FIG. 16 are detailed views showing the vicinity of a second lock device 80. FIG. 16A is a side view in vertical section showing the second lock device 80 of the load-carrying platform 40 under its extended state; whereas FIG. 16B is a side view showing the second lock device 80 of the load-carrying platform 40 under its contracted state.

As shown in FIG. 8 and FIG. 9, the load-carrying platform 40 includes a rear bottom portion 41 for loading a load, a front bottom portion 42 for loading a load, a rear wall portion 43 forming the rear face of the load-carrying platform 40, and a front wall portion 46 forming the front face of the load-carrying platform 40. With this, the load-carrying platform 40 is switchable in its posture between the extended state (first state) shown in FIG. 8 wherein the front portion (the front wall portion 46, the front side wall portion 45 and the front bottom portion 42) of the load-carrying platform 40 is displaced forwardly to present an extended total length and a contracted state (second state) shown in FIG. 9 wherein the front portion (the front wall portion 46, the front side wall portion 45 and the front bottom portion 42) of the load-carrying platform 40 is displaced rearwardly to present a reduced total length.

As shown in FIG. 8, FIG. 10 and FIG. 11, the rear bottom portion 41 is formed by fixedly attaching a plurality of frames to the lower face side of the rear deck plate 41a, On the side of the upper face of the rear deck plate 41a, there is formed a flat deck face without unevenness for mounting a load thereon. At right and left opposed side portions on the side of the lower face of the rear deck plate 41a, there are formed right and left loading rear frames 41b elongate in the fore/aft direction and to the rear portions of these right and left loading rear frames 41b, there are fixedly attached hinges 50 in the form of vertical plates.

At an upper portion of the rear portion of the loading support frame 26, there is fixedly attached a bracket 51, and this bracket 51 supports the hinge 50 via a hinge pin 52 to be pivotable about a right/left axis P1.

At the right/left center of the front end portion of the rear bottom portion 41, there are fixedly attached a pair of right and left rod side brackets 53. Between and across the right and left load-carrying platform supporting frames 26, a supporting frame 26a formed of a round pipe member is fixedly attached. And, at the right/left center of this supporting frame 26a, there are fixedly attached a pair of right and left tube side brackets 26b (see FIG. 3).

At the right and left opposed ends of the supporting frame 26a, there are connected right and left rear supporting frames 26c. This right/left rear supporting frame 26c is bent in an L-shape and its front portion extends downwardly and forwardly to be connected to e.g. the main frame front portion 20c of the right/left main frame 20.

On the side of the upper face of the front end of the right/left load-carrying platform supporting frame 26, there is fixed a front supporting member 16 formed of rubber or resin. When the load-carrying platform 40 is lowered under the extended state, a load-carrying platform front frame 42b to be described later is supported to the front supporting member 16, so that the front portion of the load-carrying platform 40 under the extended state is supported to the load-carrying platform supporting frame 26. On the side of the upper face of the fore/aft center of the right and left load-carrying platform supporting frames 26, there is fixed a rear supporting member 17 formed of rubber or resin. When the load-carrying platform 40 is lowered under the extended state and the contracted state, the load-carrying platform rear frame 41b is supported to the rear supporting portion 17, so that the fore/aft center portion of the load-carrying platform 40 under the extended state and the front portion of the load-carrying platform 40 under the contracted state is supported to the load-carrying platform supporting frame 26.

On the side of the upper face of the front portions of the right and left load-carrying platform supporting frame 26, there is fixed a seat supporting member 18. By this seat supporting member 18, the rear portion of the rear seating portion 14b under a collapsed state to be described later is supported. The heights of the upper ends of the front and rear supporting members 16, 17 are set same each other, whereas the height of the upper end of the seat supporting member 18 is set lower than the height of the front and rear supporting members 16, 17. With this arrangement, a predetermined gap is formed between the upper face side of the seat supporting member 18 and the load-carrying platform front frame 42b.

Between the rod side brackets 53 and the tube side brackets 26b, there is mounted a hydraulic lift cylinder 15 for lifting the load-carrying platform 40 up/down. The lifting cylinder 15 comprises a double-acting type cylinder and the piston rod side and the piston head side thereof are connected to an operational valve via a hydraulic circuit. With this, when a load-carrying platform lifting lever or a load-carrying platform lifting switch (not shown) provided in the passenger's section 5 is operated to feed pressure oil to the piston head side from the operational valve, the lifting cylinder 15 is extended to lift up the load-carrying platform 40. Conversely, when the load-carrying platform lifting lever or the load-carrying platform lifting switch provided in the passenger's section 5 is operated to feed pressure oil to the piston rod side, the lifting cylinder 15 is contracted to lower the load-carrying platform 40.

A right/left rear side wall portion 44 is constructed by fixedly attaching a rear side panel 44b formed bent to and between a load-carrying platform front supporting post 44a in the form of an angular pipe and a load-carrying platform rear supporting post 44c in the form of an angular pipe. The right and left rear side wall portions 44 are fixed to the upper face side of the right and left opposed ends of the rear deck plate 41a.

At the rear end of the rear bottom portion 41, right and left brackets 54 are fastened and fixed. At the rear end of the bracket 54, there is supported a rear wall portion 43 to be pivotally opened/closed about a right/left oriented axis P2.

To the upper portions of the right and left opposed sides of the rear wall portion 43, there is supported an opening/closing lever 55 to be pivotable about the fore/aft axis. To an upper portion of the load-carrying platform rear post 44c of the rear side wall portion 44, there is fixed a metal tool 56 engaged with a locking portion 55a of the opening/closing lever 55. Between and across the opening/closing lever 55 and the rear wall portion 43, there is attached an elastic spring 57. And, by this elastic spring 57, the locking portion 55a of the opening/closing lever 55 is urged to the side for engagement with the metal tool 56. In operation, by pivotally operating an operational portion 55b of the opening/closing lever 55 against the urging force of the elastic spring 57, the rear wall portion 43 can be pivotally and upwardly opened/closed to the rear side.

To the load-carrying platform support post 44c of the rear side wall portion 44, a hook 58 is fixed. And, to a lateral side of the rear portion wall 43, one end of a wire 59 is supported to be pivotable about a right/left oriented axis. With this, if the rear wall portion 43 is pivoted to the rear side with the other end of the wire 59 being hooked to the hook 58, the wire 59 restricts the downward pivotal range of the rear wall portion 43, so that the face of the rear wall portion 43 and the deck face of the rear deck plate 41a may be maintained flush with each other. Conversely, if the rear wall portion 43 is pivoted to the rear side with the other end of the wire 59 being removed from the hook 58, the rear wall portion 43 is rendered into a downwardly suspended state.

The front bottom portion 42 is formed by fixedly attaching a plurality of frames to the lower face of the front deck plate 42. And, on the side of the upper face of the front deck plate 42a, there is formed a flat and uneven deck face flush with the rear deck plate 41a for mounting a load. At right and left sides on the side of the lower face of the front deck plate 42a, there are fixedly attached load-carrying platform front frames 42b elongate in the fore/aft direction. The right and left load-carrying platform front frames 42b are disposed at same right/left positions as the right and left load-carrying platform rear frames 41b and the height of the lower faces of the right and left load-carrying platform front frames 42b are set same as the height of the lower faces of the right and left rear frames 41b.

As shown in FIG. 10, FIG. 12 and FIG. 13, at right and left opposed ends of the front portion of the rear bottom portion 41, there are fastened and fixed right and left brackets 61 in the form of vertical plates. At the right and left ends of the rear portion of the front bottom portion 42, there are fixed brackets 62 in the form of vertical plates The right/left bracket 62 of the front bottom portion 42 is supported by a pin 63 via a plate spring 64 to the bracket 61 on the side of the rear bottom portion 41 to be pivotable about a right/left oriented axis (a). With this, the front bottom portion 42 is supported to the front end of the rear bottom portion 41 to be vertically pivotable about the right/left oriented axis (a).

To the lower face at the rear end of the front deck plate 42a, there is fixed a plate-like member 65 in the form of a band plate elongate in the right/left direction. To the lower face of the right/left front side wall portion 45, there is fixed a plate-like member 45d in the form of a band plate elongate in the fore/aft direction. With this, in case the front bottom portion 42 is moved from the raised state to the forwardly pivoted state of the front bottom portion 42 pivoted about the right/left axis (a), the plate-like member 65 comes into contact with the front lower face of the rear deck plate 41a and the right and left opposed ends of the front deck plate 42a come into contact with the upper faces of the right and left plate-like members 45d and the upper face of the front deck plate 42a is fixed in position flush with the upper face of the rear deck plate 41a.

In this case, the gap between the rear end of the front deck plate 42a and the front end of the rear deck plate 41a is closed by the plate-like member 65 and the gap between the front deck plate 42a and the front side wall portion 45 is closed by the plate-like member 45d, thus preventing dropping of the load through these gaps.

The front side wall portion 45 is formed by fixedly attaching a front side panel 45b formed bent, between the front support post 45a in the form of an angular pipe and the rear frame 45c in the form of vertical flat plate. To the rear face of the rear frame 45c of the front side wall portion 45, there are fixed upper and lower brackets 66. To the front face of the load-carrying platform front support post 44a of the rear side wall portion 45, there is fixed a frame 67 having upper and lower ends thereof bent inward. To this frame 67, the upper and lower brackets 66 fixed to the rear frame 45c are supported by the pins 68 to be pivotable about a vertical axis (b). With this, the front side wall portion 45 is supported to the front end of the rear side wall portion 44 to be pivotable to the right or left about the vertically oriented axis (b).

As shown in FIG. 12 and FIG. 14, the front wall portion 46 is formed by fixedly attaching a front panel 46b formed bent, between right and left vertical flat plate-like side frames 46a. The lower end of the side frame 46a is formed downwardly longer than the front panel 46b.

To the front end of the front deck plate 42a, there is fixedly attached a bracket 42c having an L-like vertical sectional shape, and to right and left opposed ends of this frame 42c, there are fixed brackets 69 having L-like cross sectional shape. To the bracket 69, there is fixedly attached a right/left oriented pin 69a and to this pin 69a, the lower end of the side frame 46a is supported to be pivotable about a right/left oriented axis (c). With this, the front wall portion 46 is supported to the front end of the front bottom portion 42 to be pivotable back and forth about the right/left oriented axis (c).

As shown in FIG. 14 and FIG. 15, at the upper portion of the right and left opposed ends of the front wall portion 46, there is mounted a first lock device 70 for fixing the front wall portion 46 to the right and left front side wall portions 45. The first lock device 70 includes a bracket 71, an operational tool 72 and an elastic spring 73. The bracket 71 has a lower-side opened rectangular shape in its front view and is fixedly attached to the front panel 46b of the front wall portion 46. The bracket 71 defines a right/left oriented through hole, in which the operational tool 72 is engaged.

At an upper portion of the front support post 45a of the front side wall portion 45, thee is formed a right/left oriented lock hole 45A, and the leading end of the operational tool 72 is inserted into this lock hole 45A. With this, by the engagement between the leading end of the operational tool 72 and the lock hole 45A, the upper portions of the right and left opposed ends of the front wall portion 46 are supported to the right and left front side wall portions 45.

To the operational tool 72, there is fixed a bar-like positioning member 72a. And, between this positioning member 72a and the bracket 71, there is mounted the elastic spring 73 for urging the operational tool 72 to the lateral outer side. In the upper face of the bracket 71, there is formed a hole portion 71a opened to the front side. When the operational portion 72b of the operational tool 72 is pulled inward against the urging force of the elastic spring 73, the operational portion 72b of the operational tool 72 is upwardly pivoted to bring the positioning member 72a into engagement with the hole portion 71b of the bracket 71, the operational tool 72 can be maintained under the state of being pulled inward (the lock release state of the first lock device 70).

When the leading end of the operational tool 72 is fixedly positioned in the lock hole 45A of the front support post 45a and from the state of the positioning member 72a being engaged with the hole portion 71b of the bracket 71, the operational portion 72b of the operational tool 72 is pivoted downward, then, the leading end of the operational tool 72 is engaged into the lock hole 45A of the front support post 74a under the urging force of the elastic spring 73, so that the upper portions of the right and left opposed ends of the front wall portion 46 are supported to the right and left front side wall portions 45 (the lock state of the first lock device 70).

Downwardly of the first lock device 70, there is mounted a positioning mechanism 74. This positioning mechanism 74 includes a plate-like member 75 fixed to the front face of the front support post 45a, and an engaging piece 76 fixed to the side frame 46a of the front wall portion 46. To the plate-like member 75, there is inserted and attached an engaging member 75a formed of resin. And, this engaging member 75a defines a hole portion which engages with the engaging piece 76.

If the front wall portion 46 is pivoted upward to be erect from its state where the portion 46 is rearwardly collapsed about the right/left oriented axis (c), the engaging piece 76 fixed to the front wall portion 46 enters the hole portion of the engaging member 75a fixed to the front side wall portion 45, whereby the front wall portion 46 and the font side wall portion 45 are fixed in position relative to each other in the right/left direction. In this case, as an inclined portion 76a is formed at the leading end of the engaging piece 76, the leading end of the engaging piece 76 as being guided by this inclined portion 76a, will smoothly enter the hole portion of the engaging piece 75a.

Further, as the front end of the side frame 46a of the front wall portion 46 comes into contact with the rear face of the engaging member 75a, the front wall portion 46 and the front side wall portion 45 are fixed in position relative to each other in the fore/aft direction. This allows accurate positioning between the position of the front end of the operational tool 72 and the position of the lock hole 45A of the front support post 45a.

For instance, when a load is mounted on the load-carrying platform 40 and there is generated a force which pivots the front portion of the front side wall portion 45 to the lateral outer side about the vertically oriented axis (b), this force can be born by the engagement between the plate-like member 75 and the engaging piece 76. Further, when a load is mounted on the load-carrying platform 40 and there is generated a force which pivots the upper portion of the front wall portion 46 to the front side about the right/left oriented axis (c), this forward pivoting force can be born by the contact between the front end of the lateral frame 46a and the rear face of the engaging member 75a. With this, as the positioning member 74 acts also as a connection reinforcing member between the front wall portion 46 and the front side wall portion 45, the strength of the load-carrying platform 40 can be improved.

As shown in FIG. 12 and FIG. 13, at a front upper portion of the rear side panel 44b of the rear side wall portion 44, there is defined a right/left oriented through hole, and a boss member 77 formed of resin is engaged in this through hole. The boss member 77 defines a right/left oriented lock hole 77A and the inner diameter of this lock hole 77A is set to allow smooth engagement therein of the leading end of the operational tool 72. The position of the boss member 77 (lock hole 77A) is set such that when the front bottom portion 42 is raised together with the front wall portion 46, the leading end of the operational tool 72 enters the lock hole 77A and the front bottom portion 42, together with the front wall portion 46, is raised substantially perpendicular.

With the above, the first lock device 70 for fixing the front wall portion 46 to the right and left front side wall portions 45 under the extended state of the load-carrying platform 40, can be used also as a lock device for fixing the front wall portion 46 and the front bottom portion 42 to the rear side wall portion 44.

As shown in FIG. 10 and FIG. 12, on the lower face side at right and left opposed ends of the front deck plate 42a, there is mounted a second lock device 80 for fixing inner end of the front side wall portion 45 to the front bottom portion 42, with this front bottom portion 42 being raised rearward and the front side wall portion 46 being folded to the inner side of the vehicle body.

As shown in FIG. 16A, the second lock device 80 includes a bracket 81, a support shaft 82, a pivot arm 84 and an elastic spring 85. To the lower face of the front deck plate 42a, the bracket 81 is fixedly attached. The bracket 81 defines a right/left oriented through hole and in this through hole, the support shaft 82 is engaged. The bracket 81 defines a vertically oriented attaching hole and in this attaching hole, a cushioning member 83 formed of rubber or resin is engaged and fitted.

At the right end of the support shaft 82, the pivot arm 84 in the form of a flat plate is supported to be pivotable about the right/left oriented axis of the support shaft 82. Between the front deck plate 42a and the pivot arm 84, there is attached the elastic spring 85 fitted on the support shaft 82. By this elastic spring 85, the pivot arm 84 is urged counter-clockwise in the plane of the FIG. 16A about the axis of the support shaft 82.

At an upper portion of the front support post 46a of the front side wall portion 46, there is fixedly attached a fore/aft oriented lock pin 78 (see FIG. 15). At the lower section of the pivot arm 84, there are formed an engaging portion 84a engageable with the lock pin 78 of the front support post 45a, a guiding portion 84b inclined rearwardly and upwardly for guiding the lock pin 78 of the front support post 45a, and an operational portion 84c bent inward from the pivot arm 84. At the upper section of the pivot arm 84, there is formed a contacting portion 84d which comes into contact with the front deck plate 45a, thereby to restrict the pivotal range of the pivot arm 84.

As the contacting portion 84d comes into contact with the lower face of the front deck plate 45a under the urging force of the elastic spring 85, the pivot arm 84 is pivotable from the state shown in FIG. 16A, counter clockwise in the plane of the FIG. 16A about the axis of the support shaft 82.

As shown in FIG. 16B, if the front side wall portion 45 is folded to the inner side of the vehicle body with the front bottom portion 42 being raised rearwardly, the lock pin 78 of the front side wall portion 45 comes into contact with the guiding portion 84b of the pivot arm 84, so that the pivot arm 84 is pivoted upward about the right/left oriented axis of the support shaft 82. And, when the lock pin 78 of the front side wall portion 45 is displaced further rearward, under the urging force of the elastic spring 85, the pivot arm 84 is pivoted downward about the right/left oriented axis of the support shaft 82, so that the engaging portion 84a of the pivot arm 84 comes into engagement with the lock pin 78 of the front side wall portion 45 (lock state of the second lock device 80).

In this case, as the front support post 45a of the front side wall portion 45 comes into contact with the cushioning member 83, the front support post 45a becomes clamped, without any gap in the fore/aft direction, between the cushioning member 83 and the engaging portion 84a of the pivot arm 84. With this, it is possible to prevent looseness of the inner end portion of the front side wall 46, with the front bottom portion 42 being raised rearward and the front side wall portion 45 being folded to the inner side of the vehicle body.

Therefore, by folding the front side wall portion 45 to the inner side of the vehicle body with the front bottom portion 42 being raised rearward, the inner end portion of the front side wall portion 45 can be automatically fixed to the front deck 45a by the second lock device 80. With this, the switchover of the state of the load-carrying platform 40 can be effected easily and speedily, whereby the operational efficiency of the state switchover operation of the load-carrying platform 40 can be improved.

On the other hand, with the front bottom portion 42 being raised rearward and the front side wall portion 45 being folded to the inner side of the vehicle body, if the operational portion 84c of the operational arm 84 is pulled up against the urging force of the elastic spring 85, the engagement of the engaging portion 84a relative to the lock pin 78 is released, thereby to allow rearward pivotal movement of the front side wall portion 45 (lock release state of the second lock device 80). If the front side wall portion 45 is pivoted rearward and the operator removes his/her hand from the operational portion 84c of the pivot arm 84, the contacting portion 84d of the pivot arm 84 comes into contact with the front deck plate 42a, so that the pivot arm 84 is returned to and fixed at its original position (the condition shown in FIG. 16A).

[Change of Length of Load-Carrying Platform]

Figure 17A:
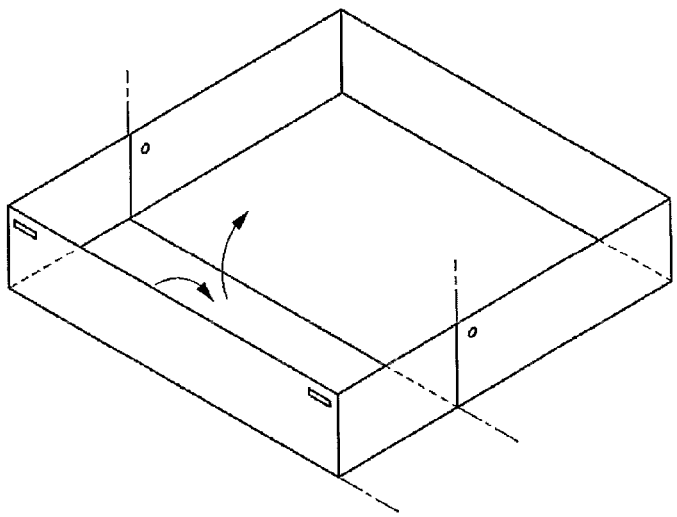
Figure 17B:
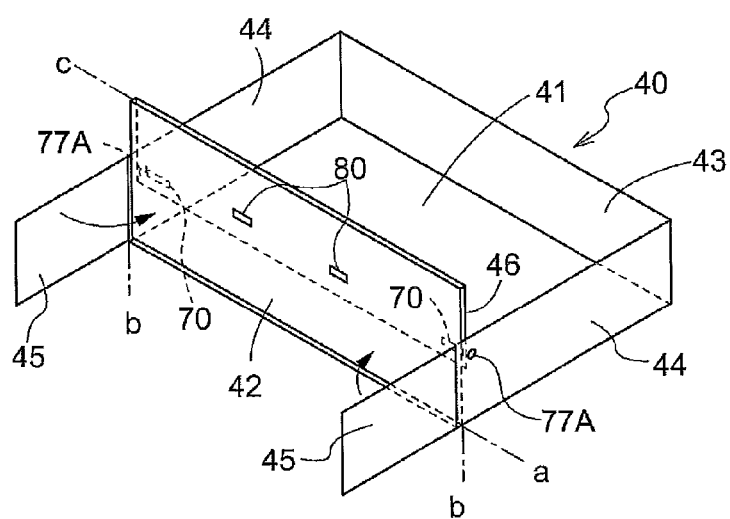
Figure 17C:
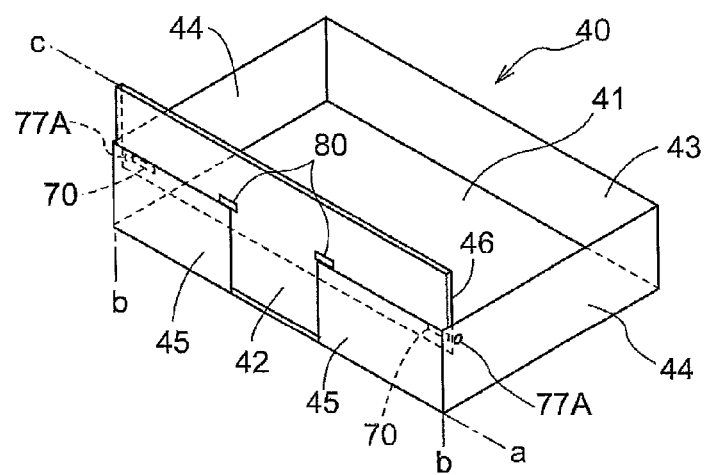

Next, with reference to FIG. 17A, FIGS. 17B and 17C which are schematic perspective views illustrating switching over of states of the load-carrying platform 40, switchover between the extended state and the contracted state of the load-carrying platform 40 will be explained. Here, FIG. 17A is a schematic perspective view showing the load-carrying platform 40 under the extended state. FIG. 17B is a schematic perspective view showing the load-carrying platform 40 under an intermediate state between the extended state and the contracted state. FIG. 17C is a schematic perspective view showing the load-carrying platform 70 under the contracted state.

As shown in FIG. 17A and FIG. 17B, by operating the right and left first lock devices 70 to the lock release state and pivoting the front wall portion 46 rearward about the right/left oriented axis (c), the front wall portion 46 is folded toward the front bottom portion 42. And, by pivoting rearward the front bottom portion 42 together with the font wall portion 46 about the right/left oriented axis (a) to be erected and aligning the positions of the first lock devices 70 with the lock holes 77a formed in the boss members 77 of the rear side wall portions 44 and operating the first lock devices 70 to the lock state, the front bottom portion 42 together with the front wall portion 46 can be fixed to the right and left rear side wall portions 44.

Next, as shown in FIG. 17B and FIG. 17C, the right and left front side wall portions 45 are pivoted rearward (to the inner side) about the vertically oriented axis (b) and the right and left front side wall portions 46 are folded toward the erected front bottom portion 42, whereby the lock pins 78 of the right and left front side wall portions 45 come into engagement with the right and left second lock devices 80 of the front bottom portion 42. With this, the right and left front side wall portions 45 can be fixed to the erected front bottom portion 42.

As shown in FIG. 17C, if the front wall portion 46, the front bottom portion 42 and the right and left front side wall portions 45 are folded according to the above-described procedure, the extended state wherein the fore/aft length of the load-carrying platform 40 (the total length of the load-carrying platform 40) is extended can be switched over to the contracted state wherein the fore/aft length of the load-carrying platform 40 (the total length of the load-carrying platform 40) is reduced. In this case, the switchover of the state of the load-carrying platform 40 can be effected easily and speedily by the first and second lock devices 70, 80, without using any special tool or the like, whereby the operational efficiency of state switchover of the load-carrying platform 40 can be improved.

Further, the deck face of the front bottom portion 42, the inner face (rear face) of the front wall portion 46 and the inner face of the front side wall portions 45 which are located on the inner side of the load-carrying platform 40 under the extended state of the load-carrying platform 40 are not exposed to the outer side of the load-carrying platform 40 under the contracted state. As a result, it is possible to prevent the deck face of the front bottom portion 42, the inner face (rear face) of the front wall portion 46 and the inner face of the front side wall portions 45 from being exposed to the outer side of the load-carrying platform 40 under its contracted state, thereby to deteriorate the outer appearance of the load-carrying platform 40.

Also, under the contracted state of the load-carrying platform 40, the area surrounded by the deck face of the rear bottom portion 41, the inner faces of the right and left rear side wall portions 44, the inner face (front face) of the rear wall portion 43 and the deck face (rear face) of the front bottom portion 42 is used for mounting a load thereon. With this, it is possible to prevent damage to the outer face side of the load-carrying platform 40 due to mounting of a load thereon.

As shown in FIG. 17B and FIG. 17C, the right and left second lock devices 80 are operated to the lock release state from the condition wherein the right and left front side wall portions 45 are fixed to the raised front bottom portion 42 and the right and left front side wall portions 45 are pivoted forward (outer side) about the vertical axis (b). In this case, the bracket 66 on the side of the front side wall portion 45 comes into contact with the frame 67 on the side of the rear side wall portion 44, so that the front side wall portions 45 are fixed in position under the fore/aft orientation.

Next, as shown in FIG. 17A and FIG. 17B, the right and left first lock devices 70 are operated to the lock release state, and the front bottom portion 42 together with the front wall portion 46 is pivoted rearward (downward) about the right/left oriented axis (a). In this case, the plate-like member 65 of the front bottom portion 42 comes into contact with the front lower face of the rear deck plate 41a and the right and left opposed ends of the front deck plate 42a come into contact with the upper faces of the right and left plate-like members 45d, so that the upper faces of the front deck plate 42a are fixed under the condition of being substantially flush with the upper face of the rear deck plate 41a.

And, by pivoting the front wall portion 46 forward (upward) about the right/left oriented axis (c), the right and left first lock devices 70 are operated to the lock state. In this case, by the positioning mechanism 74, the front wall portion 46 and the front side wall portion 45 are fixed in position in the fore/aft direction and in the right/left direction. Also, the position of the leading end of the operational tool 72 and the position of the lock hole 45A of the front wall portion 45 are fixedly determined. With this, the front bottom portion 42, the front wall portion 46 and the right and left front side wall portions 45 can be fixed.

As shown in FIG. 17A, by developing the right and left front side wall portions 45, the front wall portion 46, and the front bottom portion 42 in accordance with the procedure described above, the state of the load-carrying platform 40 can be switched over from the contracted state wherein the length of the load-carrying platform 40 (the total length of the load-carrying platform 40) is reduced to the extended state wherein the fore/aft length of the load-carrying platform 40 (total length of the load-carrying platform 40) is extended. In this case, the state switchover of the load-carrying platform 40 can be readily and speedily effected by the first and second lock devices 70, 80, without using any special tools or the like, so the operational efficiency of the state switchover operation of the load-carrying platform 40 can be improved.

[Description of Partitioning Member]

With reference to FIGS. 18 through 25A and FIG. 25B, the construction of the partitioning member 90 disposed between the passenger's section 5 and the rear load-carrying section 6 will be described.

Figure 18:
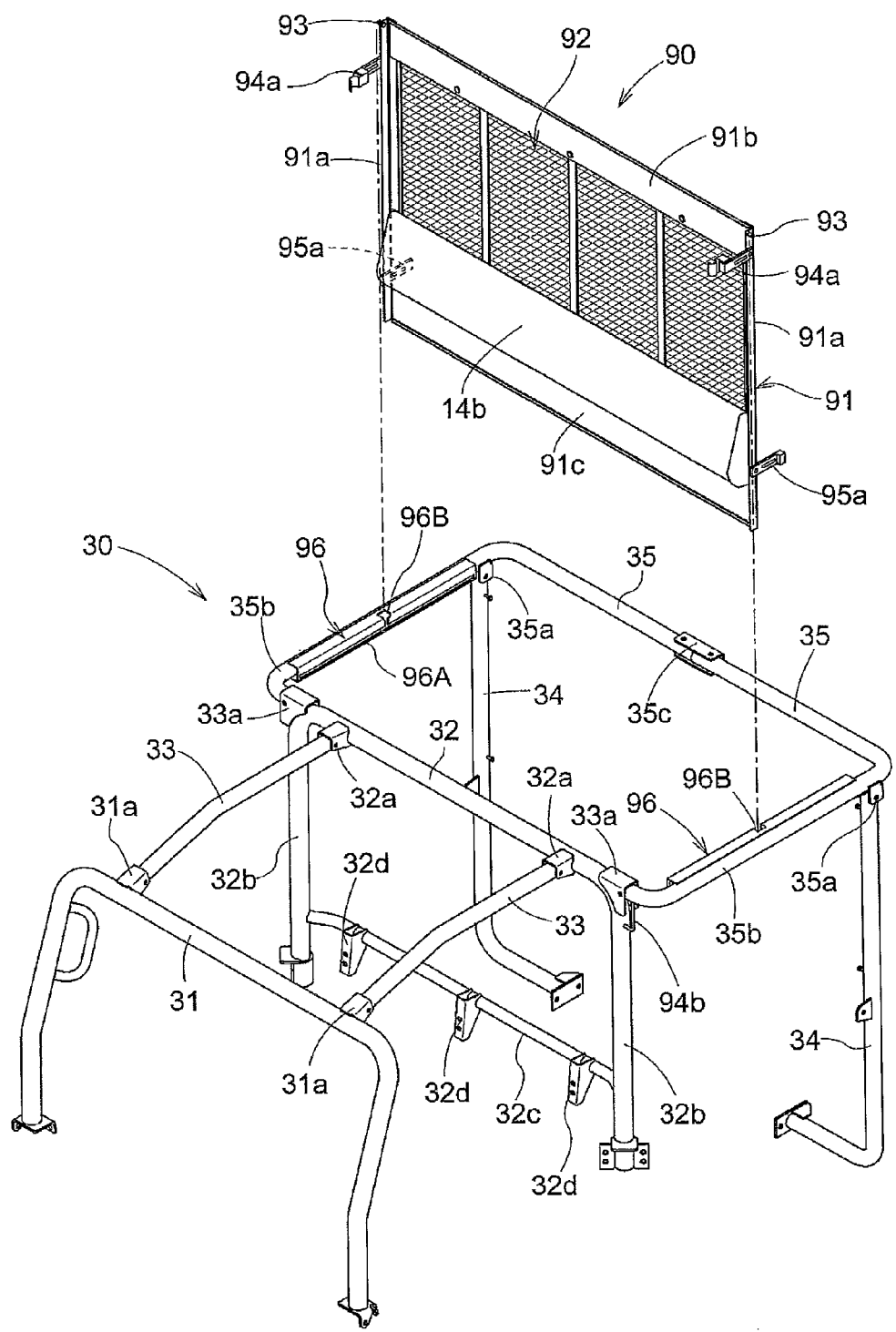
Figure 19:
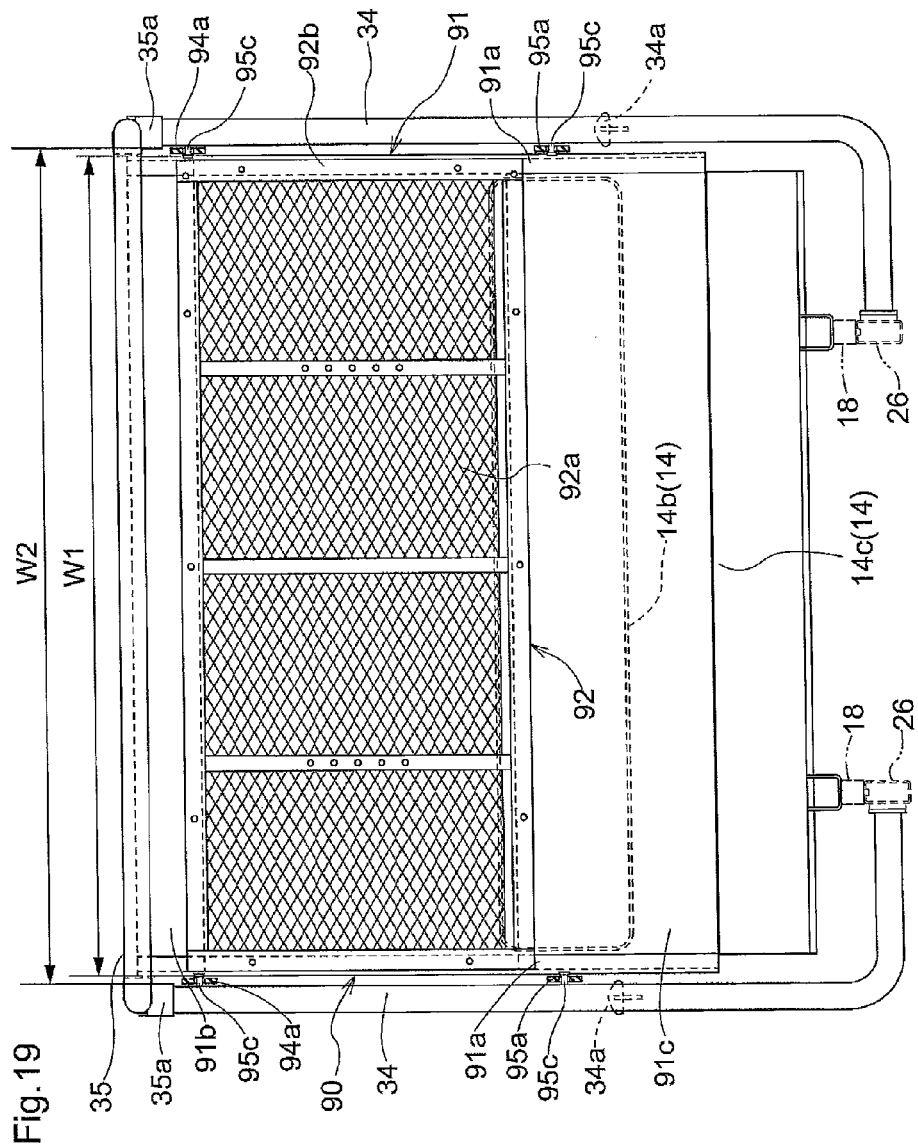
Figure 20:
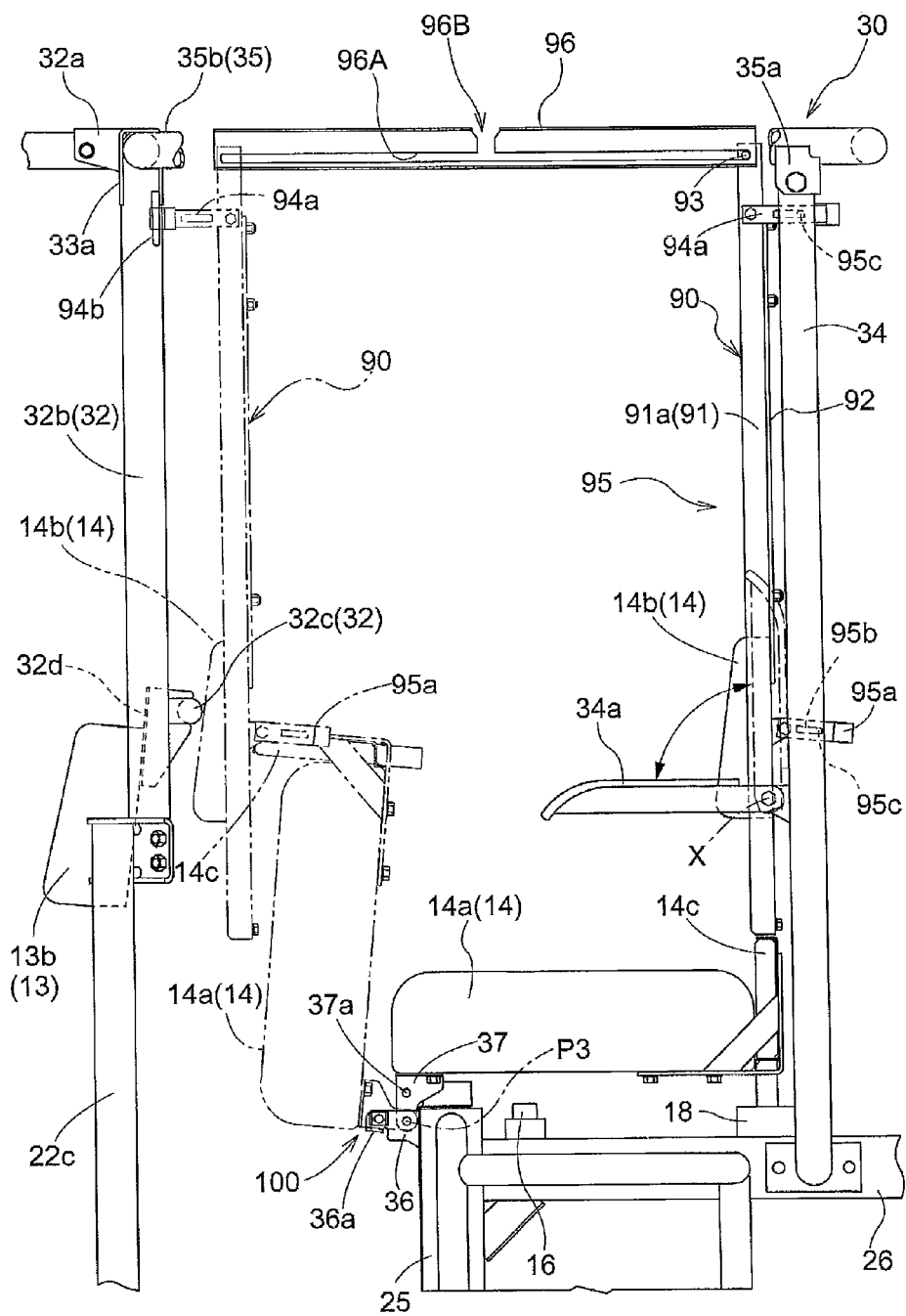
Figure 21:
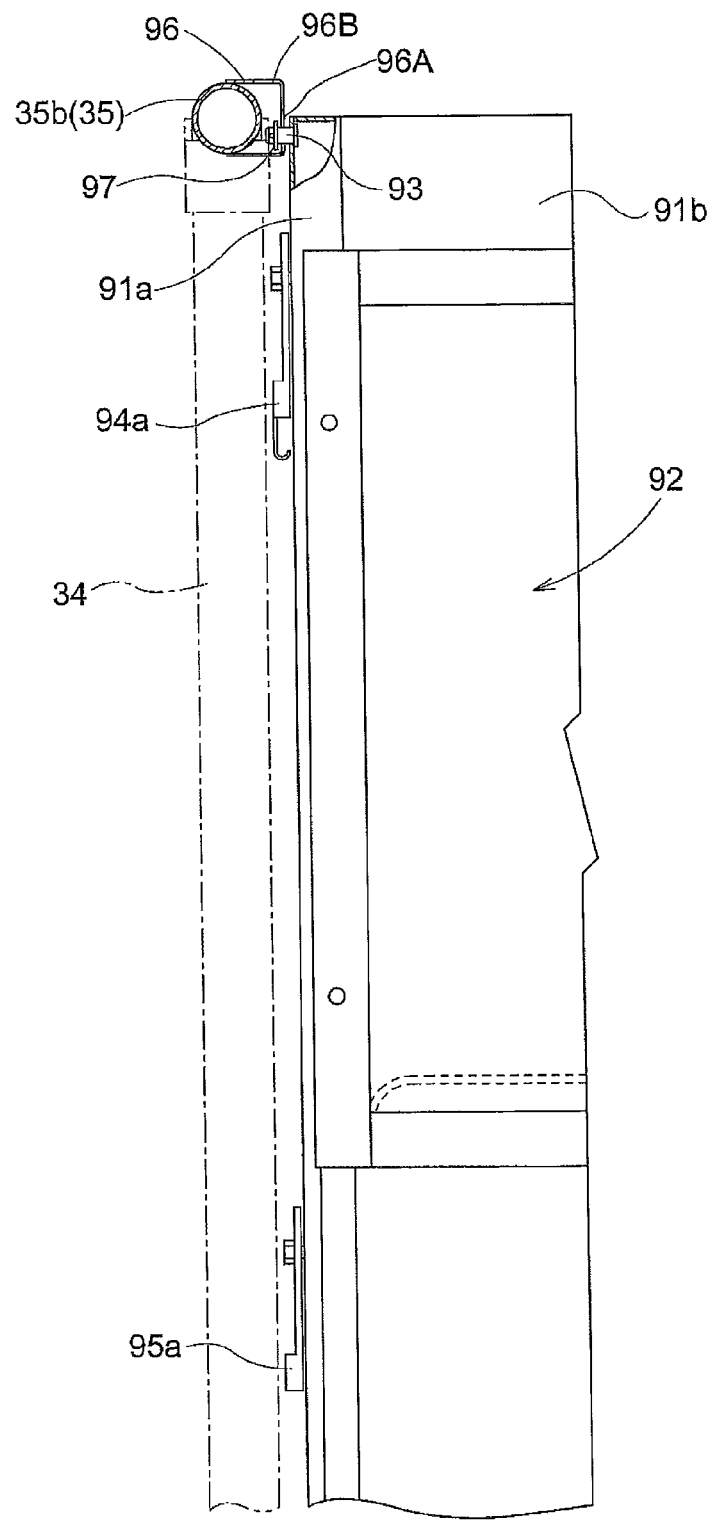
Figure 22:
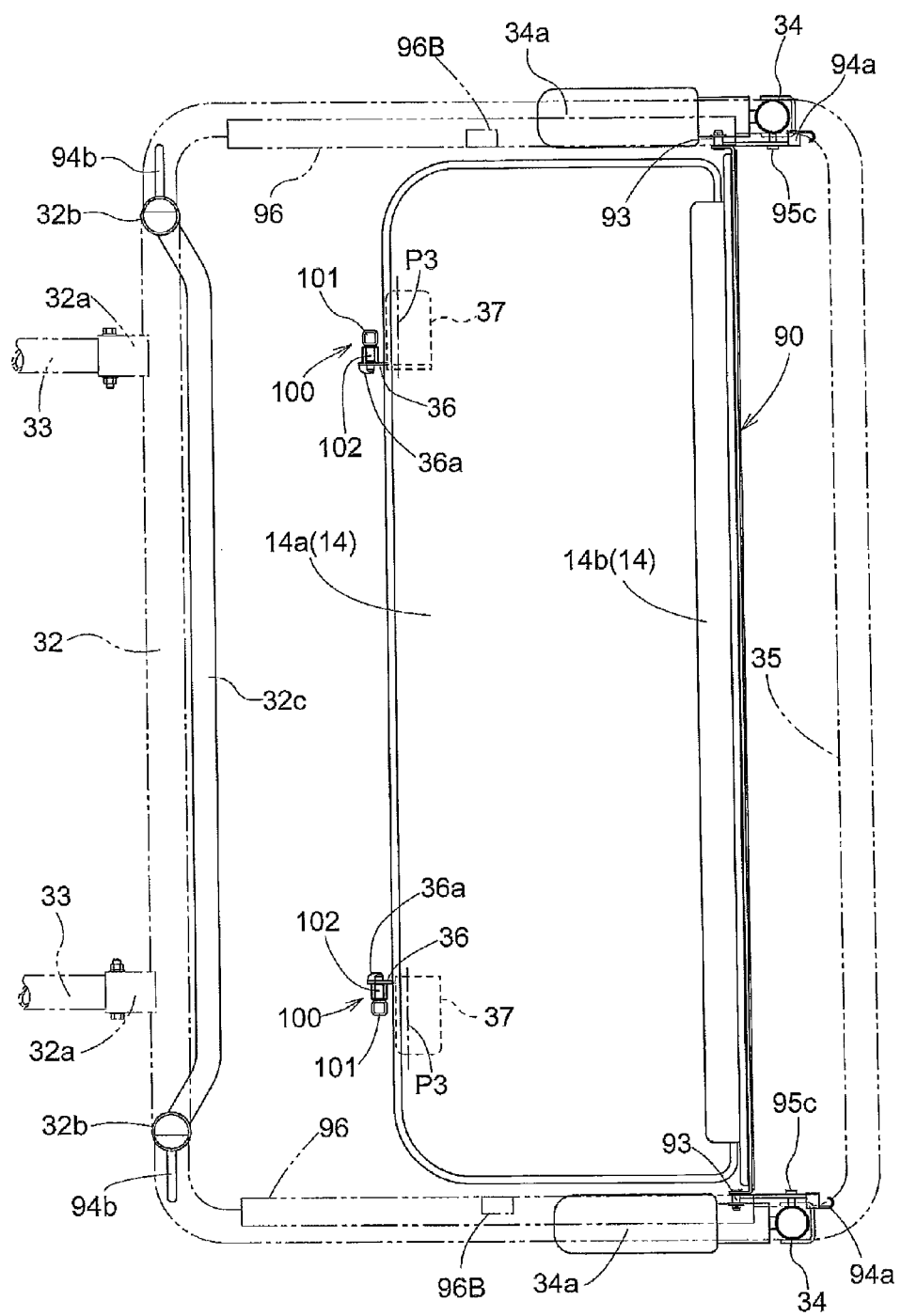

FIG. 18 is an explanatory view illustrating assembly/disassembly of the ROPS 30 and the partitioning member 90. FIG. 19 is a rear view showing the periphery of the partitioning member 90. FIG. 20 is a side view showing the periphery of the partitioning member 90. FIG. 21 is rear view in vertical section showing the support construction for the upper section of the partitioning member 90 and the fixing construction for the partitioning member 90. FIG. 22 is a horizontal section showing the periphery of the partitioning member 90. FIGS. 23 through 25A and FIG. 25B show the fixing construction for the partitioning member 90, FIG. 23 being a side view, FIGS. 24, 25A, 25B being horizontal sections.

As shown in FIGS. 18 through 20, rearwardly of the passenger's section 5, there is provided the partitioning member 90 for partitioning (constituting the rear wall of the passenger's section 5) between the passenger's section 5 and the rear load-carrying section 6. This partitioning member 90 is configured to be switchable in its position between a rearwardly displaced position (position denoted with the solid line in FIG. 20) wherein the member 90 is displaced rearwardly under the contracted state of the load-carrying platform 40 and a forwardly displaced position (position denoted with two-dot chain line in FIG. 20) wherein the member 90 is displaced forwardly under the extended state of the load-carrying platform 40.

As shown in FIG. 18 and FIG. 19, the partitioning member 90 includes a frame member 91, a mesh-like member 92 and right and left upper support shafts 93. The frame member 91 includes right and left vertical frames 91a, an upper frame 91b fixed to and between the upper portions of the right and left vertical frames 91a, and a lower frame 91c fixed to and between the lower portions of the right and left vertical frames 91a. With these, there is formed a rectangular opening elongate in the right/left direction as seen in the rear view, delimited by the right and left vertical frames 91a, the upper frame 91b and the lower frame 91c.

The partitioning member 90 has a right/left width W1 which is set narrower than an inner width W2 between the right and left rear support posts 34. The right/left width W1 of the partitioning member 90 is set to have a predetermined gap relative to the width of the inner face of right and left rail members 96 to be described later. With these, the partitioning member 90 widely covers the area between the passenger's section 5 and the rear load-carrying section 6 and at the same time the support construction for the partitioning member 90 can be simplified.

The mesh-like member 92 is constituted by attaching a net 92a having a plurality of vent holes such as a resin mesh or a punching metal, to a frame 92b in the form of a framework formed of a band plate. The mesh-like member 92 is fixed to the frame member 91 by detachably fixing the frame 92b to the frame member 91 from the rear side thereof. To the upper ends of the right and left vertical frames 91a, right/left oriented right and left upper support shafts 93 are fixed coaxially.

To the front face of the lower frame 91c, the seat back portion 14b of the rear seat 14 is fastened and fixed, so that the seat back portion 14b of the rear seat 14 is movable together with the partitioning member 90.

As shown in FIG. 18 and FIGS. 20 through 22, to the inner sides of the right and left fore/aft frame portions 35b of the upper rear frame 35, the right and left rail members 96 elongate in the fore/aft direction are fixed. The right/left rail member 96 has a rectangular vertical cross sectional shape in its rear view which is open on the lateral outer side and is fixed to the right/left fore/aft frame portion 35b.

In the inner face of the right/left rail member 96, there is formed a guide hole 96A which is elongate in the fore/aft direction, and the hole width of this guide hole 96A is set to be slightly greater than the outer diameter of the upper support shaft 93.

The right and left upper support shafts 93 of the partitioning member 90 are fitted within the right and left guide holes 96A of the right and left rail members 96, and under this condition fitted within the guide holes 96, anti-detaching washers 97 are attached to the leading ends of the upper support shafts 93. With this, the upper section of the partitioning member 90 is supported to be slidable back and forth along the right and left guide holes 96A of the right and left rail members 96.

At an intermediate position in the fore/aft sliding direction of the guide holes 96A, there is formed an escape hole 96B (see FIG. 20) open to the upper side. This escape hole 96B is sized to allow removal of the upper support shaft 93 slidable within the guide hole 96A and constitutes a cutout portion for allowing detachment of the ROPS 30 by lifting up the entire partitioning member 90 as illustrated in FIG. 18.

For the partitioning member 90, there are provided a forward position fixing mechanism 94 and a rearward position fixing mechanism 95 for fixing this partitioning member 90 at the forwardly displaced position and the rearwardly displaced position, respectively.

Figure 23:
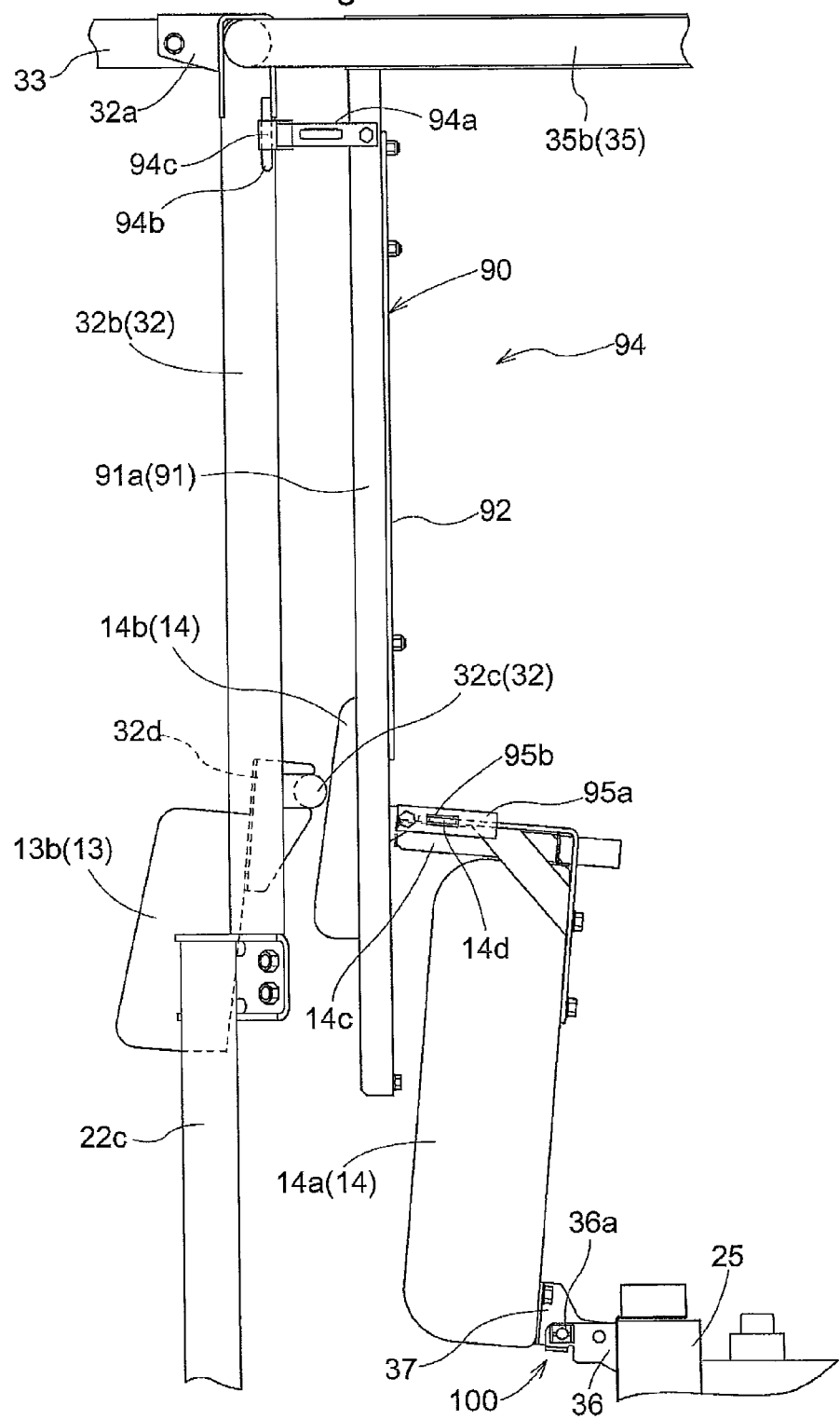
Figure 24:
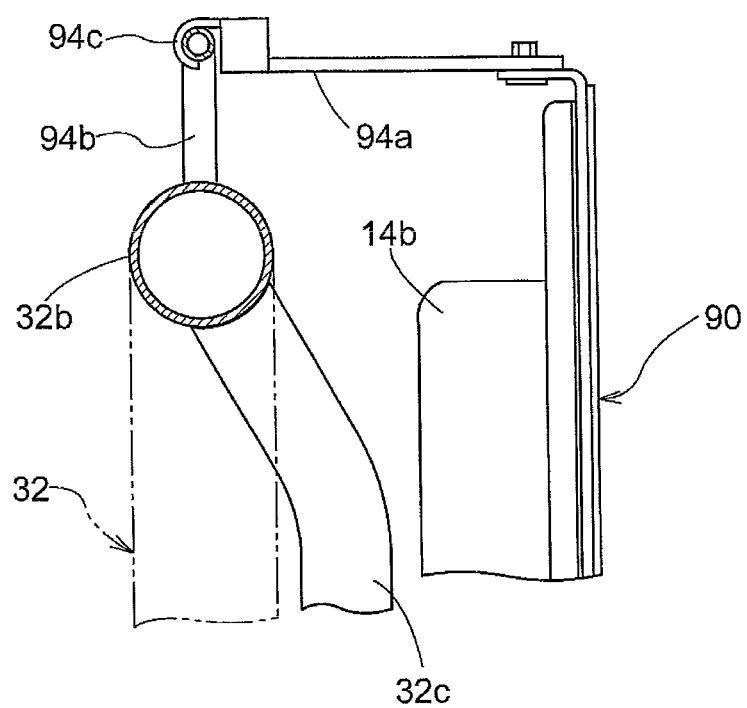

The forward position fixing mechanism 94 is for fixing the partitioning member 90 to the intermediate port 32, with the partitioning member 90 being located adjacent the rear side of the driver's seat 13 when the partitioning member 90 is located at the forwardly displaced position and the vehicle is used in the single row seat mode not using the rear seat 14. and, as shown in FIGS. 22 through 24, this mechanism comprises a hook member 94a having a band-like portion formed of rubber and fixed to the partitioning member 90 and a rod 94b portion which is engageable with the hook member 94a and provided in the intermediate post 32. In operation, when the partitioning member 90 is located adjacent the driver's seat 13, the band-like portion of the hook member 94a is stretched to be engaged with the rod 94b, thus providing the fixed condition.

The above-described forward position fixing mechanism 94 is configured to be engaged with the intermediate post 32 at the upper section of the partitioning member 90 and this mechanism is not configured for elastically urging and pressing the partitioning member 90 against the intermediate post 32, on the side of the lower section of the partitioning member 90. However, the lower end side of the partitioning member 90 is restricted in its fore/aft position, in the following manner.

That is, as shown in FIG. 23, the rear seating portion 14a is rendered into the raised posture by being lifted up at the rear portion thereof and the front end of this rear seating portion 14 is fixed by a lock mechanism 100 to be described, so that the front end will not be collapsed. With this, the lower end side of the partitioning member 90 is positioned and bound between the reinforcing frame 32c and the rear seating portion 14a, so that looseness thereof in the fore/aft direction is restricted.

And, on the lower end side of the partitioning member 90, with using an elongate hole 95b defined in the rubber-made, band-like member 95a as the rearward position fixing mechanism 95 to be described later, the band-like member 95a is slightly stretched to be engaged with an engaging piece 14d provided to the rear upper end 14c of the rear seating portion 14a. With this, the lower end side of the partitioning member 90 is connected with displacement thereof in the fore/aft position being elastically restricted relative to the rear seating portion 14a fixed under the locked posture in the vicinity of the intermediate post 32.

As described above, the rubber-made, band-like member 95a is a constituting member of the rearward position fixing mechanism 95 and this member 95a functions also a means for position-restricting the lower end side of the partitioning member 90 in cooperation with the rear seating portion 14a and its lock mechanism 100, when the partitioning member 90 is displaced forwardly.

Figure 25A:
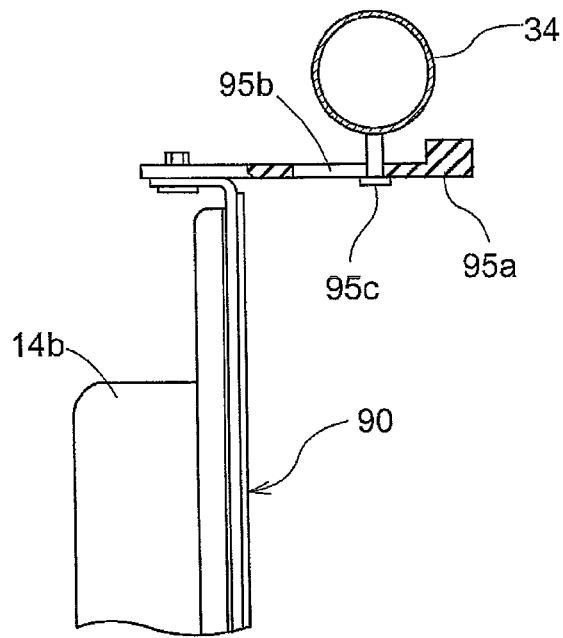
Figure 25B:
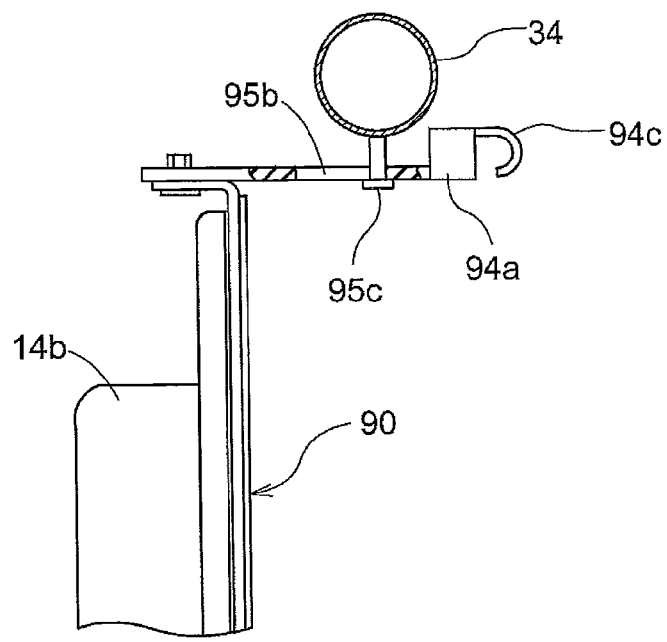

The rear position fixing mechanism 95 is for fixing the partitioning member 90 to the rear support post 34, with the partitioning member 90 being located adjacent the rear support post 34 when the partitioning member 90 is located at the rearwardly displaced position and the vehicle is used in the two rows seat mode setting the rear seat 14 usable. and, as shown in FIGS. 22 25A and 25B, this mechanism comprises a band-like member 95a formed of rubber and fixed to the partitioning member 90 and a pin 95c which is engageable with an elongate hole 95b defined in the band-like member 95a. In operation, when the partitioning member 90 is located on the rear side of the passenger's section 5, while the band-like member 95a is being stretched, the pin 95c is engaged with the elongate hole 95b, thus providing the fixed condition.

And, the rearward position fixing mechanism 95 for fixing the position of the partitioning member 90 relative to the rear support post 34 is provided between the lower section of the partitioning member 90 and the lower section of the rear support post 34.

[Switchover of Posture of Rear Seat]

As shown in FIG. 20 and FIG. 22, the rear seating portion 14a of the rear seat 14 is supported to be pivotable in the fore/aft direction and in the vertical direction about a right/left oriented axis P3 of the lower portion of the front edge thereof, so that the seating posture is switchable between an erect posture wherein the rear seating portion 14a is pivoted forwardly with its front end being located downward, its rear end being located upward and a seating posture wherein the rear seating portion 14a is displaced rearwardly so that the upper face of the rear seating portion 14a is oriented upward.

At the upper front portion of the rear seat supporting frame 25, a bracket 36 is fixed. To this bracket 36, a support bracket 37 fixed to the front lower portion of the rear seating portion 14a is supported to be pivotable about the right/left oriented axis P3. The support bracket 37 defines a right/left oriented hole portion 37a.

With this, when the seat back portion 14b is displaced forwardly together with the partitioning member 90 and the rear seating portion 4a is switched over in its posture to the erect posture, the posture of the rear seat 14 can be switched over to the first posture wherein no workers can be seated on the front side of the load-carrying platform 40 under its extended state.

Further, when the rear seating portion 14a is switched over in its posture to the rearwardly pivoted posture and the seat back portion 14b is displaced rearwardly together with the partitioning member 90, the posture of the rear seat 14 can be switched over to the second posture wherein a worker(s) can be seated on the front side of the load-carrying platform 40 under its contracted state.

At the lower portion of the bracket 36, there is formed a positioning contact portion 36a for restricting the forward pivotal range of the rear seating portion 14a. At the leading end of the bracket 36, the lock mechanism 100 is attached.

The lock mechanism 100 includes an operational portion 101 and a pin 102. When the operational portion 101 of the lock mechanism 100 is pulled to the laterally outer side, the pin 102 engaged in the hole portion 37a of the support bracket 37 is displaced to the laterally outer side.

With the operational portion 101 being pulled to the laterally outer side, if the operational portion 101 is rotated in the normal direction, the operational portion 101 is operated to the laterally outer side, thereby to maintain the condition of the pin 102 being displaced laterally outer side. Whereas, with the operational portion 101 being pulled to the laterally outer side, if the operational portion 101 is rotated in the reverse direction, the pin 102 is projected to the inner side under the urging force of an elastic spring (not shown) incorporated within the lock mechanism 100.

With the above, with the operational portion 101 of the lock mechanism 100 being pulled to the laterally outer side, if the rear seating portion 14a is pivoted forwardly, the lower end of the support bracket 37 comes into contact with the positioning contact portion 36a of the bracket 36, so that the rear seating portion 14a is fixed in position at the most forwardly pivoted position thereof. Under this condition, if the operational portion 101 of the lock mechanism 100 is rotated in the reverse direction to cause the pin 102 of the lock mechanism 100 to enter the hole portion 37a of the support bracket 37, the erect posture of the rear seating portion 14a at the most forwardly pivoted position can be maintained.

With the rear seating portion 14a being maintained under the erect posture, if the operational portion 101 of the lock mechanism 100 is pulled to the laterally outer side, the engagement of the pin 102 relative to the hole portion 37a is released, thereby to release the maintenance of the rear seating portion 14a under the erect posture. And, by collapsing the rear seating portion 14a rearward, the rear seating portion 14a can be switched over into the collapsed posture. In this case, if the operational portion 101 of the lock mechanism 100 is pulled and then rotated in the normal direction, it is possible to realize in advance the condition of the pin 102 of the lock mechanism 100 being pulled laterally outer side in preparation for next posture switchover of the rear seating portion 14a.

As shown in FIG. 8 and FIG. 20, as the rear seating portion 14a can be maintained under the erect posture, it is possible to maintain a predetermined gap between the rear portion of the rear seating portion 14a under the erect posture and the leading end of the load-carrying platform 40 under its extended posture for dumping action and also to maintain a predetermined gap between the upper front portion of the rear seating portion 14a under the erect posture and the partitioning member 90 at is forwardly displaced position. As a result, it is possible to prevent interference between the rear seating portion 14a under the erect posture and the load-carrying platform 40 under the extended state and also to prevent interference between the rear seating portion 14a under the erect posture and the partitioning member 90 at its forwardly displaced position.

As shown in FIG. 20, the lower end portion of the partitioning member 90 is set such that under the use posture of the rear seat 14 as being located on the rear side the passenger's seat 5, the lower end portion is present immediately above the rear upper end of the rear seating portion 14a of the rear seat 14, so as to restrict the pivotal movement of the rear seating portion 14a toward the erect posture.

That is to say, the contacting construction by the lower end portion of the partitioning member 90 functions as a rear lock mechanism 110 for restricting pivotal movement of the rear seating portion 14a toward the erect posture.

With the above-described constructions of the front lock mechanism 100 and the rear lock mechanism 110, the posture switchover of the rear seating portion 14a can be effected readily and speedily. Also, by the front lock mechanism 100 and the rear lock mechanism 110, the rear seating portion 14a can be fixed in a reliable manner under the upwardly oriented use posture and the collapsed posture.

[Change of Mode of Rear Seat Installing Space]

Next, with reference to FIG. 1, FIG. 2, FIG. 20 and FIG. 22, there will be explained a change in the mode of rear seat installing space S by changing position of the partitioning member 90.

FIG. 1 shows a condition wherein the load-carrying platform 40 is switched over to the contracted state, the rear seating portion 14a is switched over to the seating posture and the partitioning member 90 is located at the rearwardly displaced position. This is the two rows seat mode wherein both the front driver's seat 13 and the rear seat 14 can be seated.

In this case, the upper portion and the lower portion of the partitioning member 90 are fixed to the rear support post 34 by the rearward position fixing mechanism 95. Under this condition, the rear upper end portion 14c of the rear seating portion 14a is located at the position in opposition to the lower end of the partitioning member 90, so that its pivotal movement toward the erect posture is restricted.

Next, the switchover from the two rows seat mode (for four to five passengers) shown in FIG. 1 to the single row seat mode (for two passengers) shown in FIG. 2 is effected as follows.

First, the engagement by the rearward position fixing mechanism 95 is released and the partitioning member 90 is slid forwardly along the guide holes 96A of the rail members 96, thereby to switch the partitioning member 90 to the forwardly displaced position.

Next, the hook members 94a as the forward position fixing mechanisms 94 provided at the upper portions of the right and left opposed sides of the partitioning member 90 are brought into engagement with the fixing rods 94b formed continuously from the upper portions of the intermediate posts 32, thereby to fix the partitioning member 90 to the intermediate posts 32.

Thereafter, the rear seating portion 14a whose restriction of pivotal movement by the lower end of the partitioning member 90 has been released is switched over in its posture to the erect posture and the load-carrying platform 40 is switched over to the extended state and the band like member 95a as the rearward position fixing mechanism 95 is connected to the lower end of the rear seating portion 14a which has been switched over to the erect posture, whereby the two rows seat mode (for four to five passengers) shown in FIG. 1 is switched over to the single row seat mode (for two passengers) shown in FIG. 2.

For returning from this single row seat mode (for two passengers) back to the two rows seat mode (for four to five passengers) shown in FIG. 1, in the reverse procedure to the above, the rear seating portion 14a is switched to the erect posture and the partitioning member 90 is changed in position to the forwardly displaced position, and from this condition, the load-carrying platform 40 is switched over to the contracted state and the rear seating portion 14a is switched over to the collapsed posture.

And, the engagement between the hook member 94a as the forward position fixing mechanism 94 of the partitioning member 90 and the fixing rod 94b on the side of the intermediate post 32 is released and further the engagement of the band-like member 95a connected to the upper end of the rear seating portion 14a whose posture has been changed to the erect posture is also released, thereby to allow rearward displacement of the partitioning member 90.

Then, the upper support shafts 93 of the partitioning member 90 are slid rearward along the guide hole portions 96A of the rail members 96, and when the partitioning member 90 has reached the rearwardly displaced position, the partitioning member 90 is fixed to the rear support post 34 by the rearward position fixing mechanisms 95. Under this condition, the rear edge of the rear seating portion 14a is at the position opposed to the lower end portion of the partitioning member 90 and its pivotal movement toward the erect posture is restricted.

In this way, the mode of the passenger's section 5 is switched over from the single row seat mode (for two passengers) shown in FIG. 2 to the two rows seat mode (for four to five passengers) shown in FIG. 1.

[Construction of Drive Unit]

The drive unit 120 disposed at the rear lower portion of the vehicle body frame 2 is constructed as follows.

Figure 27:
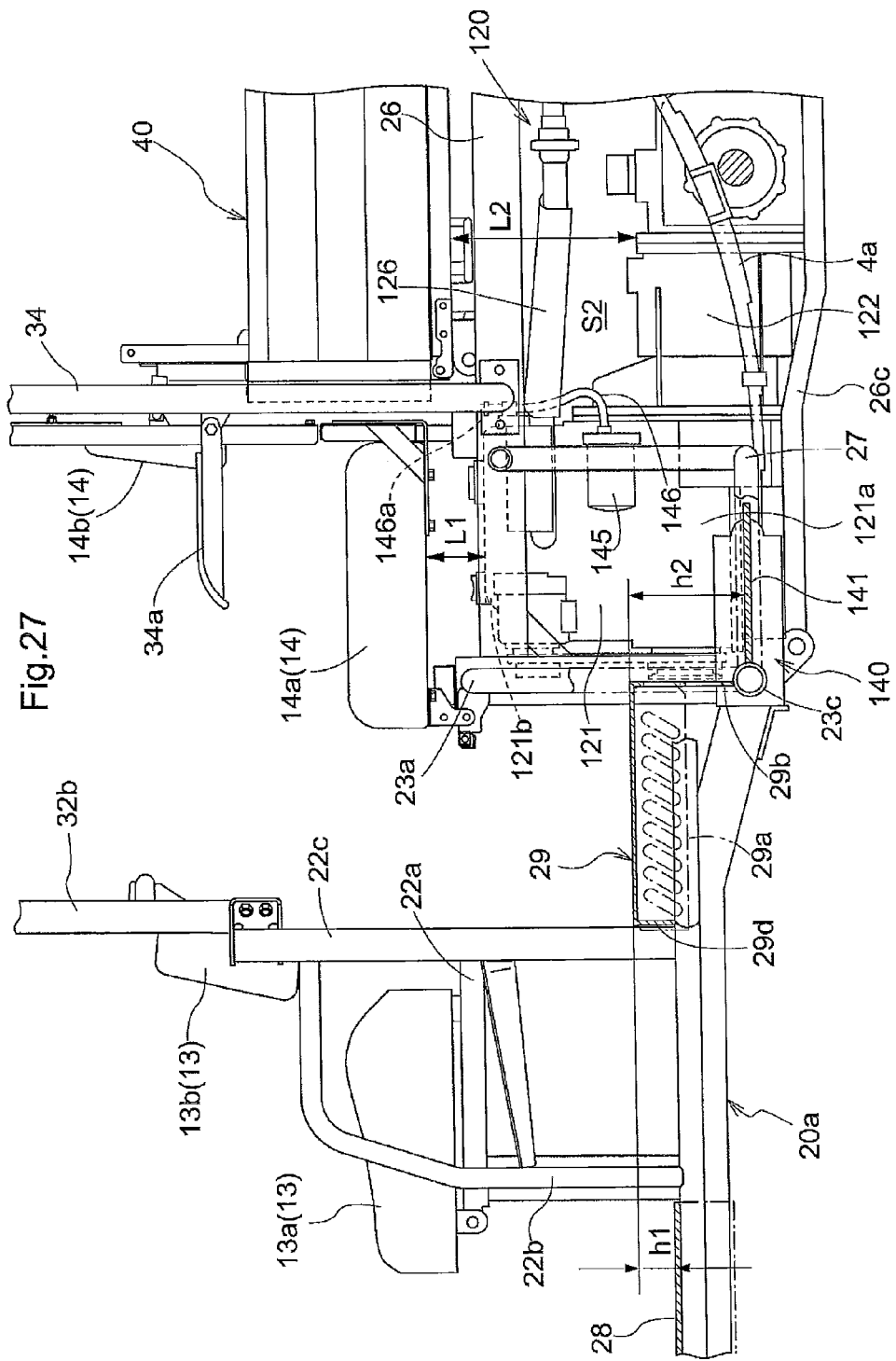

As shown in FIG. 1, FIG. 26 and FIG. 27, in the drive unit 120, the transmission case 122 connected to the rear of the engine 121, and the HST speed changer 123 connected to the rear of the transmission case 122 are connected integrally with each other. And, these components are supported in the suspended state, by the support frame 26a mounted between the right and left load-carrying platform support frames 26, and the rear supporting frames 26c extending continuously from the supporting frames 26a toward the rear end and bent in the L-shape in the side view.

The transmission case 122 connected to the rear of the engine 121 is provided for receiving the power of an engine output shaft (not shown) extending rearward from a crankcase portion 121a downwardly of the engine 121 and transmitting a drive force to the rear wheels 4. And, its upper face, as shown in FIG. 27, is formed lower than the upper end of a cylinder portion 121b of the engine 121, so that relative to the bottom face of the load-carrying platform 40, there is provided a predetermined distance L2 which is sufficiently greater than a distance L1 between the upper end of the cylinder portion 121b of the engine 121 and the bottom face of the load-carrying platform 40 or the bottom face of the rear seating portion 14a, thereby to form a ventilation space S2 for facilitating passage of exhaust air from a radiator 124 to be described later.

Further, from the left side of the cylinder portion 121b of the engine 121, an exhaust pipe 126 is extended, so that exhaust air is guided through the left side of the transmission case 122 to a muffler 127 disposed at an upper portion on the rear side of the transmission case 122. This exhaust pipe 126 and the muffler 127 are disposed at a substantially same height as the position where the ventilation space S2 formed between the bottom face of the load-carrying platform 40 and the upper face of the transmission case 122 is present.

And, as shown by the virtual line in FIG. 26, the engine 121 in the drive unit 120 is disposed at a position which is approximately the right/left center and downwardly of the rear seat 14 with the rear seating portion 14b set under the second posture. So, when the rear seating portion 14a is switched over to the erect first posture denoted by the solid line in the same figure, the upper side thereof is opened up.

Incidentally, as shown in the same figure, since the transmission case 122 etc. are present downwardly of the load-carrying platform 40, when the load-carrying platform 40 is operated for a dumping operation, the drive unit 120 disposed downwardly is opened up, i.e. exposed, thereby to facilitate maintenance/inspection of the transmission case 122, etc.

On the left side of the engine 122, the radiator 124 having an electrically driven cooling fan 124a is disposed, and on the right side opposite thereto, a battery 125 is disposed. For these components, i.e. the radiator 124 and the battery 125, too, the upper sides thereof are opened up, together with the engine 121, in response to the switchover of the rear seating portion 14a to the erect first posture.

In this way, as the radiator 124 and the battery 125 are disposed in distribution on the right and left sides of the engine 121, in comparison with the layout of disposing the radiator 124 and the battery 125 in a row in the fore/aft direction on one side of the engine 121, the upper sides thereof can be opened up at one time in response to the opening operation of the rear seat 14 which has a short length in the fore/aft direction, and also the right/left weight balance of the vehicle body can be improved advantageously.

Though not shown, on the side of the back face of the rear seat 14, there is provided a backing member formed of a heat-resistant material having resistance against the heat generated from the engine 121 disposed adjacent thereto and having heat insulating and sound absorbing properties also.

Downwardly of the front seating portion 13a of the driver's seat 13, such components as a fuel tank 130, an operational oil tank 131, etc. are disposed, although these components are not encompassed within the concept of the "drive unit" 120 according to the present invention. By opening up the front seating portion 13a, the upper sides of the fuel tank 130 and the operational oil tank 131 can be opened up.

At an intermediate position in the vertical direction on the left side of the engine 121, there is disposed a starter case 145 incorporating a self starter motor, as shown in FIG. 27. To this starter case 145, there is connected a breather duct 146 for exhausting gas generated inside the starter case 145. An upper end portion 146a of this breather duct 146 is fixed to a position adjacent a main frame rear portion 20c downwardly of the load-carrying platform 40 and the duct is open at a position which is hardly exposed to water or moisture with e.g. muddy water splashed up during a vehicle body run.

[Construction of Radiator and Components Relating Thereto]

As shown in FIG. 26 and FIG. 27, the radiator 124 is disposed such that an outwardly oriented air intake face 124b thereof is inclined deeper into the vehicle body on the front side thereof relative to the fore/aft direction of the vehicle body and the blowing direction of exhaust air by the cooling fan 124*a* is set obliquely rearward such that the centerline of the air blowing direction is oriented toward the position where the ventilation space S2 is present, as seen in the plan view.

Therefore, exhaust air from this cooling fan 124*a* serves as scavenging means for smoothly dissipating and discharging hot air stagnant within the drive unit 120 to the outside. Further, as the ventilation space S2 is provided as described above to allow the exhaust air from the radiator 124 to flow smoothly with less flowing resistance, the drive load imposed from the radiator 124 to the cooling fan 124*a* can be small, so that the cooling efficiency of the radiator 124 per se can be improved advantageously.

Moreover, as the air blown by the cooling fan 124*a* is blown with a certain width as shown by the arrows in FIG. 26, the air flows obliquely rearward while contacting also the engine 121, the transmission case 122, the HST speed changer 123 as well as the exhaust pipe 126 and the muffler 127 extended from the engine 121.

Figure 28:
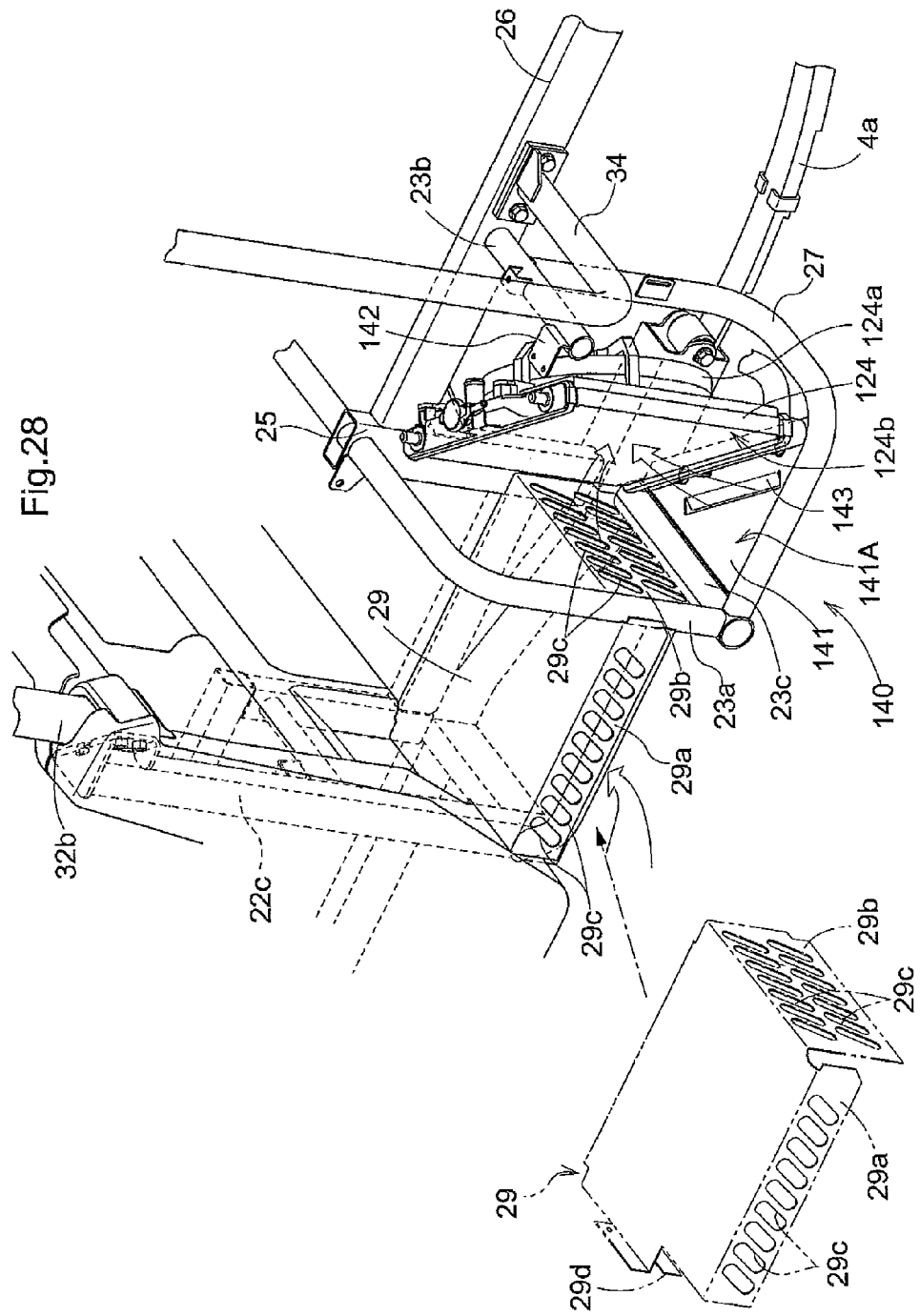
Figure 29:
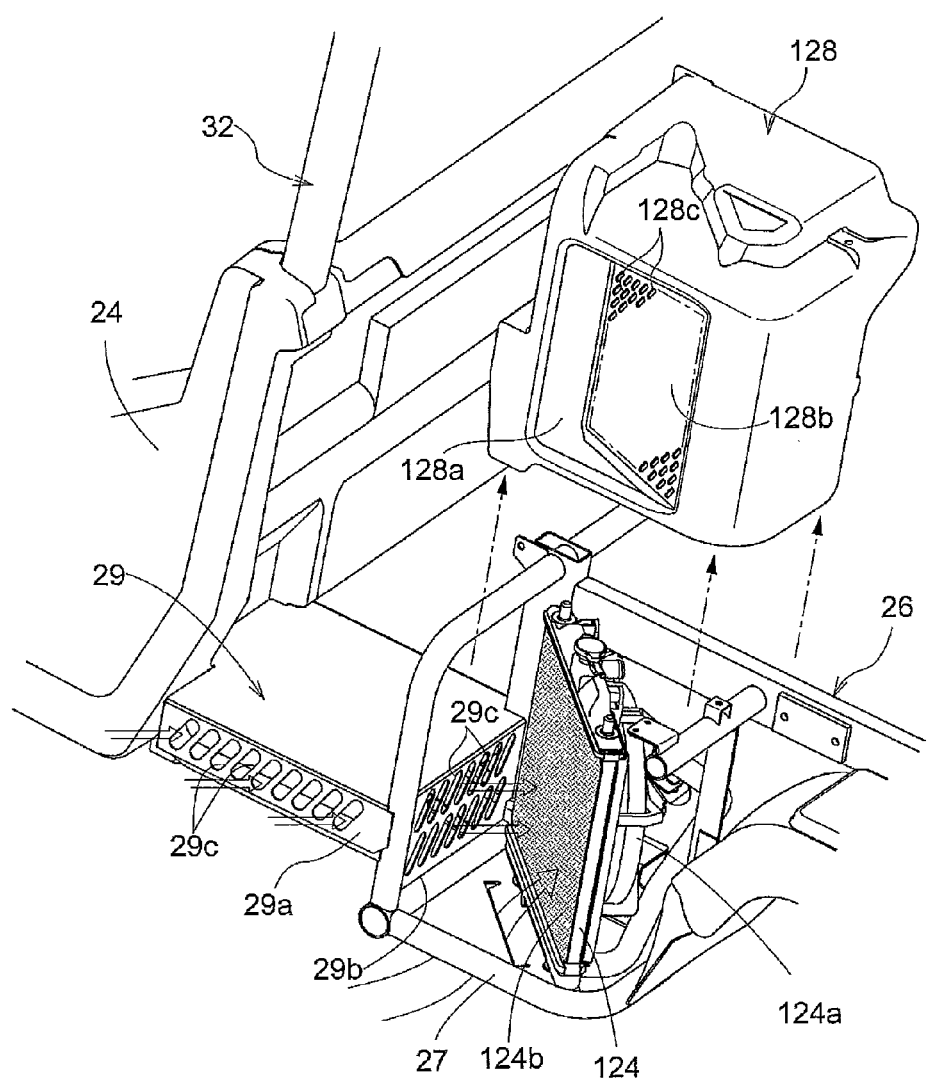

The radiator 124, as shown in FIG. 27, FIG. 28 and FIG. 29, is supported by a radiator support frame 140. In this radiator support frame 140, a front edge support frame 23*a* supporting the front edge of the rear seating portion 14*a* of the rear seat 14, a lower supporting frame 23*c* projecting to the left side from the left main frame front portion 20*a* to be connected to the lower end of the front edge supporting frame 23*a*, and a side frame 27 formed of a round pipe which is bent to connect the connecting portion between the front edge supporting frame 23*a* and the lower supporting frame 23*c* and the front edge supporting frame 23*b*, together form a framework having a radiator accommodating space.

And, a mounting plate 141 in the form of a triangular plate is mounted between the lower end supporting frame 23*c* and the lower end portion of the side frame 27 at a position on the lower side of this framework, and the rear edge supporting frame 23*b* and a fan shroud of the cooling fan 124*a* are connected by a connecting piece 142, thereby to constitute the radiator support frame 140.

As shown in FIGS. 27 through 30, the radiator 124 is disposed with obliquely rearward orientation such that when the lower end thereof is attached to the attaching position of the mounting plate 141, the blowing direction of the cooling fan 124*a* may be directed toward the ventilation space S2.

The upper face of the mounting plate 141 constitutes a radiator mounting face 141A and this radiator mounting face 141A is disposed at a position lower by a predetermined level difference h2 than the rear deck plate 29 as the deck member constituting the floor face of the passenger's section 5. At this level difference h2 portion, a rear vertical wall 29*b* of the rear deck plate 29 is provided.

The rear vertical wall 29*b* defines a number of ventilation openings 29*c* so as to allow smooth introduction of ambient air from the front side of the vehicle body toward the radiator 124 in association with vehicle run. Further, at a position in the mounting plate 141 immediate before the radiator 124, a portion of the mounting plate 141 is cut away and bent downwardly to form an ambient air inlet opening 143, so that introduction of ambient air from the lower side too can proceed smoothly.

The rear deck plate 29, at its position laterally outer side of the vehicle body, includes a laterally outer vertical wall 29*a* extending continuously from the rear vertical wall 29*b* and on the side of the front end of the floor face, at a position opposed to the rear vertical wall 29*b*, there is provided a front vertical wall 29*d* having a substantially same vertical length as the laterally outer vertical wall 29*a*. This front vertical wall 29*d*, as shown in FIG. 28, is opened on the left half side thereof and the laterally outer vertical wall 29*a* defines ventilation openings 29*c* similarly to the rear vertical wall 29*b*. Incidentally, the rear deck 29 on the side of mounting the battery 125 has a similar construction to the one on the side mounting the radiator 124.

The ventilation openings 29*c* formed in the laterally outer vertical wall 29*a* constitute laterally oriented ventilation openings which allow introduction of ambient air from the outer side of the vehicle body to the inner side of the same. And, the opened portion formed in the front vertical wall 29*d* is adapted for allowing introduction of ambient air from the front side of the vehicle body to the deck under space of the rear deck plate 29.

The rear deck plate 29 is formed higher than the front deck plate 28 by a predetermined level difference h1 whish is approximate to the height of the front vertical wall 29*d*. As a result, between the right and left main frames 20, 20, there is formed a tunnel-like space S3 which extends through in the fore/aft direction at the position higher than the upper face of the main frame front portion 20*a*.

As this tunnel-like space S3 is formed at a position higher than the front wheel drive shaft 9 extending from the transmission case 122, this space S3 can be utilized as a pipe/cable disposing space for various pipes such as a fuel pipe, an operational oil pipe, and various cables such a brake wire, electric cable harness.

To the radiator 124, an outer cover 128 is attached. This outer cover 128 is detachably attachable to the vehicle body frame 2.

Figure 30:
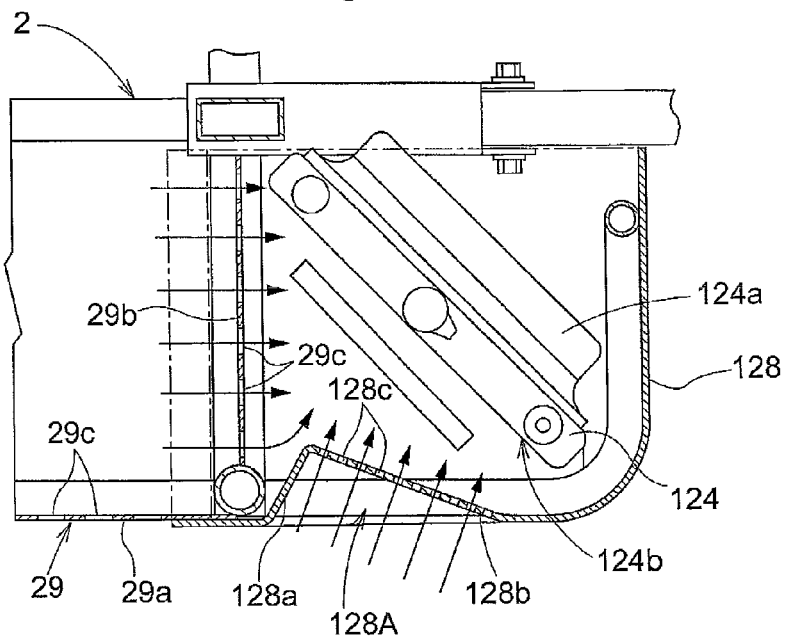
Figure 31:
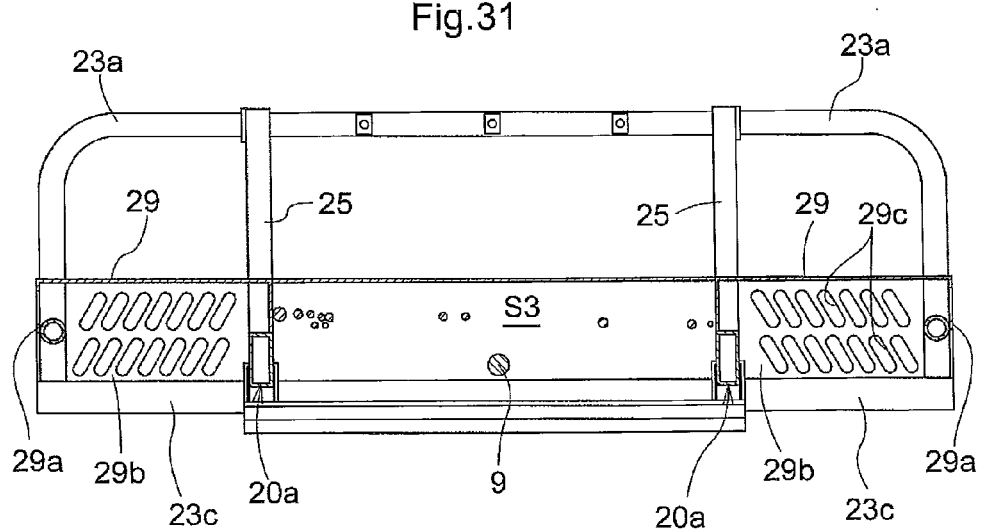

At a laterally outer portion of this outer cover 128, there is formed an air intake concave portion 128A which is concave toward the inner side of the vehicle body. This air intake concave portion 128A, as shown in FIG. 30, includes a guide face 128*a* opposed to the rear vertical wall 29*b* with a predetermined gap therebetween and an ambient air introduction face 128*b* opposed to the air intake face 124*b* of the radiator 124 with a predetermined gap therebetween.

In the ambient air introducing face 128*b* located at the position opposed to the air intake face 124*b* of the radiator 124, there are provided ventilation openings 128*c* for introducing the ambient air on the laterally outer side of the vehicle body to the side of the air intake face 124*b* of the radiator 124. The guide face 128*a* opposed to the rear vertical wall 29*b* has a slope for directing the flowing direction of the ambient air introduced through the ventilation openings 29*c* of the rear vertical wall 29*b* toward the air intake face of the radiator 124.

In this work vehicle, the mounting construction of the ROPS 30 is improved and the strength of the vehicle body frame as a whole is improved. as follows Next, characterizing features thereof will be recited specifically.

(1) The right and left front support posts 31 of the ROPS 30 covering the passenger's section 5 are fixed to the front frames 2A and the right and left rear support posts 34 of the ROPS 30 are fixed to the rear frames 2B rearwardly of the rear seat installing space. With this, in comparison with the case of the right and left rear posts 34 of the ROPS 30 being connected to the front frames 2A supporting the floor face of the passenger's section 5, the necessary length of the rear support posts 34 can be reduced. Further, the area formed by the connected assembly of the vehicle body frame 2 and the ROPS 30 is present over a large area of the vehicle body frame 2 between the front wheels and the rear wheels. That is to say, as the reinforced vehicle body constituting members comprised of the connected assembly of the vehicle body frame 2 and the ROPS 30 is present over the large area between the front wheels and the rear wheels, the strength of the traveling vehicle body as a whole can be improved.

(2) The right and left intermediate posts 32 provided at intermediate positions in the fore/aft direction between the front support posts 31 and the rear support posts 34 are disposed on the rear laterally outer side of the driver's seat 13 and the lower portions thereof are fixed to the vehicle body frame 2. Since the intermediate posts 32 interconnecting the ROPS 30 and the vehicle body frame 2 are disposed at the intermediate positions in the fore/aft direction of the ROPS 30 covering the passenger's section 5, the strength of this ROPS 30 as a whole is improved.

(3) Between the right and left intermediate posts 32, the reinforcing frame 32c as a crossbeam is provided. And, to this reinforcing frame 32c, the seat back portion of the driver's seat 13 is supported. As the intermediate posts located on the laterally outer sides of the driver's seat 13 are interconnected via the reinforcing frame 32c, the strength of the intermediate posts 32 in the right/left direction too is improved. As a result, the strength of the ROPS 30 as a whole is improved also.

First Alternative Embodiment of the Invention

In the foregoing embodiment, after the front bottom portion 42 together with the front wall portion 46 is raised rearward and folded, the right and left front side walls 45 are folded to the rear side. Instead, it is possible to employ a different folding order as the order of folding the front wall portion 46, the front bottom portion 42 and the right and left front side wall portions 45. For instance, after folding the right and left front side wall portions 45 to the rear side, the front bottom portion 42 together with the front wall portion 46 can be raised to the rear side and then folded.

In the foregoing embodiment, by folding the front wall portion 46, the front bottom portion 42 and the right and left front side wall portions 45 rearward, the extended state and the contracted state of the load-carrying platform 40 are realized. Instead, it is possible to employ for the load-carrying platform 40 further constructions shown in FIG. 32A and FIG. 32B.

Figure 32A:
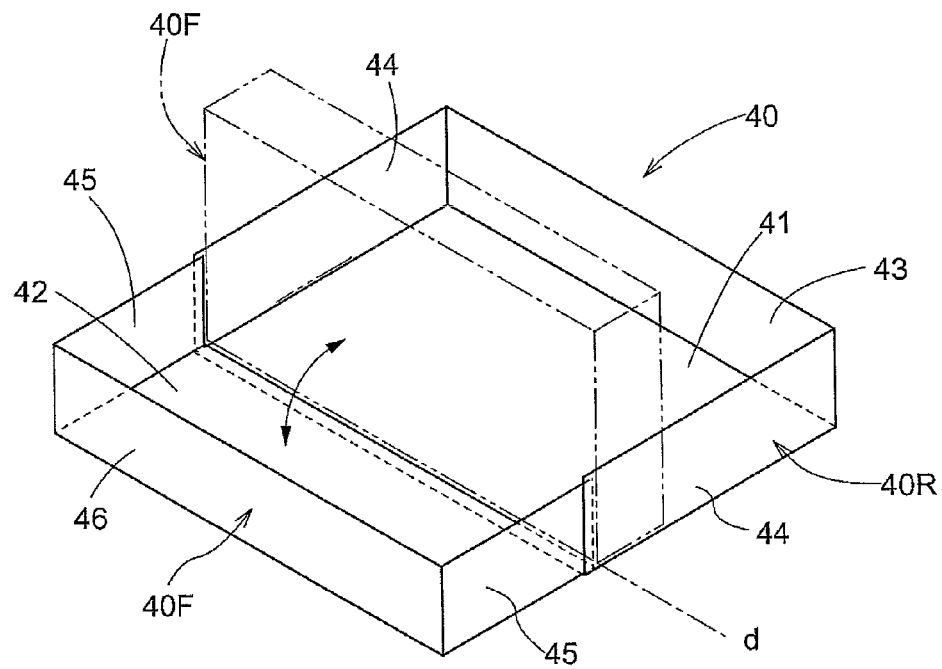

As shown in FIG. 32A, the load-carrying platform 40 includes a front load-carrying platform 40F and a rear load-carrying platform 40R and the front bottom portion 42, the right and left front side wall portions 45 and the front wall portion 46 are fixed respectively. To the front end of the rear load-carrying platform 40R, the rear lower portion of the front load-carrying platform 40F is supported to be pivotable about a right/left axis (d).

With the above, the front load-carrying platform 40F is supported to the rear load-carrying platform 40R to be pivotable about the right/left axis (d), so that the construction can be switched over between an extended state wherein the front load-carrying platform 40F as a whole is pivoted forwardly to increase the total length of the load-carrying platform 40 as denoted by the solid line in FIG. 32A and a contracted state wherein the load-carrying platform 40 as a whole is pivoted rearwardly and upwardly to decrease the total length of the load-carrying platform 40 as denoted by the two-dot chain line in FIG. 32A. Incidentally, between the front load-carrying platform 40F and the rear load-carrying platform 40R, there is provided a lock device (not shown) for fixing the front load-carrying platform 40F to the rear load-carrying platform 40R under the extended state and the contracted state.

Figure 32B:
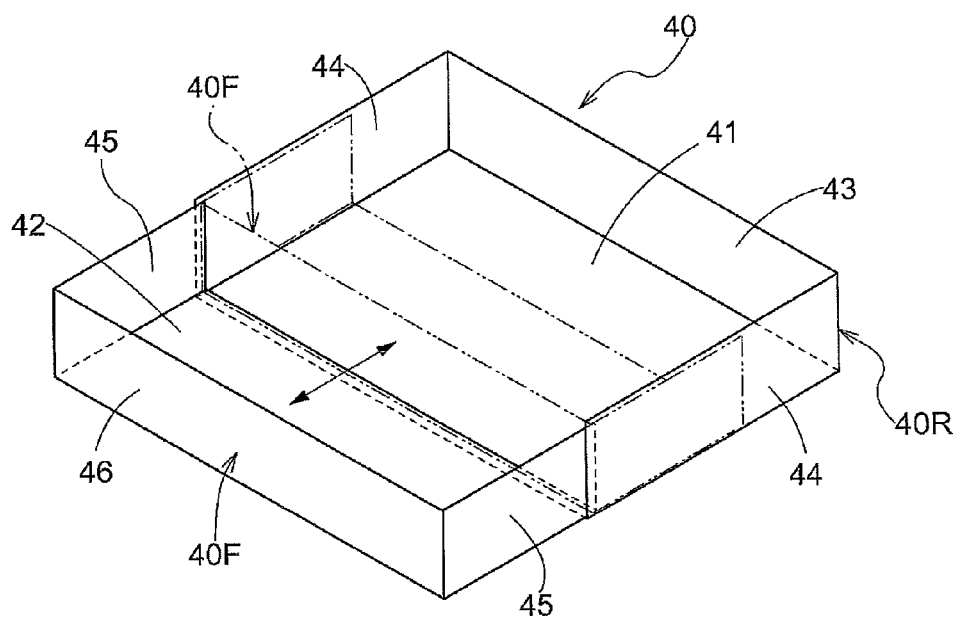

As shown in FIG. 32B, the load-carrying platform 40 includes a front load-carrying platform 40F and a rear load-carrying platform 40R and the front bottom portion 42, the right and left front side wall portions 45 and the front wall portion 46 are fixed respectively. The front load-carrying platform 40F is supported to be slidable along the wall face of the rear load-carrying platform 40R through an unillustrated slide mechanism (e.g. a slide rail, a slide guide, etc.)

With the above, as the front load-carrying platform 40F is supported to the rear load-carrying platform 40R to be slidable, so that the construction can be switched over between an extended state wherein the front load-carrying platform 40F as a whole is slid forwardly to increase the total length of the load-carrying platform 40 as denoted by the solid line in FIG. 32B and a contracted state wherein the rear load-carrying platform 40R as a whole is slid rearward to decrease the total length of the load-carrying platform 40 as denoted by the two-dot chain line in FIG. 32B. Incidentally, between the front load-carrying platform 40F and the rear load-carrying platform 40R, there is provided a lock device (not shown) for fixing the front load-carrying platform 40F to the rear load-carrying platform 40R under the extended state and the contracted state.

Further, though not shown, instead of employing the folding construction or the sliding construction described above, the load-carrying platform 40 can be formed as an integral construction (not allowing extension or contraction of the entire length of the load-carrying platform 40) and this integral load-carrying platform 40 can be slidably supported to the load-carrying platform supporting frame 26, so that in response to a sliding movement in the fore/aft direction of the load-carrying platform 40 relative to the load-carrying platform supporting frame 26, the front wall portion 46 and the front bottom portion 42 of the load-carrying platform 40 may be moved back and forth.

Second Alternative Embodiment of the Invention

In the foregoing embodiment, as the partitioning member 90 is configured to be slidable along the rail members 96, the partitioning member 90 is switchable in position between the forwardly displaced position and the rearwardly displaced position. Instead, a different arrangement can be employed for rendering the partitioning member 90 switchable in position between the forwardly displaced position and the rearwardly displaced position. Specifically, the partitioning member 90 can be constructed as detachably attached type such that the partitioning member 90 at the forwardly displaced position and the rearwardly displaced position can be detachably attached to the ROPS 30 and with detachment of the partitioning member 90 fixed to the ROPS 30 at one of the forwardly displaced position and the rearwardly displaced position, this removed partitioning member 90 is fixed to the ROPS 30 at the other of the forwardly displaced position and the rearwardly displaced position.

Third Alternative Embodiment of the Invention

In the foregoing embodiment, the partitioning member 90 at the forwardly displaced position and the rearwardly displaced position is fixed to the ROPS 30. Instead, it is possible to employ a further construction wherein the partitioning member 90 at the forwardly displaced position and the rearwardly displaced position is fixed to the vehicle body. For instance, the partitioning member 90 at the forwardly displaced position and the rearwardly displaced position can be fixed to the vehicle body frame 2, the front seat supporting panel 24, the rear deck plate 29, etc. Or, a further frame member (not shown) other than the ROPS 30 can be extended from the vehicle body frame 2, the front seat supporting panel 24, the rear deck plate 29, etc. and to this frame member, the partitioning member 90 at the forwardly displaced position and the rearwardly displaced position can be fixed.

Further alternatively, the partitioning member 90 at one of the forwardly displaced position and the rearwardly displaced position can be fixed to the ROPS 30 and the partitioning member 90 at the other of the forwardly displaced position and the rearwardly displaced position can be fixed to the vehicle body frame 2, the front seat supporting panel 24, the rear deck plate 29, etc.

Fourth Alternative Embodiment of the Invention

In the foregoing embodiment, there was described a work vehicle having a load-carrying platform 40 capable of dumping operation provided at the rear portion of the vehicle body 1. Instead, the invention may be applicable also to a work vehicle (not shown) having a load-carrying platform 40 not capable of any dumping operation fixed to the rear portion of the vehicle body 1.

In the foregoing embodiment, there was described a work vehicle including the load-carrying platform 40 having flapper members (the rear wall portion 43, the rear side wall portion 44, the front side wall portion 45, the front wall portion 46). The invention may be applied also to a load-carrying platform (not shown) having flapper members with different heights or a flat-deck type load-carrying platform (not shown) not having any flapper members or a van-type load-carrying platform (not shown) having a ceiling member.

Fifth Alternative Embodiment of the Invention

The forward position fixing mechanism 94 and the rearward position fixing mechanism 95 are not limited to the construction using the rubber-made, band-like member as the means for elastically urging and retaining. Instead, the mechanisms can employ any other convenient construction using a coil spring or using a band-like member formed of elastic synthetic resin material.

Further, the positional relationship between the hook member 94a an the fixing rod 94b, the positional relationship between the band-like member 95a and the pin 95c, etc. can be reverse relationship to those described in the Description of the Preferred Embodiments section, between the partitioning member 90 and the intermediate posts 32 or the rear support post 34.

Sixth Alternative Embodiment of the Invention

The switchover of the posture of the rear seat 14 is not limited to the type using a pivotal operation about the front edge of the seat. Instead, for example, the posture switchover can be effected by slidably changing the position of the rear seat 14 in the fore/aft direction or detaching/attaching the seat.

Seventh Alternative Embodiment of the Invention

In the foregoing embodiment, the switchover between the one row seat mode and the two rows seat mode is done by changing the length of the load-carrying platform 40. The invention is not limited thereto. Instead, it is possible to employ a construction wherein in the two rows seat mode, the load-carrying platform 40 is eliminated entirely and in the single row seat mode, on the rear side of the driver's seat 13, there is formed a space corresponding to the load-carrying platform 40.

Eighth Alternative Embodiment of the Invention

In the foregoing embodiment, various pipes or cables are disposed inside the tunnel-like space S3 formed downwardly of the rear deck plate 29. The invention is not limited thereto. Instead, pipes or the like having relatively large diameters are accommodated inside the tunnel-like space S3 whereas cables or the like having relatively small diameters are disposed separately on the vehicle body frame.

Ninth Alternative Embodiment of the Invention

Figure 33:
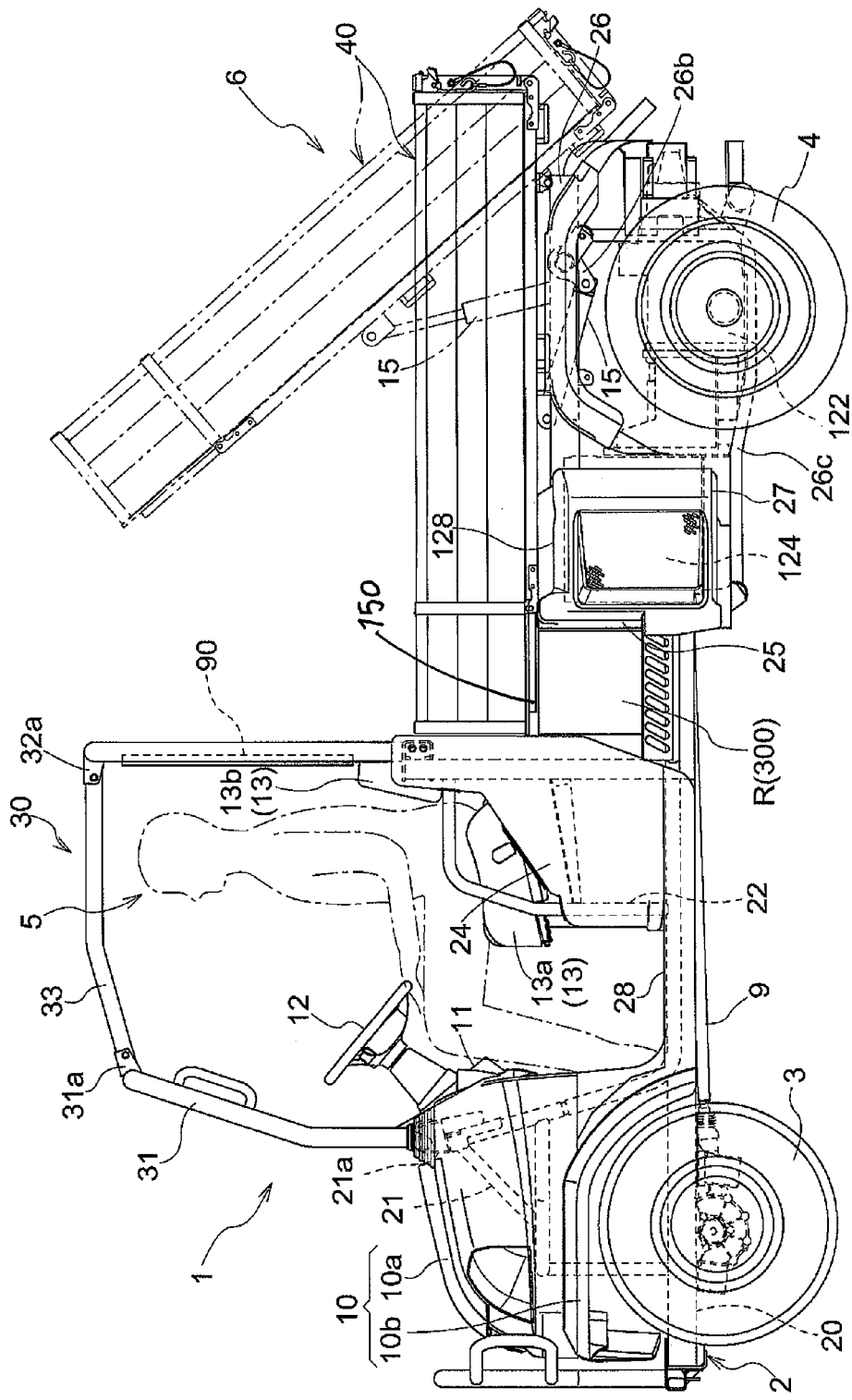
Figure 34:
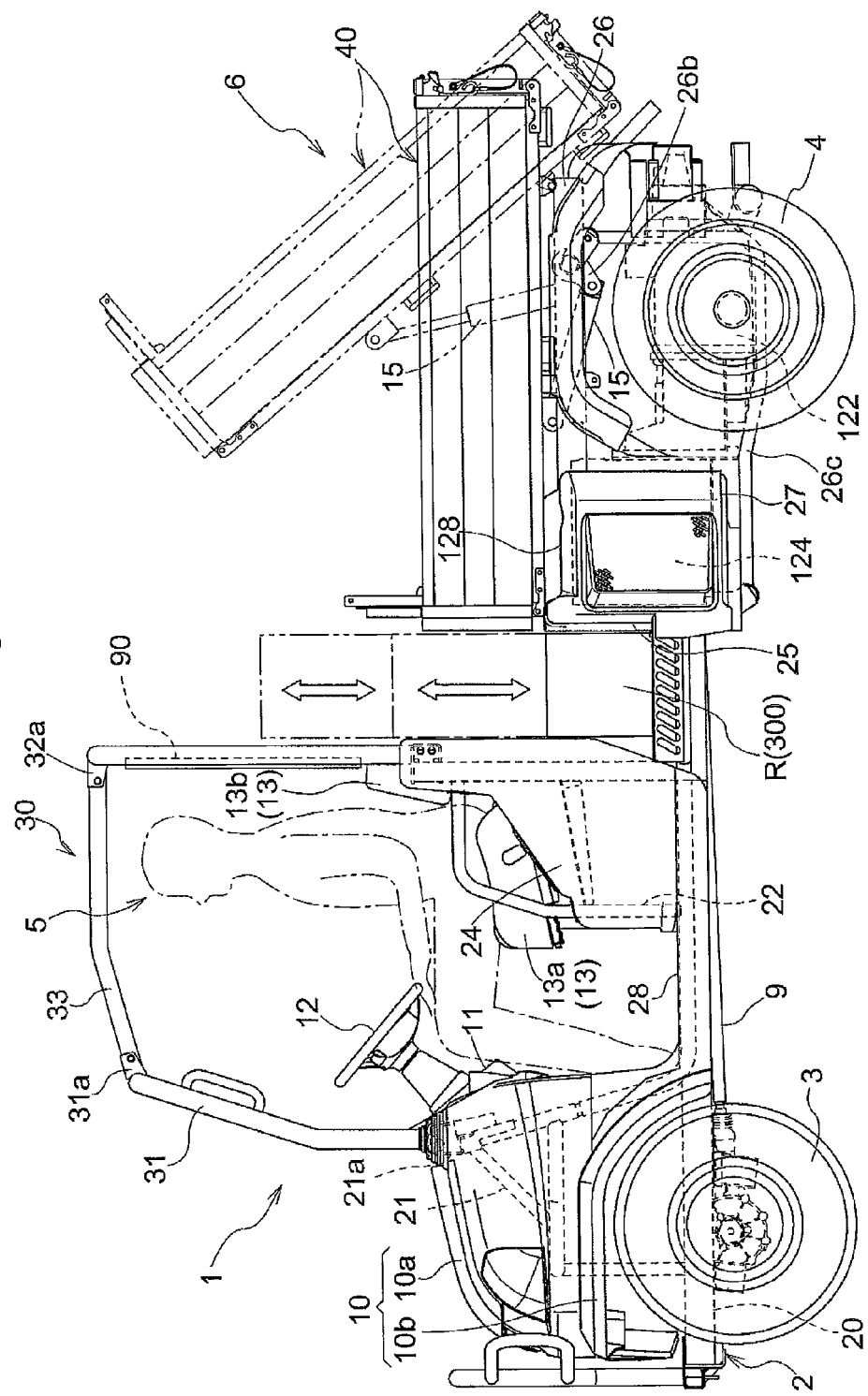
Figure 35:
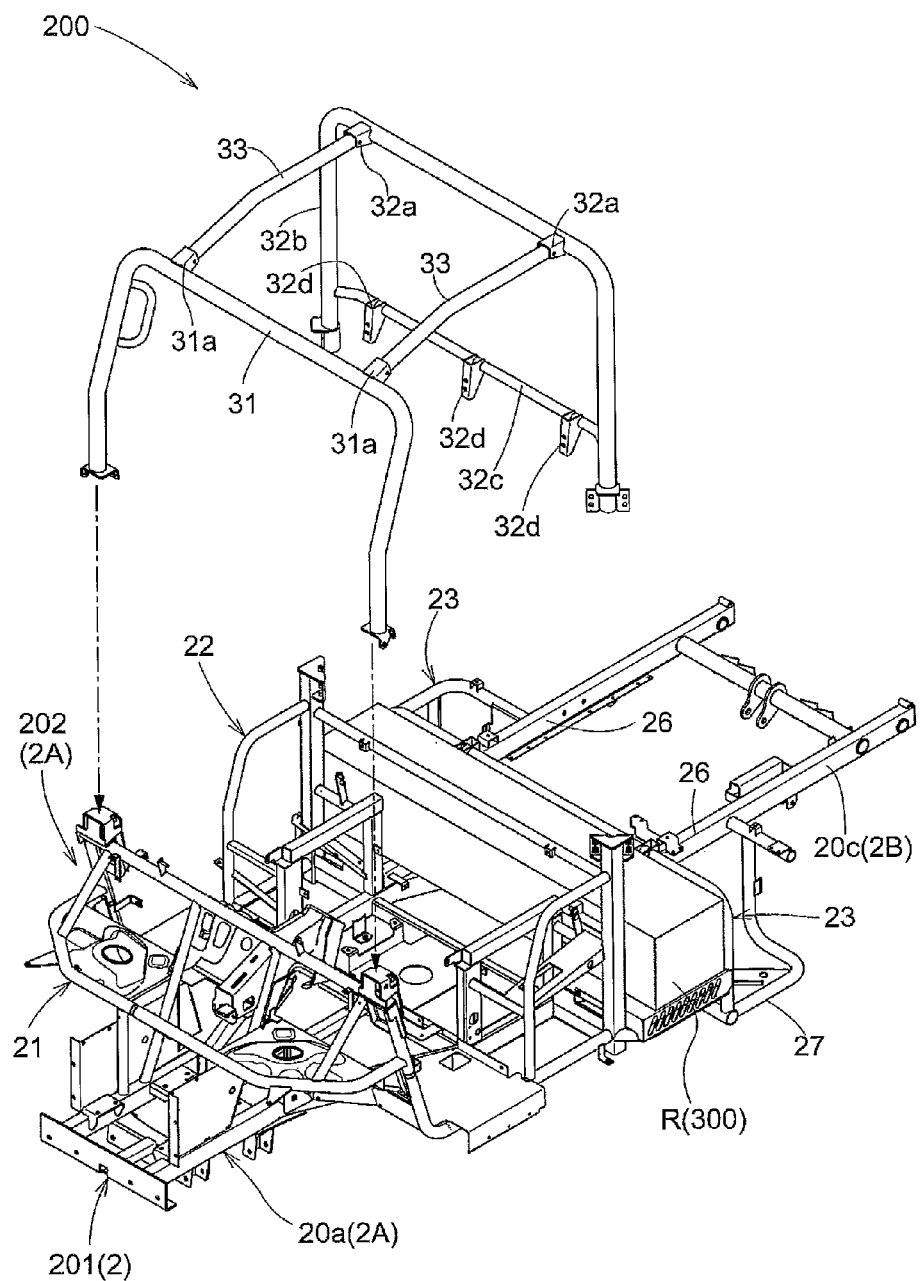

In this embodiment, as shown in FIGS. 33 and 34, a passenger's section 5 includes a driver's seat 13, but does not include a rear seat as one shown and described in the foregoing embodiments. Accordingly, a four-post ROPS 30 is provided as shown in FIG. 35. In particular, instead of the right and left rear posts 34 in the foregoing embodiments (see e.g. FIG. 1), the elements corresponding to the right and left intermediate posts 32 in the foregoing embodiments act as rear posts in the present embodiment. In the present embodiment, a partitioning member 90 extends behind the driver's seat 13. The partitioning member 90 is fixed to the ROPS 30, for example. Instead thereof, the partitioning member 90 may be supported by other element(s) than the ROPS 30, such as a vehicle body frame 2 and a load-carrying platform 40, as shown and described in the foregoing embodiments.

As shown in FIGS. 33 and 34, a storage space R is present behind the driver's seat 13 (i.e. behind the passenger's section 5 having a single row seat). As shown, the storage space R is disposed rearwardly of the driver's seat 13 and downwardly of the load-carrying platform 40 in an extended state. As shown in FIG. 33, the storage space R is disposed downwardly of a bottom portion 150 of the load-carrying platform 40. The storage space R extends in a lateral width direction of the vehicle body 2, and opens laterally of the vehicle body. In the present embodiment, the rear seat is absent and the storage space R is present in a region at the foot of the "rear seat" in the foregoing embodiments.

In the present embodiment, an engine 121, a transmission case 122, an HST speed changer 123, etc. are arranged in a drive unit 120 similarly to those in the foregoing embodiments (see FIG. 26). That is, the engine 121 is disposed rearwardly of the storage space R, i.e. in a region corresponding to one under the seat portion of the "rear seat" in the foregoing embodiments. The transmission case 122 and the HST speed changer 123 are disposed rearwardly of the engine 121.

Similarly to ones in the foregoing embodiments, the load-carrying platform 40 is changeable between an extended state as shown in FIG. 33 (corresponding to a first posture) and a contracted state as shown in FIG. 34 (corresponding to a second posture). In particular, the load-carrying platform 40 lies upwardly of the storage space R in the extended state of the load-carrying platform 40. And, the storage space R opens upward in the contracted state of the load-carrying platform 40.

As shown in FIGS. 33 and 34, a container box 300 is provided within the storage space R. The container box 300 is opened upward. And, the container box 300 is changeable between a contracted state (corresponding to a first state) in which an upper end of the container box 300 lies at a lower level than an lower end of the load-carrying platform 40, and an extended state (corresponding to a second state) in which the upper end of the container box 300 lies at a higher level than the lower end of the load-carrying platform 40. That is, the container box 300 may be extended and contracted in a vertical direction of the vehicle body 2. However, the states of the container box 300 are not necessarily limited to the two states only. Instead, the container box 300 may be configured to have any vertical length (any height) between those of the contracted state and the extended state, depending on a vertical length of an article to be contained.

When the load-carrying platform 40 takes the extended state, the container box 300 lies in the contracted state, so that the container box 300 is positioned downwardly of the load-carrying platform 40. When the load-carrying platform 40 takes the contracted state, on the other hand, a forward end of the platform 40 is positioned more rearward than that when the load-carrying platform 40 takes the extended state, so that an upper region of the storage space R is exposed. From the contracted state of the load-carrying platform 40, the container box 300 may be extended upward to take its extended state. The container box 300 in its extended state may be used for storing an elongated article in a vertically elongated posture, for example.

Figure 36:
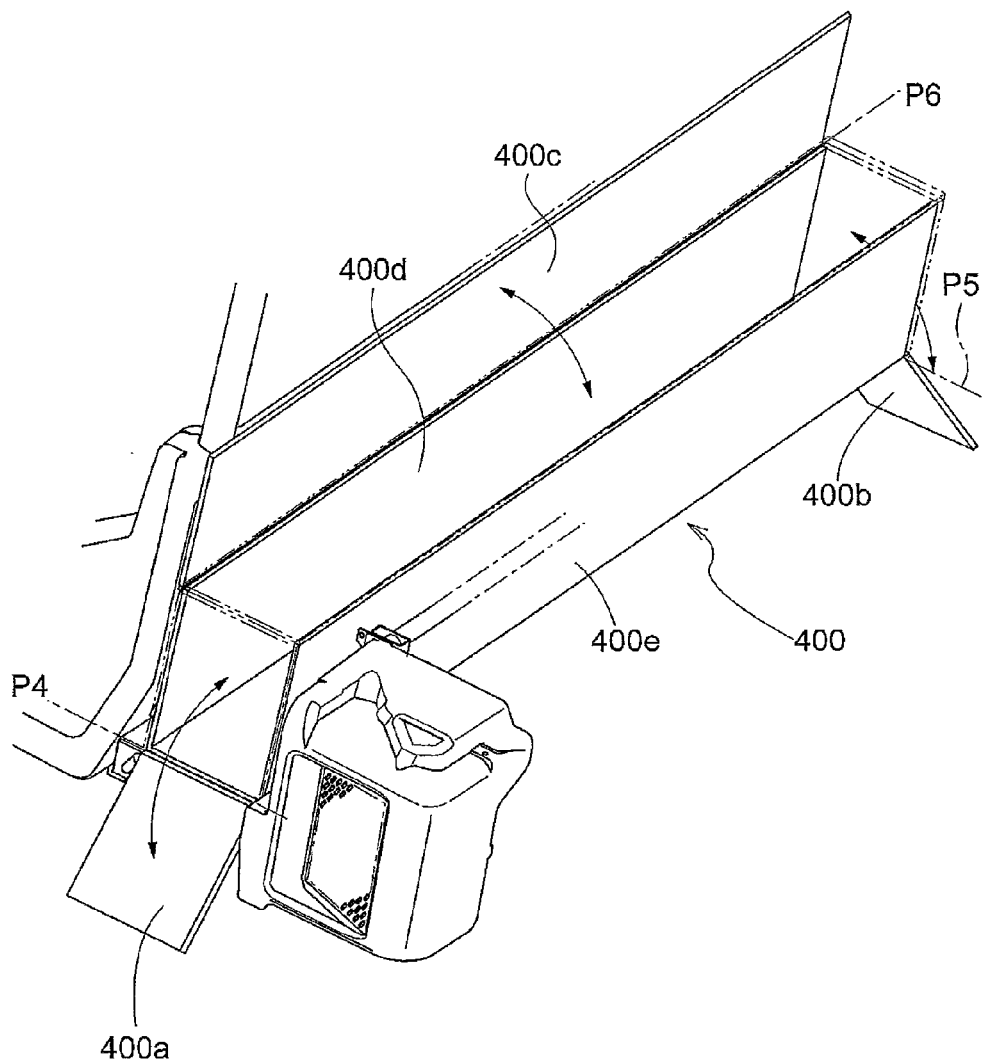

However, a configuration and shape of the container box is not limited to one described above. The configuration and shape may be one of a container box 400 as shown in FIG. 36, for example. The container box 400 is configured to be opened between and across lateral sides 400a, 400b in the lateral width direction of the vehicle body and an upper side 400c thereof. With the container box 400 in operation, the lateral sides 400a, 400b are pivotable about axes P4, P5 respectively extending in a fore/aft direction of the vehicle body at a level adjacent a bottom of the container box 400. The upper side 400c of the container box 400 is pivotable about an axis P6 extending in the lateral width direction of the vehicle body. In the instant embodiment, the axis P6 extends adjacent an upper edge of a forward side 400d in the fore/aft direction of the vehicle body, but this is not limitative. Instead thereof, the axis P6 may extend adjacent an upper edge of a rear side 400e in the fore/aft direction of the vehicle body. Though not shown, the container box 400 may include a locking mechanism for retaining each of the lateral sides 400a, 400b and the upper side 400c at a closed position.

In operation, lateral side portions of the container box 400 are opened by pivoting the lateral sides 400a, 400b downward. The upper side portion of the container box 400 is opened by pivoting the upper side 400c upward.

As described above, the lateral sides 400a, 400b (lateral side portions) of the container box 400 may be opened laterally outwardly. Therefore, even when the load-carrying platform 40 is in the extended state, the inner space of the container box 400 may be accessed by opening the lateral sides 400a, 400b of the container box 400. And, since the upper region of the storage space R is opened by changing the load-carrying platform 40 to the contracted state, the container box 400 may be opened upward by changing the upper side 400c to an open position, to thereby allow an easy access to a central region within the container box 400. Whereby, when the article is to be stored into or taken out of the central region within the container box 400, or when the interior of the container box 400 is to be cleaned, for example, the container box 400 may be conveniently opened upward. Though the utility/application of the container box 400 is not limitative, tool devices may be conveniently stored within the container box 400, for example.

The upper region of the container box 400 may be opened upward also, by rotating the load-carrying platform 40 to a dumping position when the load-carrying platform 40 is in the extended state. In the instant embodiment, therefore, the load-carrying platform 40 does not necessarily have to be changed between the extended state and the contracted state, but the load-carrying platform 40 may take a posture corresponding to the above-described extended state alone. Alternatively, the load-carrying platform 40 may take a posture corresponding to the above-described contracted state alone The configuration and shape of the container box is not limited to anyone described above. The configuration and shape may be one of a container box 500 as shown in FIGS. 37A, 37B and 37C, for example. The container box 500 has one lateral side in the lateral width direction of the vehicle body (a first lateral side portion 500a) and an upper portion 500c, each of the portions 500a, 500c being configured to be opened. In more particular, the container box 500 includes a box body 501 and a cover member 502. The box body 501 is opened at the first lateral side portion 500a and the upper portion 500c. In the instant embodiment, a single opening 503 is defined to extend between and across the first lateral side portion 500a and the upper portion 500c. Instead thereof, an opening may be defined at each of the first lateral side portion 500a and the upper portion 500c by arranging a partitioning member, formed by e.g. a portion of a framework of the box body 501, at a boundary between the first lateral side portion 500a and the upper portion 500c, for example.

The cover member 502 is configured to removably cover the opening 503. In particular, the cover member 502 includes a first cover element 502a for a portion of the opening 503 associated with the upper portion 500c, and a second cover element 502b for covering a further portion of the opening 503 associated with the first lateral side portion 500a. The first cover element 502a is supported to be pivotal about an axis P7 extending adjacent an upper end of a second lateral side portion 500b opposite from the first lateral side portion 500a. The second cover element 502b is supported to be pivotal about an axis P8 extending at an end of the first cover element 502a opposite from the axis P7 in the lateral width direction of the vehicle body. In operation, when the second cover element 502b is pivoted upward about the axis P8, the first lateral side portion 500a of the container box 500 may be opened. Subsequently thereto, when the first cover element 502a is pivoted upward about the axis P7, the container box 500 may be opened between and across the first lateral side portion 500a and the upper portion 500c. A further opening may be optionally defined in the second cover element 500b to be covered by an open/close cover member.

The configuration and shape of the cover member for the container box is not limited to anyone described above. As shown in FIGS. 38A, 38B and 38C, a shutter 600 may act as a cover member, for example. When the container box 500 is closed (see FIG. 38A), the shutter 600 covers an opening portion of each of the first lateral side portion 500a and the upper portion 500c. When the shutter 600 is moved upward along a rail unit 601, the first lateral side portion 500a is opened (see FIG. 38B). When the shutter 600 is further moved toward a second lateral side portion 500b, the first lateral side portion 500a and the upper portion 500c are opened (see FIG. 38C).

As shown in FIGS. 39A, 39B and 39C, a further opening may be defined in a second cover element 500b. In the illustrated embodiment, an annular rail unit 601 is provided. When a shutter 600 is closed, the shutter 600 covers a first lateral side portion 500a, a second lateral side portion 500b and an upper portion 500c (see FIG. 39A). When the shutter 600 is moved upward at the first lateral side portion 500a, the first lateral side portion 500a is opened. When the shutter 600 is further moved toward the second lateral side portion 500b, the upper portion 500c is further opened (see FIG. 39B). When the upper portion 500c is fully opened, the first lateral side portion 500a opposite from the second lateral side portion 500b is closed. The same is true when the upper portion 500c is fully opened after moving the shutter 600 at the second lateral side portion 500b upward first (see FIG. 39C).

The foregoing description is made assuming that one and only container box is provided within the storage space R. Instead thereof, a plurality of container boxes may be arranged in the lateral width direction and/or the fore/aft direction of the vehicle body. Further, the container box may be configured to extend/contract in the lateral width direction and/or the fore/aft direction of the vehicle body, depending on a size of an article to be stored, for example. Still further, the container box may be omitted and the article may be directly stored within the storage space R, for example. In this case, a grill, a net, a cover member, etc. may be provided at an opening portion of the storage space R removably and/or openably/closably. Such modified embodiments should fall within the scope of the claimed invention also.

Figure 40A:
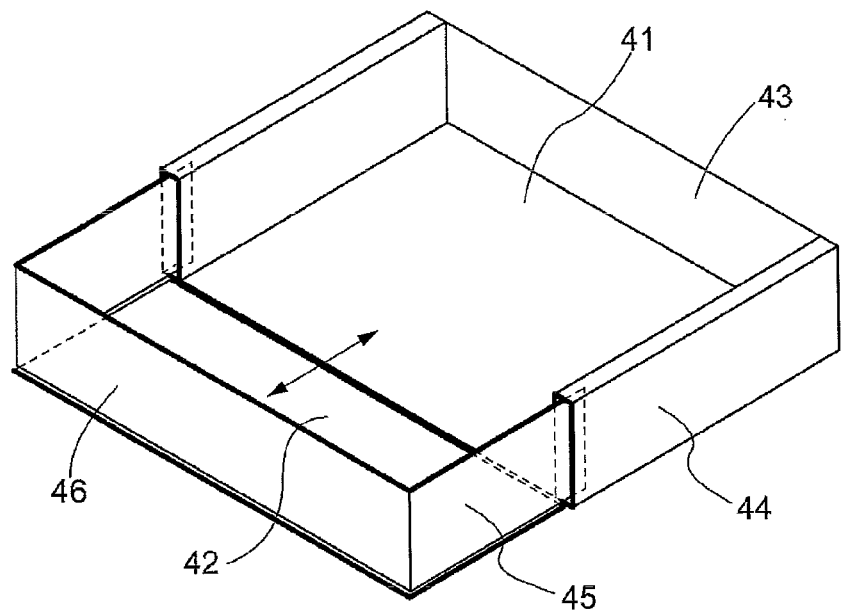
Figure 40B:
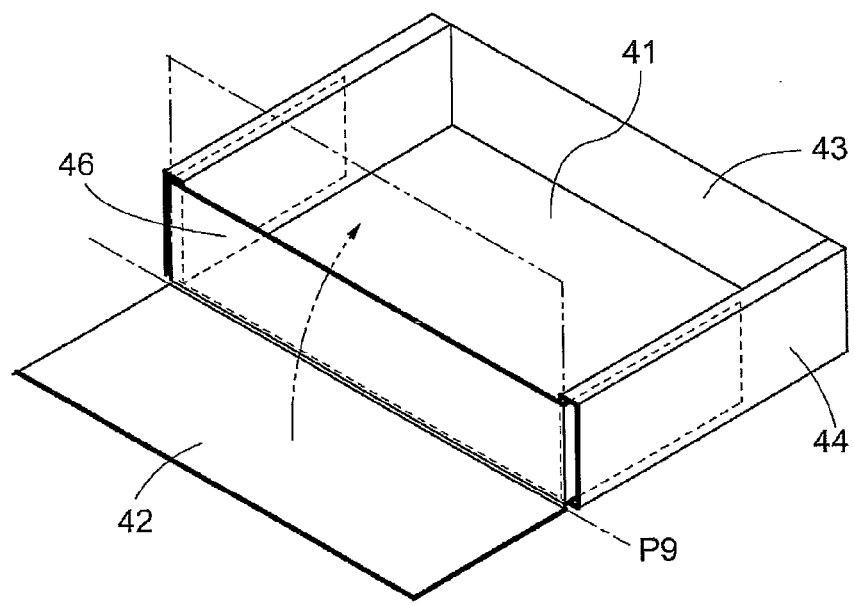

The structure for changing the load-carrying platform 40 between the extended state and the contracted state is not limited to anyone described above. The structure may be one as shown in FIGS. 40A and 40B, for example. In the instant embodiment, the load-carrying platform 40 includes a front wall 46, a side wall unit 44, 45, a rear wall 43 and a bottom unit 41, 42. The side wall unit includes a forward side wall portion 45 and a rear side wall portion 44. The rear side wall portion 44 is formed of a hollow member for receiving the forward side wall portion 45 when the forward side wall portion 45 is moved in the fore/aft direction. Whereby, the side wall unit 44, 45 may be extended and contracted. The bottom unit of the load-carrying platform 40 includes a forward bottom portion 42 and a rear bottom portion 41. The forward bottom portion 42 is supported by the rear bottom portion 41 to be pivotal about an axis P9 relative to the rear bottom portion 41. Further, the front wall 46 and the forward side wall portion 45 are configured to slide toward and away from the forward bottom portion 42. With the structure described above, when the front wall 46 and the forward bottom portion 45 are moved rearward to contract and shorten the side wall unit 44, 45 and then the forward bottom portion 42 is rotated upward about the axis P9, the load-carrying platform 40 is changed to the contracted state (see 40B).

In the foregoing embodiments, the load-carrying platform 40 is changed between the extended state and the contracted state for changing postures of the load-carrying platform 40 between the first posture and the second posture, but this is not limitative. For example, when the load-carrying platform is in the extended state (or when the load-carrying platform has one and only state corresponding to the extended state), the first posture may mean for one when the load-carrying platform is positioned immediately behind the driver's seat, and the second state may mean for one when the load-carrying platform is slid rearward from the first posture.

The invention claimed is:

1. A work vehicle comprising:
   a vehicle body;
   a seat section;
   a load-carrying platform disposed rearwardly of the seat section, the load-carrying platform having a bottom portion;
   a storage space disposed rearwardly of the seat section and immediately under the bottom portion of the load-carrying platform, the storage space extending in a lateral width direction of the vehicle body, and the storage space opening toward a lateral side of the vehicle body;
   an engine; and
   a speed changer receiving power from the engine;
   wherein the engine and the speed changer are disposed rearwardly of the storage space.

2. The work vehicle according to claim 1, wherein the load-carrying platform is changeable between a first posture in which the load-carrying platform lies upwardly of the storage space, and a second posture in which the storage space opens upward.

3. The work vehicle according to claim 1, wherein a container box is provided within the storage space.

4. The work vehicle according to claim 2, wherein a container box is provided within the storage space.

5. The work vehicle according to claim 4, wherein the container box is changeable between a first state in which an upper end of the container box lies at a lower level than a lower end of the load-carrying platform, and a second state in which the upper end of the container box lies at a higher level than the lower end of the load-carrying platform.

6. The work vehicle according to claim 4, wherein the container box is configured to be opened between and across a lateral outer side portion in the lateral width direction and an upper side portion.

7. The work vehicle according to claim 1, wherein the storage space extends an entire width of the vehicle body.

\* \* \* \* \*